(12) United States Patent
Valeski

(10) Patent No.: US 8,910,056 B2
(45) Date of Patent: *Dec. 9, 2014

(54) AUTOMATIC CATEGORIZATION OF ENTRIES IN A CONTACT LIST

(75) Inventor: Judson Valeski, Boulder, CO (US)

(73) Assignee: Facebook, Inc., Menlo Park, CA (US)

( * ) Notice: Subject to any disclaimer, the term of this patent is extended or adjusted under 35 U.S.C. 154(b) by 536 days.

This patent is subject to a terminal disclaimer.

(21) Appl. No.: 12/852,769

(22) Filed: Aug. 9, 2010

(65) Prior Publication Data

US 2010/0325113 A1    Dec. 23, 2010

Related U.S. Application Data

(63) Continuation of application No. 11/237,718, filed on Sep. 29, 2005, now Pat. No. 7,774,711.

(51) Int. Cl.
| | |
|---|---|
| *G06F 3/00* | (2006.01) |
| *H04L 12/58* | (2006.01) |
| *G06F 3/0481* | (2013.01) |
| *G06F 17/30* | (2006.01) |
| *G06F 3/0482* | (2013.01) |
| *G06Q 10/10* | (2012.01) |

(52) U.S. Cl.
CPC .......... *G06F 17/30598* (2013.01); *H04L 51/04* (2013.01); *G06F 3/0481* (2013.01); *H04L 12/581* (2013.01); *G06F 3/0482* (2013.01); *G06Q 10/10* (2013.01)
USPC ............................. 715/752; 715/758; 715/745

(58) Field of Classification Search
USPC .......................................... 715/752, 758, 745
See application file for complete search history.

(56) References Cited

U.S. PATENT DOCUMENTS

| | | | |
|---|---|---|---|
| 4,837,798 A | 6/1989 | Cohen et al. | |
| 5,086,394 A | 2/1992 | Shapira | |

(Continued)

FOREIGN PATENT DOCUMENTS

| | | |
|---|---|---|
| EP | 0862304 | 9/1998 |
| EP | 1176840 | 1/2002 |

(Continued)

OTHER PUBLICATIONS

Robert J. Hall, "A Countermeasure to Duplicate-detecting Anti-spam Techniques," AT&T Labs Technical Report 99.9.1, 1999, Abst. and pp. 1-26.

(Continued)

*Primary Examiner* — Ryan Pitaro
(74) *Attorney, Agent, or Firm* — Keller Jolley Preece

(57) ABSTRACT

Entries within a participant list of an electronic communications system may be categorized automatically into one or more groups based on attributes of users represented in the participant list. Categorizing users includes maintaining a list of identifiers that are selected by a first user and for which online presence information is made perceivable through the list. The list includes one or more categories into which the identifiers are categorized. At least one attribute associated with an identifier for which online presence information is to be made perceivable through the list and attributes stored relative to at least one of the categories are accessed. The attributes associated with the identifier are compared to the stored attributes. Based on results of the comparison, at least one category within the list that corresponds to the identifier is identified, and the identifier is categorized into the identified category.

24 Claims, 15 Drawing Sheets

(After)

(56) References Cited

U.S. PATENT DOCUMENTS

| | | |
|---|---|---|
| 5,276,905 A | 1/1994 | Hurst et al. |
| 5,327,486 A | 7/1994 | Wolff et al. |
| 5,532,129 A | 7/1996 | Heller |
| 5,548,637 A | 8/1996 | Heller et al. |
| 5,557,659 A | 9/1996 | Hyde-Thomson |
| 5,583,920 A | 12/1996 | Wheeler, Jr. |
| 5,608,786 A | 3/1997 | Gordon |
| 5,610,910 A | 3/1997 | Focsaneanu et al. |
| 5,650,994 A | 7/1997 | Daley |
| 5,694,616 A | 12/1997 | Johnson et al. |
| 5,721,906 A | 2/1998 | Siefert |
| 5,742,905 A | 4/1998 | Pepe et al. |
| 5,764,916 A | 6/1998 | Busey et al. |
| 5,774,670 A | 6/1998 | Montulli |
| 5,790,800 A | 8/1998 | Gauvin et al. |
| 5,793,365 A | 8/1998 | Tang et al. |
| 5,802,470 A | 9/1998 | Gaulke et al. |
| 5,835,724 A | 11/1998 | Smith |
| 5,848,134 A | 12/1998 | Sekiguchi et al. |
| 5,850,594 A | 12/1998 | Cannon et al. |
| 5,859,979 A | 1/1999 | Tung et al. |
| 5,867,162 A | 2/1999 | O'Leary et al. |
| 5,870,744 A | 2/1999 | Sprague |
| 5,872,521 A | 2/1999 | Lopatukin et al. |
| 5,878,219 A | 3/1999 | Vance, Jr. et al. |
| 5,893,091 A | 4/1999 | Hunt et al. |
| 5,893,099 A | 4/1999 | Schrieber et al. |
| 5,919,247 A | 7/1999 | Van Hoff et al. |
| 5,920,692 A | 7/1999 | Nguyen et al. |
| 5,940,488 A | 8/1999 | DeGrazia et al. |
| 5,946,617 A | 8/1999 | Portaro et al. |
| 5,948,058 A | 9/1999 | Kudoh et al. |
| 5,951,643 A | 9/1999 | Shelton et al. |
| 5,951,646 A | 9/1999 | Brandon |
| 5,951,652 A | 9/1999 | Ingrassia, Jr. et al. |
| 5,954,798 A | 9/1999 | Shelton et al. |
| 5,956,716 A | 9/1999 | Kenner et al. |
| 5,960,173 A | 9/1999 | Tang et al. |
| 5,983,369 A | 11/1999 | Bakoglu et al. |
| 5,987,113 A | 11/1999 | James |
| 5,987,407 A | 11/1999 | Wu et al. |
| 5,991,791 A | 11/1999 | Siefert |
| 5,995,023 A | 11/1999 | Kreft |
| 6,002,402 A | 12/1999 | Schacher |
| 6,006,179 A | 12/1999 | Wu et al. |
| 6,009,413 A | 12/1999 | Webber et al. |
| 6,012,051 A | 1/2000 | Sammon, Jr. et al. |
| 6,014,135 A | 1/2000 | Fernandes |
| 6,014,638 A | 1/2000 | Burge et al. |
| 6,026,403 A | 2/2000 | Siefert |
| 6,026,429 A | 2/2000 | Jones et al. |
| 6,049,533 A | 4/2000 | Norman et al. |
| 6,065,047 A | 5/2000 | Carpenter et al. |
| 6,070,171 A | 5/2000 | Snyder et al. |
| 6,073,138 A | 6/2000 | de l'Etraz et al. |
| 6,081,830 A | 6/2000 | Schindler |
| 6,085,223 A | 7/2000 | Carino, Jr. et al. |
| 6,088,435 A | 7/2000 | Barber et al. |
| 6,112,181 A | 8/2000 | Shear et al. |
| 6,134,432 A | 10/2000 | Holmes et al. |
| 6,144,991 A | 11/2000 | England |
| 6,151,584 A | 11/2000 | Papierniak et al. |
| 6,161,130 A | 12/2000 | Horvitz et al. |
| 6,166,730 A | 12/2000 | Goode et al. |
| 6,175,831 B1 | 1/2001 | Weinreich et al. |
| 6,192,395 B1 | 2/2001 | Lerner et al. |
| 6,195,354 B1 | 2/2001 | Skalecki et al. |
| 6,199,103 B1 | 3/2001 | Sakaguchi et al. |
| 6,212,548 B1 | 4/2001 | DeSimone et al. |
| 6,212,550 B1 | 4/2001 | Segur |
| 6,223,213 B1 | 4/2001 | Cleron et al. |
| 6,233,577 B1 | 5/2001 | Ramasubramani et al. |
| 6,247,043 B1 | 6/2001 | Bates |
| 6,249,740 B1 | 6/2001 | Ito et al. |
| 6,260,148 B1 | 7/2001 | Aggarwal et al. |
| 6,269,369 B1 | 7/2001 | Robertson |
| 6,301,609 B1 | 10/2001 | Aravamudan et al. |
| 6,311,211 B1 | 10/2001 | Shaw et al. |
| 6,314,450 B1 | 11/2001 | Hachiya et al. |
| 6,317,776 B1 | 11/2001 | Broussard et al. |
| 6,324,541 B1 | 11/2001 | de l'Etraz et al. |
| 6,330,590 B1 | 12/2001 | Cotten |
| 6,347,332 B1 | 2/2002 | Malet et al. |
| 6,349,327 B1 | 2/2002 | Tang et al. |
| 6,351,698 B1 | 2/2002 | Kubota et al. |
| 6,363,392 B1 | 3/2002 | Halstead et al. |
| 6,366,962 B1 | 4/2002 | Teibel |
| 6,374,246 B1 | 4/2002 | Matsuo |
| 6,374,290 B1 | 4/2002 | Scharber et al. |
| 6,389,127 B1 | 5/2002 | Vardi et al. |
| 6,389,372 B1 | 5/2002 | Glance et al. |
| 6,393,464 B1 | 5/2002 | Dieterman |
| 6,400,381 B1 | 6/2002 | Barrett et al. |
| 6,405,035 B1 | 6/2002 | Singh |
| 6,405,249 B1 | 6/2002 | Matsuda et al. |
| 6,415,318 B1 | 7/2002 | Aggarwal et al. |
| 6,421,439 B1 | 7/2002 | Liffick |
| 6,421,675 B1 | 7/2002 | Ryan |
| 6,421,709 B1 | 7/2002 | McCormick et al. |
| 6,425,012 B1 | 7/2002 | Trovato et al. |
| 6,430,344 B1 | 8/2002 | Dixon et al. |
| 6,430,604 B1 | 8/2002 | Ogle et al. |
| 6,446,112 B1 | 9/2002 | Bunney et al. |
| 6,449,344 B1 | 9/2002 | Goldfinger et al. |
| 6,449,634 B1 | 9/2002 | Capiel |
| 6,480,885 B1 | 11/2002 | Olivier |
| 6,484,196 B1 | 11/2002 | Maurille |
| 6,501,834 B1 | 12/2002 | Milewski et al. |
| 6,507,866 B1 | 1/2003 | Barchi |
| 6,525,747 B1 | 2/2003 | Bezos |
| 6,529,475 B1 | 3/2003 | Wan et al. |
| 6,535,586 B1 | 3/2003 | Cloutier et al. |
| 6,539,421 B1 | 3/2003 | Appelman et al. |
| 6,542,750 B2 | 4/2003 | Hendrey et al. |
| 6,549,937 B1 | 4/2003 | Auerbach et al. |
| 6,557,027 B1 | 4/2003 | Cragun |
| 6,559,863 B1 | 5/2003 | Megiddo |
| 6,564,248 B1 | 5/2003 | Budge et al. |
| 6,564,261 B1 | 5/2003 | Gudjonsson et al. |
| 6,571,234 B1 | 5/2003 | Knight et al. |
| 6,574,599 B1 | 6/2003 | Lim et al. |
| 6,580,790 B1 | 6/2003 | Henry et al. |
| 6,606,647 B2 | 8/2003 | Shah et al. |
| 6,615,241 B1 | 9/2003 | Miller et al. |
| 6,636,733 B1 | 10/2003 | Helferich |
| 6,640,218 B1 | 10/2003 | Golding |
| 6,640,230 B1 | 10/2003 | Alexander et al. |
| 6,647,383 B1 | 11/2003 | August |
| 6,654,683 B2 | 11/2003 | Jin et al. |
| 6,677,968 B1 | 1/2004 | Appelman |
| 6,677,976 B2 | 1/2004 | Parker et al. |
| 6,678,719 B1 | 1/2004 | Stimmel |
| 6,691,162 B1 | 2/2004 | Wick |
| 6,697,807 B2 | 2/2004 | McGeachie |
| 6,701,348 B2 | 3/2004 | Sommerer |
| 6,714,791 B2 | 3/2004 | Friedman |
| 6,714,793 B1 | 3/2004 | Carey et al. |
| 6,714,916 B1 * | 3/2004 | Robertson et al. ............ 705/7.18 |
| 6,731,308 B1 | 5/2004 | Tang et al. |
| 6,732,155 B2 | 5/2004 | Meek |
| 6,738,822 B2 | 5/2004 | Fukasawa et al. |
| 6,747,970 B1 | 6/2004 | Lamb et al. |
| 6,748,421 B1 | 6/2004 | Ozkan et al. |
| 6,750,881 B1 | 6/2004 | Appelman |
| 6,757,365 B1 | 6/2004 | Bogard |
| 6,757,732 B1 | 6/2004 | Sollee et al. |
| 6,772,188 B1 | 8/2004 | Cloutier |
| 6,781,608 B1 | 8/2004 | Crawford |
| 6,785,554 B1 | 8/2004 | Amerga |
| 6,785,681 B2 | 8/2004 | Keskar et al. |
| 6,788,769 B1 | 9/2004 | Waites |
| 6,795,863 B1 | 9/2004 | Doty, Jr. |
| 6,799,039 B2 | 9/2004 | Wu et al. |
| 6,800,031 B2 | 10/2004 | Di Cesare |

(56) References Cited

U.S. PATENT DOCUMENTS

| | | |
|---|---|---|
| 6,807,574 B1 | 10/2004 | Partovi et al. |
| 6,816,578 B1 | 11/2004 | Kredo et al. |
| 6,832,245 B1 | 12/2004 | Isaacs et al. |
| 6,839,737 B1 | 1/2005 | Friskel |
| 6,857,006 B1 | 2/2005 | Nishizawa |
| 6,879,665 B1 | 4/2005 | Cook et al. |
| 6,901,559 B1 | 5/2005 | Blum et al. |
| 6,904,026 B1 | 6/2005 | Tarnanen et al. |
| 6,907,243 B1 | 6/2005 | Patel |
| 6,912,563 B1 | 6/2005 | Parker et al. |
| 6,912,564 B1 * | 6/2005 | Appelman et al. ............ 709/204 |
| 6,917,965 B2 | 7/2005 | Gupta et al. |
| 6,920,478 B2 | 7/2005 | Mendiola et al. |
| 6,941,345 B1 | 9/2005 | Kapil et al. |
| 6,968,179 B1 * | 11/2005 | De Vries .................... 455/414.1 |
| 6,990,513 B2 | 1/2006 | Belfiore et al. |
| 6,993,327 B2 | 1/2006 | Mathis |
| 6,993,564 B2 | 1/2006 | Whitten, II |
| 6,996,520 B2 | 2/2006 | Levin |
| 7,035,865 B2 | 4/2006 | Doss et al. |
| 7,039,639 B2 | 5/2006 | Brezin |
| 7,039,676 B1 | 5/2006 | Day et al. |
| 7,043,530 B2 | 5/2006 | Isaacs et al. |
| 7,058,036 B1 | 6/2006 | Yu et al. |
| 7,058,690 B2 | 6/2006 | Maehiro |
| 7,065,186 B1 | 6/2006 | Myers et al. |
| 7,082,047 B2 | 7/2006 | Chow |
| 7,082,407 B1 | 7/2006 | Bezos et al. |
| 7,085,834 B2 * | 8/2006 | Delany et al. ................ 709/225 |
| 7,117,254 B2 | 10/2006 | Lunt |
| 7,120,687 B1 | 10/2006 | Tessman, Jr. et al. |
| 7,124,123 B1 | 10/2006 | Roskind et al. |
| 7,127,232 B2 | 10/2006 | O'Neil et al. |
| 7,162,202 B2 | 1/2007 | Westman |
| 7,171,473 B1 | 1/2007 | Eftis et al. |
| 7,177,880 B2 | 2/2007 | Ruvolo |
| 7,181,498 B2 | 2/2007 | Zhu |
| 7,185,059 B2 | 2/2007 | Daniell et al. |
| 7,188,153 B2 | 3/2007 | Lumt |
| 7,190,956 B2 | 3/2007 | Dorenbosch et al. |
| 7,200,634 B2 | 4/2007 | Mendiola et al. |
| 7,202,814 B2 | 4/2007 | Caspi et al. |
| 7,222,156 B2 | 5/2007 | Gupta et al. |
| 7,233,992 B1 | 6/2007 | Muldoon et al. |
| 7,263,614 B2 | 8/2007 | Roskind |
| 7,269,590 B2 | 9/2007 | Hull |
| 7,275,215 B2 | 9/2007 | Werndorfer |
| 7,283,805 B2 | 10/2007 | Agrawal |
| 7,313,760 B2 | 12/2007 | Grossman et al. |
| 7,316,028 B2 | 1/2008 | Donatelli et al. |
| 7,436,780 B2 | 10/2008 | Stephens et al. |
| 7,437,413 B2 | 10/2008 | Okuyama et al. |
| 7,454,470 B1 | 11/2008 | Isaacs et al. |
| 7,490,238 B2 | 2/2009 | Roskind |
| 7,711,106 B2 | 5/2010 | Likwornik |
| 7,716,287 B2 | 5/2010 | Appelman |
| 7,774,711 B2 | 8/2010 | Valeski |
| 7,945,674 B2 | 5/2011 | Appelman |
| 7,949,759 B2 | 5/2011 | Appelman |
| 7,954,146 B2 | 5/2011 | Roskind |
| 8,060,566 B2 | 11/2011 | Appelman |
| 8,185,638 B2 | 5/2012 | Appelman |
| 8,560,706 B2 | 10/2013 | Appelman |
| 2001/0002469 A1 * | 5/2001 | Bates et al. ........................ 707/1 |
| 2001/0005861 A1 | 6/2001 | Mousseau et al. |
| 2001/0013050 A1 | 8/2001 | Shah |
| 2001/0032246 A1 | 10/2001 | Fardella et al. |
| 2001/0052019 A1 | 12/2001 | Walters et al. |
| 2002/0015061 A1 | 2/2002 | Maguire |
| 2002/0021307 A1 | 2/2002 | Glenn et al. |
| 2002/0023132 A1 * | 2/2002 | Tornabene et al. ............ 709/205 |
| 2002/0023134 A1 | 2/2002 | Roskowski et al. |
| 2002/0028595 A1 | 3/2002 | Higashi et al. |
| 2002/0042816 A1 | 4/2002 | Bae |
| 2002/0049717 A1 | 4/2002 | Routtenberg et al. |
| 2002/0055975 A1 | 5/2002 | Petrovykh |
| 2002/0056123 A1 | 5/2002 | Liwerant et al. |
| 2002/0059201 A1 | 5/2002 | Work |
| 2002/0065856 A1 | 5/2002 | Kisiel |
| 2002/0065894 A1 | 5/2002 | Dalal et al. |
| 2002/0077080 A1 | 6/2002 | Greene |
| 2002/0083136 A1 | 6/2002 | Whitten, II |
| 2002/0086732 A1 | 7/2002 | Kirmse et al. |
| 2002/0091667 A1 | 7/2002 | Jaipuria et al. |
| 2002/0103801 A1 | 8/2002 | Lyons |
| 2002/0112181 A1 | 8/2002 | Smith |
| 2002/0116463 A1 | 8/2002 | Hart |
| 2002/0116641 A1 | 8/2002 | Mastrianni |
| 2002/0133292 A1 | 9/2002 | Miyaki |
| 2002/0133369 A1 | 9/2002 | Johnson |
| 2002/0147777 A1 | 10/2002 | Hackbarth et al. |
| 2002/0174010 A1 | 11/2002 | Rice, III |
| 2002/0175953 A1 | 11/2002 | Lin |
| 2002/0178161 A1 | 11/2002 | Brezin |
| 2002/0181703 A1 | 12/2002 | Logan et al. |
| 2002/0184089 A1 | 12/2002 | Tsou et al. |
| 2002/0193942 A1 | 12/2002 | Odakura et al. |
| 2002/0199095 A1 | 12/2002 | Bandini et al. |
| 2003/0004855 A1 | 1/2003 | Dutta et al. |
| 2003/0004872 A1 | 1/2003 | Gardi et al. |
| 2003/0009385 A1 | 1/2003 | Tucciarone et al. |
| 2003/0009523 A1 | 1/2003 | Lindskog et al. |
| 2003/0018726 A1 | 1/2003 | Low et al. |
| 2003/0023875 A1 | 1/2003 | Hursey et al. |
| 2003/0028524 A1 | 2/2003 | Keskar et al. |
| 2003/0028595 A1 | 2/2003 | Vogt et al. |
| 2003/0037112 A1 | 2/2003 | Fitzpatrick |
| 2003/0043201 A1 | 3/2003 | Abdelhadi et al. |
| 2003/0046198 A1 | 3/2003 | Knapp et al. |
| 2003/0050916 A1 | 3/2003 | Ortega et al. |
| 2003/0055831 A1 | 3/2003 | Ryan |
| 2003/0065721 A1 | 4/2003 | Roskind |
| 2003/0084103 A1 | 5/2003 | Weiner et al. |
| 2003/0088554 A1 | 5/2003 | Ryan |
| 2003/0093483 A1 | 5/2003 | Allen et al. |
| 2003/0093580 A1 | 5/2003 | Thomas et al. |
| 2003/0101226 A1 | 5/2003 | Quine |
| 2003/0105822 A1 | 6/2003 | Gusler et al. |
| 2003/0131061 A1 | 7/2003 | Newton et al. |
| 2003/0140103 A1 | 7/2003 | Szeto et al. |
| 2003/0167324 A1 | 9/2003 | Farnham et al. |
| 2003/0172349 A1 | 9/2003 | Katayama |
| 2003/0182394 A1 | 9/2003 | Ryngler et al. |
| 2003/0187813 A1 | 10/2003 | Goldman et al. |
| 2003/0212804 A1 | 11/2003 | Hashemi |
| 2003/0225847 A1 | 12/2003 | Heikes et al. |
| 2003/0233416 A1 | 12/2003 | Beyda |
| 2003/0236835 A1 | 12/2003 | Levi et al. |
| 2004/0015548 A1 | 1/2004 | Lee |
| 2004/0015553 A1 | 1/2004 | Griffin et al. |
| 2004/0054729 A1 | 3/2004 | Fukuizumi et al. |
| 2004/0054736 A1 | 3/2004 | Daniell |
| 2004/0056901 A1 | 3/2004 | March et al. |
| 2004/0117443 A1 | 6/2004 | Barsness |
| 2004/0122681 A1 | 6/2004 | Ruvolo |
| 2004/0122810 A1 | 6/2004 | Mayer |
| 2004/0122855 A1 | 6/2004 | Ruvolo et al. |
| 2004/0128322 A1 | 7/2004 | Nagy |
| 2004/0128356 A1 | 7/2004 | Bernstein et al. |
| 2004/0179039 A1 | 9/2004 | Blattner et al. |
| 2004/0186738 A1 | 9/2004 | Reisman |
| 2004/0201624 A1 | 10/2004 | Crawford |
| 2004/0210844 A1 | 10/2004 | Pettinati et al. |
| 2004/0215648 A1 | 10/2004 | Marshall |
| 2004/0215721 A1 | 10/2004 | Szeto et al. |
| 2004/0215793 A1 | 10/2004 | Ryan |
| 2004/0221309 A1 | 11/2004 | Zaner |
| 2004/0260762 A1 | 12/2004 | Fish |
| 2005/0004989 A1 | 1/2005 | Satterfield et al. |
| 2005/0015432 A1 | 1/2005 | Cohen |
| 2005/0021750 A1 | 1/2005 | Abrams |
| 2005/0027382 A1 | 2/2005 | Kirmse et al. |
| 2005/0038688 A1 | 2/2005 | Collins et al. |
| 2005/0038856 A1 * | 2/2005 | Krishnasamy et al. ....... 709/206 |

(56) References Cited

U.S. PATENT DOCUMENTS

| | | |
|---|---|---|
| 2005/0043989 A1 | 2/2005 | Shifrin |
| 2005/0044152 A1 | 2/2005 | Hardy et al. |
| 2005/0050143 A1 | 3/2005 | Gusler et al. |
| 2005/0055416 A1 | 3/2005 | Heikes |
| 2005/0055450 A1 | 3/2005 | Gang |
| 2005/0060377 A1 | 3/2005 | Lo et al. |
| 2005/0076240 A1 | 4/2005 | Appleman |
| 2005/0076241 A1 | 4/2005 | Appleman |
| 2005/0080859 A1 | 4/2005 | Lake |
| 2005/0080863 A1 | 4/2005 | Daniell |
| 2005/0086211 A1 | 4/2005 | Mayer |
| 2005/0091311 A1 | 4/2005 | Lund et al. |
| 2005/0102202 A1 | 5/2005 | Linden et al. |
| 2005/0102257 A1 | 5/2005 | Onyon et al. |
| 2005/0114229 A1 | 5/2005 | Ackley et al. |
| 2005/0153681 A1 | 7/2005 | Hanson |
| 2005/0154913 A1 | 7/2005 | Barriga et al. |
| 2005/0171799 A1 | 8/2005 | Hull et al. |
| 2005/0173824 A1 | 8/2005 | Rafferty et al. |
| 2005/0177486 A1 | 8/2005 | Yeager |
| 2005/0197846 A1 | 9/2005 | Pezaris |
| 2005/0198131 A1 | 9/2005 | Appelman |
| 2005/0198172 A1 | 9/2005 | Appelman |
| 2005/0198173 A1 | 9/2005 | Evans |
| 2005/0198268 A1 | 9/2005 | Chandra |
| 2005/0216300 A1 | 9/2005 | Appelman |
| 2005/0246420 A1 | 11/2005 | Little |
| 2006/0031366 A1 | 2/2006 | Dolph |
| 2006/0031772 A1 | 2/2006 | Valeski |
| 2006/0075044 A1 | 4/2006 | Fox et al. |
| 2006/0129678 A1 | 6/2006 | Morita |
| 2006/0167991 A1 | 7/2006 | Heikes et al. |
| 2006/0168054 A1 | 7/2006 | Burkhart et al. |
| 2006/0173963 A1 | 8/2006 | Roseway et al. |
| 2006/0182248 A1 | 8/2006 | Smith et al. |
| 2006/0190536 A1 | 8/2006 | Strong et al. |
| 2006/0212561 A1 | 9/2006 | Feng |
| 2006/0248573 A1 | 11/2006 | Pannu et al. |
| 2006/0277187 A1 | 12/2006 | Roese et al. |
| 2007/0156664 A1 | 7/2007 | Norton et al. |
| 2007/0250566 A1 | 10/2007 | Appelman |
| 2008/0082620 A1 | 4/2008 | Barsness |
| 2008/0115087 A1 | 5/2008 | Rollin et al. |
| 2008/0186164 A1* | 8/2008 | Emigh et al. ............ 340/539.13 |
| 2008/0228598 A1 | 9/2008 | Leff et al. |
| 2008/0255989 A1 | 10/2008 | Altberg |
| 2009/0043844 A1 | 2/2009 | Zimmet |
| 2009/0070306 A1 | 3/2009 | Stroe |
| 2009/0089316 A1 | 4/2009 | Kogan et al. |
| 2010/0205546 A1 | 8/2010 | Appelman |
| 2012/0005078 A1 | 1/2012 | Pitoda et al. |
| 2013/0073556 A1 | 3/2013 | Valeski |
| 2013/0080529 A1 | 3/2013 | Appelman |

FOREIGN PATENT DOCUMENTS

| | | |
|---|---|---|
| GB | 2319137 | 5/1998 |
| GB | 2357932 A | 7/2001 |
| GB | 2368747 | 5/2002 |
| JP | 2008-314826 | 11/1996 |
| JP | 2000-049901 | 2/2000 |
| JP | 2000-499001 | 2/2000 |
| JP | 2000-259514 | 9/2000 |
| JP | 2000-284999 | 10/2000 |
| JP | 2001-084320 | 3/2001 |
| WO | WO 97/10558 | 3/1997 |
| WO | WO 97/14234 | 4/1997 |
| WO | WO 97/46955 | 12/1997 |
| WO | WO 98/16045 | 4/1998 |
| WO | WO 98/47270 | 10/1998 |
| WO | WO 99/08434 | 2/1999 |
| WO | WO 99/34628 | 7/1999 |
| WO | WO 99/48011 | 9/1999 |
| WO | WO 00/16201 | 3/2000 |
| WO | WO 00/24154 | 4/2000 |
| WO | WO 00/60809 | 10/2000 |
| WO | WO 00/79396 | 12/2000 |
| WO | WO 01/06748 | 1/2001 |
| WO | WO 01/06748 A | 1/2001 |
| WO | WO 01/22258 | 3/2001 |
| WO | WO 01/24036 | 4/2001 |
| WO | WO 01/43357 | 6/2001 |
| WO | WO 01/67787 | 9/2001 |
| WO | WO 01/72020 | 9/2001 |
| WO | WO 01/80079 | 10/2001 |
| WO | WO 02/03216 | 1/2002 |
| WO | WO 02/03216 A | 1/2002 |
| WO | WO 02/09437 | 1/2002 |
| WO | WO 02/35781 | 5/2002 |
| WO | WO 02/062039 | 8/2002 |
| WO | PCT 02/073886 | 9/2002 |
| WO | WO 02/073886 | 9/2002 |
| WO | WO 2004/28178 | 4/2004 |
| WO | WO 2004/028178 | 4/2004 |
| WO | WO 2005/086723 | 9/2005 |
| WO | WO 2005/089286 | 9/2005 |
| WO | WO 2006/068955 | 6/2006 |

OTHER PUBLICATIONS

Gupta et al., "A Reputation System for Peer-to-Peer Networks," Jun. 1-3, 2003, NOSSDAV'03, Monterey, California, pp. 144-152.
"About Internet directory services," Outlook 2000 SR-1 (9.0.0.4527) Help File, on or before Aug. 10, 2001, p. 1.
"Active Directory Features," [online], Jun. 15, 1999 [retrieved on May 13, 2003]. Retrieved from the Internet <http://www.microsoft.com/windows2000/server/evaluation/features/adlist.asp>, pp. 1-4.
"Active Directory Service Overview," [online], Nov. 30, 2001 [retrieved on May 13, 2003]. Retrieved from the Internet <http://www.microsoft.com/windows2000/server/evaluation/business/ad-datasheet.asp>, pp. 1-5.
"Active Directory," [online], [retrieved on May 13, 2003]. Retrieved from the Internet <http://www.microsoft.com/windows2000/technologies/directory/AD/default.asp>, pp. 1-13.
Alan Cohen, "Instant Messaging", Apr. 13, 1999, PC Magazine, PC Labs, 2 pages.
America Online Inc., "AOL Instant Messenger", Aug. 29, 2000, Internet: www.aol.com/aim/, 1 page.
America Online Inc., New AIM 4.7, Sep. 27, 2001, Internet: http://aim.aol.com, 1 page.
Anand Ranganathan et al., "ConChat: A Context-Aware Chat Program", 2002, Pervasive Computing, pp. 51-57.
Maurice L. Marvin, "Announce: Implementation of E-mail Spam Proposal," news.admin.net-abuse.misc, Aug. 3, 1996, 2 pages.
"AOL Instant Messenger Windows Beta Features," Jun. 24, 1999, 2 pages, AOL Instant Messenger All New Version 2.0, 2 pages, Jun. 24, 1999, What is AOL Instant Messenger, 3 pages, Jun. 24, 1999, Quick Tips for Getting Started, 5 pages, Jun. 24, 1999, Frequently Asked Questions About AOL Instant Messenger, 6 pages, Jun. 24, 1999, total 18 pages.
"AOL technology: turning complicated things into an engaging services", 1996 Annual Report, 22 pages.
"Benefits of Active Directory in a Windows 2000 Environment," [online], Sep. 20, 2001 [retrieved on May 13, 2003]. Retrieved from the Internet <http://www.microsoft.com/windows2000/server/evaluation/business/adwin2k.asp>, pp. 1-9.
"BestCalls.com Announces the BestCalls Technology Index," Business Wire, Jun. 30, 1999, Business Wire, 1 page.
"Better Bayesian Filtering," Paul Graham, Jan. 2003, pp. 1-11, http://www.paulgraham.com/better.html.
BuddyGopher~About, available on Jul. 13, 2004, reprinted from http://web.archive.org/web/20040713002836/www.buddygopher.com/about.html on Sep. 28, 2005, 4 pages.
BuddyGopher~We Love Away Messages!, "BuddyGopher simultaneously checks the away messages of your favorite AIM® buddies.", available on Sep. 24, 2004, reprinted from http://web.archive.org/web/20040924104001/http://www.buddygopher.com/ on Sep. 28, 2005, 2 pages.

(56) References Cited

OTHER PUBLICATIONS

Business at Cyberspeed; Brainstorm Becomes Quick Internet Hit, Walker, Jan. 24, 1999, The Washington Post, p. A01, total 4 pages.
Carlos Jensen et al., "Finding Others Online: Reputation Systems for Social Online Spaces", Apr. 2002, Paper: Group Spaces, pp. 447-454.
CNET Networks Inc., "PopUp Killer", Sep. 13, 2001, Internet: download.cnet.com/downloads/0-10059-100-6932612.html, 1 page.
International Search Report and Written Opinion dated Feb. 15, 2006 for International Application No. PCT/US05/07204, 10 pages.
International Search Report issued in Application Serial No. PCT/US05/08476, dated Oct. 16, 2006, 9 pages.
International Search Report mailed Aug. 30, 2005 for International Application No. EP03731244. 4 pages.
Notice of Allowance for U.S. Appl. No. 10/184,002, dated Jul. 24, 2008, 20 pages.
Office Action issued in U.S. Appl. No. 10/981,460, dated Aug. 20, 2008, 24 pages.
Office Action issued in U.S. Appl. No. 10/334,056, dated Nov. 5, 2007, 21 pages.
Office Action issued in U.S. Appl. No. 10/334,056, dated May 21, 2007, 7 pages.
Office Action issued in U.S. Appl. No. 10/334,056, dated May 10, 2007, 7 pages.
Office Action issued in U.S. Appl. No. 10/334,056, dated Oct. 31, 2005, 7 pages.
Office Action issued in U.S. Appl. No. 10/334,056, dated Jul. 6, 2005, 24 pages.
Office Action issued in U.S. Appl. No. 10/334,056, dated Nov. 29, 2004, 22 pages.
Office Action issued in U.S. Appl. No. 10/334,056, dated May 12, 2008, 22 pages.
Office Action issued in U.S. Appl. No. 11/015,424, dated Mar. 19, 2008, 43 pages.
Office Action issued in U.S. Appl. No. 11/017,204, dated Dec. 12, 2007, 13 pages.
Office Action issued in U.S. Appl. No. 11/017,204 dated Jun. 23, 2008, 33 pages.
Office Action issued in U.S. Appl. No. 11/015,424, dated Nov. 3, 2008, 49 pages.
Office Action issued in U.S. Appl. No. 10/134/437 dated Sep. 18, 2008, 32 pages.
Office Action issued in U.S. Appl. No. 10/134/437, dated Mar. 10, 2009, 31 pages.
Office Action issued in U.S. Appl. No. 10/184,002, dated Jan. 8, 2008, 19 pages.
Office Action issued in U.S. Appl. No. 11/238,110 dated Jul. 9, 2008, 11 pages.
Office Action issued in U.S. Appl. No. 11/238,110 dated Oct. 9, 2008, 12 pages.
Office Action issued in U.S. Appl. No. 11/238,110, dated Nov. 29, 2007, 11 pages.
Office Action issued in U.S. Appl. No. 11/238,129 dated May 28, 2008, 70 pages.
Office Action issued in U.S. Appl. No. 11/238,129 dated Nov. 14, 2007, 35 pages.
Office Action issued in U.S. Appl. No. 11/238,130 dated Apr. 14, 2009, 35 pages.
Office Action issued in U.S. Appl. No. 11/238,130 dated Nov. 13, 2008, 45 pages.
Office Action issued in U.S. Appl. No. 11/238,130 dated Jul. 3, 2008, 22 pages.
Supplementary European Search Report issued in European Application No. EP05728303, dated Jan. 9, 2009, 2 pages.
Courter et al., "Mastering Microsoft Outlook 2000 Premium Edition", Sybex Inc., Alameda, California, 2000, ISBN 0-7821-2676-6, pp. 167-169.
"CrushParty.com: Help," retrieved Jun. 12, 2002 from the World Wide Web: http://www.crushparty.com/help.jsp, 3 pages.
"Degrees of Separation Email Spam Protection," Halfbakery: Degrees of Separation Email Spam Protection, reprinted from http://halfbakery.com/idea/Degrees_20of_20Separation_20Email_20Spam_20Protecti . . . printed on Mar. 1, 2004, 3 pages.
"Digital Artifacts for Remembering and Storytelling: Post History and Social Network Fragments," Viegas et al., retrieved from the World Wide Web: http://we.media.mit.edu/~fviegas/papers/posthistory_snf.pdf, 2004, 10 pages.
"Directory Integration Can Lower Total Cost of Ownership and Increase Application Functionality," [online], Jul. 27, 1998 [retrieved on May 13, 2003]. Retrieved from the Internet <http://www.microsoft.com/presspass/press/1998/Jul98/ActivDPR.asp>, pp. 1 of 4.
Dodgeball.com:: mobile social software, "help: the basics", available on Oct. 9, 2004, reprinted from http://web.archive.org/web/20041009200739/www.dodoeball.com/social/help_basics.php on Sep. 28, 2005, 2 pgs.
Dodgeball.com:: mobile social software, "help: use it", available on Oct. 9, 2004, reprinted form http://web.archive.org/web/20041009201853/www.dodgeball.com/social/help_uself.php on Sep. 28, 2005, 2 pgs.
Dodgeball.com:: mobile social software, "help:text messaging", available on Oct. 13, 2004, reprinted from http://web.archive.org/web/20041013034241/www.dodgeball.com/social/help_text.php on Sep. 28, 2005, 3 pgs.
Dodgeball.com:: mobile social software, "Hook up with friends. Discovery what's around you", available on Nov. 30, 2003, reprinted from http://web.archive.org/web/20041130034344/www.dodgeball.com/social/index.php Sep. 28, 2005, 2 pgs.
Ed Bott et al., and Ron Person, Using Windows 95 with Internet Explorer 4.0, Feb. 17, 1998, Quo, Special Edition, 13 pages.
E"nterprise Identity Management with Windows 2000 and Active Directory," [online], 1999 [retrieved on May 13, 2003]. Retrieved from the Internet <http://www.microsoft.com/technet/prodtechnol/ad/windows2000/evaluate/w2keims.asp?fra . . . >, pp. 1-16.
Eschenburg, WO laufen sie den?, Oct. 26, 1998, pp. 92-95.
"Finding Others Online: Reputation Systems for Social Online Spaces," Jensen et al., Apr. 20-25, 2002, CHI, Minneapolis, Minnesota, vol. 4, Issue 1, pp. 447-454.
Home-tribe.net, http://washingtondc.tribe.net/message/24434dlb-817b-4580-aa42-3bffa15f26a?page+1, retrieved on Dec. 13, 2004, 4 pages.
"Hottie or Nottie? Web Site Voters Let You Know Whether You Sizzle or Fizzle," Marino, Jul. 11, 2001, Florida Times Union, p. C.1, 2 pages.
http://www.friendster.com, retrieved on Dec. 13, 2004, 17 pages.
"Icq anywhere, Email Features—Email Center—ICQ.com," retrieved Apr. 29, 2004 from the World Wide Web: http:///www.icq.com/email/popular-features.html, pp. 1-5.
"Idea for Online Networking Brings Two Entrepreneurs Together," Patents: Idea for Online Networking Brings Two Entrepreneurs Together, reprinted from http://www.nytimes.com/2003/12/01/technology/01patt.html?adxnnl=0&adxnnlx=107029 . . . , printed on Nov. 5, 2004, 3 pages.
"Instant Messaging for Gamers," PC Gamer, May 2004, vol. 11, No. 5, p. 28.
"Integrating Applications with Windows 2000 and Active Directory," [online], Oct. 2000 [retrieved on May 8, 2003]. Retrieved from the Internet <http://www.microsoft.com/technet/prodtechnol/ad/windows2000/evaluate/adappstr.asp?fra . . . >, pp. 1-12.
"Integrating Microsoft Metadirectory Services and Active Directory," [online], Aug. 31, 2000 [retrieved on May 13, 2003]. Retrieved from the Internet <http://www.microsoft.com/windows2000/server/evaluation/news/bulletins/mmsma.asp>, p. 1.
International Search Report, Application No. PCT/US2006/018286, dated Oct. 19, 2006, 12 pages.
International Search Report, Application No. PCT/US05/45663, dated Apr. 11, 2008, 10 pages.
J.C. Cannon, "Design Guide for Directory-Enabled Applications," [online], Apr. 2001 [retrieved on May 13, 2003]. Retrieved from the Internet <http://msdn.microsoft.com/library/en-us/dnactdir/html/deal.asp?frame=true>, pp. 1-18.
Kohda et al., IMPP: A new Instant Messaging Standard and Its Impact on Internet Business, Dec. 2000, Fujitsu Sci, Tech. J., pp. 147-153.

(56) References Cited

OTHER PUBLICATIONS

"Learning Spam: Simple Techniques for Freely-Available Software," Bart Massey et al., Computer Science Dept., Portland, OR USA, 2003, pp. 1-14.

Androutsopoulos et al., "Learning to Filter Spam E-Mail: A Comparison of a Naïve Bayesian and a Memory-Based Approach," University of Athens, Sep. 2000, pp. 1-12.

"Look up contact information from an item," Outlook 2000 SR-1 (9.0.0 4527) Help File on or before Aug. 10, 2001, p. 1.

"Lotus Instant Messaging Everyplace FAQ," retrieved Apr. 29, 2004 from the World Wide Web: http://www.lotus.com/products/product4.nsf/wdocs/249c6f083166cd3e85256d7300714407, pp. 1-3.

Mary Beth Marklein, "Student have 'away' with words", Mar. 28, 2004, USA Today, http://www.usatoday.com/tech/news/2004-03-28-aways-messages-usat_x.htm, 4 pages.

Mckendrick, Joseph; "Internet Call Centers: New Era in Customer Service"; Feb. 2002; V10, n2, p. 22.

Microsoft Corporation, "Active Directory Services Interface in the Microsoft Exchange 5.5 Environment," [online], Nov. 1997 [retrieved on May 13, 2003]. Retrieved from the Internet <http://msdn.microsoft.com/library/en-us/dnactdiir/html/msdn_adsiexch.asp?frame=true>, pp. 1-12.

Microsoft Corporation, "Comparing Microsoft Active Directory to Novell's NDS," [online], Sep. 1998 [retrieved on May 13, 2003]. Retrieved from the Internet <http://msdn.microsoft.com/library/en-us/dnactdir/html/msdn_activedirvsnds.asp?frame=true>, pp. 1-17.

Microsoft Corporation, "Introduction to Active Directory Application Mode," Microsoft Windows Server 2003, Aug. 2002, pp. 1-13.

Microsoft Corporation, "Using ADSI, LDAP, and Network Management Functions With Active Directory," [online], Feb. 2002 [retrieved on May 13, 2003]. Retrieved from the linternet <http://msdn.microsoft.com/library/en-us/dnactdir/html/BuildingADApps.asp?frame=true>, pp. 1-9.

Mutton, Paul, "PieSpy Social Network Bot Inferring and Visualizing Social Networks IRC," Dec. 4, 2003, Internet Archive Wayback Machine http://web.archive.org/web/20031204185952/http://jibble.org/piespy, 17 pages.

Neo Mai, Ken Neo. "Buying and selling on the internet; [Computimes, 2* Edition]." New Straits Times. Kuala Lumpur: Jun. 28, 2001. p. 53.

Office Action, U.S. Appl. No. 10/134,437, dated Feb. 11, 2008, 34 pages.

Office Action, U.S. Appl. No. 10/146,814, dated Dec. 11, 2006, 15 pages.

Office Action, U.S. Appl. No. 10/146,814, dated Jul. 2, 2007, 18 pages.

Office Action, U.S. Appl. No. 10/184,002, dated Jan. 9, 2007, 16 pages.

"Part I: Active Directory Operations," Active Directory Operations Guide, Microsoft Corporation, Microsoft Windows 2000, Version 1.5, Dec. 5, 2002, pp. 1-187.

"Part II: Tasks and Procedures Appendices," Active Directory Operations Guide, Microsoft Corporation, Microsoft Windows 2000, Version 1.5, Dec. 5, 2002, pp. 1-131.

"PieSpy—Inferring and Visualizing Social Network on IRC," PieSpy Social Network Bot, reprinted from http://lister.linux-srv.anlx.net/piespy printed on Mar. 11, 2004, 18 pages.

"Plaxo," Plaxo, reprinted from http://web.archive.org/web/20041105072256/http://www.plaxo.com/ printed on Nov. 5, 2004 (available on Feb. 14, 2004), 2 pages.

"Plaxo-Update Your Address Book," Plaxo Contact Networks, reprinted from http://web.archive.org/web/20030218233638/http://www.plaxo.com/, printed on Nov. 5, 2004, available on Feb. 18, 2003, 1 page.

R. Movva & W. Lai, "MSN Messenger Service 1.0 Protocol", Aug. 1999, Internet Draft, http://tools.ietf.org/id/draft-movva-msn.messenger-protocol-oo.txt, 28 pages.

Danah Boyd, "Reflections on Friendster, Trust and Intimacy," *Ubicomp 2003*, Workshop Application for the Intimate Ubiquitous Computing Workshop. Seattle, WA, Oct. 12-15, 2003, 4 pages.

Reichard, K., "AOL, ICQ/ to Interoperate—But in a Limited Fashion," Oct. 30, 2002, Instant MessagingPlanet, available at www.instantmessagingplanet.com/public/article.php/1490771, 4 pages.

"Reputation Systems," Resnick et al., Dec. 2000, Communications of the ACM, vol. 43, No. 12, pp. 45-48.

"RIMM Road: Software: Internet & Network: Webmessenger RIM J2ME/Instant Messaging," retrieved Apr. 29, 2004 from the Word Wide Web: http://www.rimmroad.com/software/rim1/Webmessenger-RIM-J2ME-Intant-Messaging-20 . . . , pp. 1-4.

Ryze home page, www.ryze.com, Dec. 21, 2003, available at htto://web.archive.org/web/20031221010006/http://ryze.com, printed Mar. 16, 2005, 13 pages.

Set up LDAP directory services, Outlookk 2000 SR-1 (9.0.0. 4527) Help File, on or before Aug. 10, 2001, p. 1.

Bulkeley et al. "Six Degrees—New Programs Help Companies 'Mine Workers' Relationships for Key Business Prospects," Marketplace, The Wall Street Journal, Aug. 4, 2003, 3 pages.

"Social Nets Find Friends in VCs," Joanna Glasner, http://wired.com/news, Nov. 17, 2003, pp. 1-3.

Boyd et al. "Social Network Fragments: An Interactive Tool for Exploring Digital Social Connections," Sketch at *SIGGRAPH 2003*. San Diego, California: ACM, Jul. 27-31, 2003, 3 pages.

Esther Dyson, "Social Networking for Business: Release 0.5," Esther Dyson's Monthly Report, vol. 21, No. 10, Nov. 25, 2003, www.edventure.com, 36 pages.

"Social Sites Clicking With Investors," Washingtonpost.com: Social Sites Clicking With Investors, reprinted from http://www.washingtonpost.com/ac2/wp-dyn/A32066-2003Nov12?language=printer printed on Nov. 5, 2004. 2 pages.

"Social Social Networks: Deodorant for the Soul?," Esther Dyson, Esther Dyson's Monthly Report, vol. 21, No. 11, Dec. 12, 2003, www.edventure.com, 36 pages.

Hattori et al., "Socialware: Multiagent Systems for Supporting Network Communities," Mar. 1999, Association for Computing Machinery, Communications of the ACM, vol. 42, Issue 3, p. 55.

"Spoke Builds on Social Networking Patent Portfolio," Spoke Builds on Social Networking Patent Portfolio, reprinted from http://www.internetnews.com/ent-news/print.php/3073621 printed on Nov. 5, 2004, 3 pages.

"Support Vector Machines for Spam Categorization," Harris Drucker et al., IEEE Transactions on Neural Networks, vol. 10, No. 5, Sep. 1999, pp. 1048-1054.

"Support Vector Machines," Marti Hearst, IEEE Intelligent Systems, Jul./Aug. 1998, pp. 18-28.

Kolcz et al., "SVM-based Filtering of E-mail Spam with Content-specific Misclassification Costs," *TextDM'2001* (*IEEE ICDM-2001 Workshop on Text Mining*), San Jose, CA, 2001, pp. 1-14.

"SWF Seeks Attractive Head Shot; To Stand Out, Online Daters Pay for Professional Photos; Cropping out the Ex-Wife," Leiber, Nov. 19, 2003, The Wall Street Journal, p. D.1.

Yoshino et al., "Namba: Location-Aware Collaboration System for Shopping and Meeting", Aug. 2002, IEEE Transactions on Consumer Electronics, pp. 470-477.

Shane Hird, "Technical Solutions for Controlling Spam," Proceedings of AUUG2002, Melbourne, Sep. 4-6, 2002, 17 pages.

"Technology Journal—Are You Satisfied? EBay's Battle Against Fraud Rests Primarily on a Simple Concept: Customer Feedback," Wingfield, Sep. 23, 2002, Asian Wall Street Journal, p. T.8, 4 pages.

Nick Wingfield, "Technology Journal: Changing Chat—Instant Messaging is Taking Off, and for Some Users It's Nuzzling Out the Phone," Asian WSJ; Sep. 2000, 5 pages.

J. Dudley, "Telstra targets Net spammers," news.com.au, Dec. 2, 2003, 2 pages.

Thorsten Joachims, "Text Categorization with Support Vector Machines: Learning with Many Relevant Features," University of Dortmund, Computer Science Dept., LS-8 Report 23, 1998, 18 pages.

"The first Social Software . . . A true Social Adventure," Huminity-Social Networking, Chat Software, Create Personal Free Blogs and My Group . . . , reprinted from http://www.huminity.com/ printed on Nov. 5, 2004, 2 pages.

(56) References Cited

OTHER PUBLICATIONS

"The LP Wireless Messenger", Messenger Documentation, [online], LP Wireless, Inc., 2001 [retrieved on Nov. 2, 2002]. Retrieved from the Internet, http://Ipwireless.com/messengerhelp.htm>, pp. 1-7.
"Trillian Discussion Forums—HOWTO: Import ICQ 2003a Contact List," retrieved Apr. 29, 2004 from the World Wide web: http://trillion.cc/forums/showthread.php?s+&threaded=36475, pp. 1-2.
William R. Stanek, "Using Active Directory Service", from Chapter 5 Microsoft Windows 2000 Administrator's Pocket Consultant, 1999. Retrieved from http://www.microsoft.com/technet/prodtechnol/ad/windows2000/evaluate/05w2kadb.asp?fr . . . , pp. 1-6.
VisiblePath webpages, www.visiblepath.org, Dec. 3, 2003, available at http://web.archive.org/web/20031203132211/http://www.visiblepath.com, printed Mar. 16, 2005, 5 pages.
WebmasterWorld.com Inc., "HTML and Browsers", Mar. 5, 2001, Internet: www.webmaster.com/forum21/367.htm, 1 page.
"Welcome to Huminity World of Connections," Huminity-Home, reprinted from http://web.archive.org/web/20030228131435/www.huminity.com/default.php?Internationa . . . printed on Nov. 15, 2004 (available on Feb. 2, 2003), 1 page.
"What's new about exchanging information over the Internet," Outlook 2000 SR-1 (9 0.0.4527) Help File, on or before Aug. 10, 2001, p. 1.
Leander Kahney, "Will You Buy a Car From This Man?," Oct. 6, 2003, pp. 1-3.
William R. Stanek, Microsoft Windows 2000 Administrator's Pocket Consultant [online]. Microsoft Corporation, 1999 [retrieved on May 8, 2003]. Retrieved from the Internet, http://www.microsoft.com/technet/prodtechnol/ad/windows2000/evaluate/05w2kadb.asp?fra . . . >, pp. 1-10.
William R. Stanek, Microsoft Windows 2000 Administrator's Pocket Consultant [online]. Microsoft Corporation, 1999 [retrieved on May 8, 2003]. Retrieved from the Internet. <http://www.microsoft.com/technet/prodtechnol/ad/windows2000/evaluate/05w2kadb.asp?fra . . . >, pp. 1-6.
Windows 2000 Directory Services, [online], [retrieved on May 13, 2003]. Retrieved from the Internet <http://www.microsoft.com/windows2000/technologies/directory/default.asp>, p. 1-2.
"Working with Active Directory Domains", from Chapter 5, *Microsoft Windows 2000 Administrator's Pocket consultant*, by William R. Stank (1999). Retrieved from http://www.microsoft.com/technet/prodtechnol/ad/windows2000/evaluate/05wk2kadb.asp?fr . . . , pp. 1-10.
"Yahoo! Messenger Makes the World a Little Smaller, More Informed", pp. 1-2, Jun. 21, 1999.
ZeroDegrees home page, www-zerodegrees.com, Jan. 24, 2004, available at http://web.archive.org/web/20040204153037/www.zerodegrees.com/home.htm, printed Mar. 16, 2005, 2 pages.
"A Countermeasure to Duplicate-detecting Anti-spam Techniques," Robert J. Hall, AT&T Labs Technical Report 99.9.1, 1999, Abst. and pp. 1-26.
"A Reputation System for Peer-to-Peer Networks," Gupta et al., Jun. 1-3, 2003, NOSSDAV'03, Monterey, California, pp. 144-152.
"About File Transfers", AOL Instant Messenger, version 4.3, Help Documentation, available on Jul. 21, 2001, 5 pages.
"AOL Instant Messenger", reprinted from http://web.archive.org/web/20010721193059/http://aim.com/ (Way Back Machine—available on Jul. 21, 2001) on Aug. 26, 2005, 7 pages.
"Frequently Asked Questions About AOL Instant Messenger", 6 pages, Jun. 24, 1999.
"GLWebMail 2.0 is released!" http://www.gordano.com; available on Apr. 18, 2001, reprinted from http://web.archive org/web/20010418153714//http://www.gordano.com, 2 pages.
"Internet Call Centers: New Era in Customer Service", Joseph McKendrick, Aug. 18, 2005, 4 pages.
"Introducing the Gordano Messaging Suite"; http://www.gordano.com; Copyright 1994-2003, 2 pages.

"Learning to Filter Spam E-Mail: A Comparison of a Naïve Bayesian and a Memory-Based Approach," Ion Adroutsopoulos et al., University of Athens, Sep. 2000, pp. 1-12.
"New Features in AOL Instant Messenger for Windows v. 2.01 Beta", 2 pages, Apr. 28, 1999.
"Quick Tips for Getting Started", 5 pages, Jun. 24, 1999.
"Reflections on Friendster, Trust and Intimacy," Danah Boyd. *Ubicomp 2003*, Workshop Application for the Intimate Ubiquitous Computing Workshop. Seattle, WA, Oct. 12-15, 2003, 4 pages.
"Socialware: Multiagent Systems for Supporting Network Communities," Hattori et al., Mar. 1999, Association for Computing Machinery, Communications of the ACM, vol. 42, Issue 3, 6 pages.
"The LP Wireless Messenger", Messenger Documentation, http://www.Ipwireless.com/messengerhelp.htm available on Dec. 9, 2002, reprinted from http://web.archive.org/web20021209025321/http://Ipwireless.com/messengerhelp-htm, 7 pages.
"Using Active Directory Service", from Chapter 5, Microsoft Windows 2000 Administrator's Pocket Consultant, by William R. Stank (1999). Retrieved from http://www.microsoft.com/technet/prodtechnol/ad/windows2000/evaluate/05w2kadb.asp?fr . . . , pp. 1-6.
"What is AOL Instant Messenger", Jun. 24, 1999, 3 pages.
"Windows 2000 Directory Services," [online], [retrieved on May 13, 2003). Retrieved from the Internet http://www.microsoft.com/Windows2000/technologies/director/default.asp, pp. 1-2.
"Windows NetMeeting—Features", [Online], Jun. 17, 1999, XP002245623, Retrieved from the Internet: URL:http://www.microsoft.com/windows/NetMeeting/Features/default.ASP>, 8 pages.
Announce: Implementation of E-mail Spam Proposal, Maurice I. Marvin, news.admin.net-abuse.misc, Aug. 3, 1996, 2 pages.
Anonymous: "Push to Talk™ Services", Internet Document, [Online], p. 1, Retrieved from the Internet: URL:http://www.nextel.com/services/directconnect/ptt_overview.shtml 1 page.
Anonymous: "The Internet—the Advent of New Forms of Communication", Internet Document, [Online], pp. 1-4, Retrieved from the Internet: URL:http://journal.fujitsu.com/248e/e48now.htm 3 pages.
Archive.org archived the Morpheus 1.9.1 download page on clnet Download.com [online] Jun. 20, 2002, Retrieved from Internet, URL:http://web.archive.org/web/20020803071751/download.com/3000-2166-10057840.html>, 2 pages.
Archive.org archived the Morpheus 1.9.1 download page on clnet Download.com [online] Apr. 12, 2001, (2 pages).
Australian Office Action of Apr. 7, 2006, App. No. 2002340039 (2 pages).
Canadian Office Action from Application Serial No. 2,403,520, dated Feb. 21, 2005, 2 pages.
Chinese Office Action of Jul. 7, 2006, App. No. 02821420X (5 pages).
International Search Report for International Application No. PCT/US03/15715, mailed Aug. 14, 2003.
Office Action mailed approximately Feb. 29, 2006 for Japanese Patent Application No. 2002515026 (6 pages).
Dutta-Roy Amitava, "Virtual Meetings with Desktop Conferencing", IEEE Spectrum, vol. 35, No. 7, Jul. 1, 1998, pp. 47-56 and p. 66.
European Office Action in Application No. 01954931.0-2414, mailed Jul. 14, 2008, 3 pages.
European Patent Office, Communication of Aug. 30, 2005, App. No. 03731244.4-2416 (PCT/US0315715) (4 pages).
European Patent Office, Communication of Aug. 31, 2009, App. No. 02778374.5-1238 (8 pages).
European Patent Office, Communication of Sep. 5, 2006, App. No. 02778374.5-1238 (4 pages).
European Search Report mailed Aug. 30, 2005 for European Application No. 03731244 (4 pages).
Examiner's Answer mailed Jan. 10, 2008 in U.S. Appl. No. 09/810,159, 11 pages.
Examiner's Answer mailed May 17, 2002 in U.S. Appl. No. 10/146,814, 19 pages.
Final Office Action mailed Apr. 29, 2005, from U.S. Appl. No. 09/911,799 (15 pages).
Final Office Action mailed Apr. 29, 2008, from U.S. Appl. No. 10/747,679 (22 pages).

(56) References Cited

OTHER PUBLICATIONS

Final Office Action mailed Aug. 11, 2006, from U.S. Appl. No. 09/911,799 (12 pages).
Final Office Action mailed Aug. 21, 2007, from U.S. Appl. No. 10/747,623 (17 pages).
Final Office Action mailed Jun. 23, 2008, from U.S. Appl. No. 10/747,623 (18 pages).
Final Office Action mailed Mar. 18, 2009, from U.S. Appl. No. 09/911,799 (27 pages).
Final Office Action mailed Nov. 1, 2007, from U.S. Appl. No. 10/747,624 (17 pages).
IBM "Configuring Sametime servers in your Domino environment" May 1, 2000 (14 pages).
International Search Report and Written Opinion dated Feb. 15, 2006 for International Application No. PCT/US05/07204, 14 pages.
International Search Report and Written Opinion for PCT Application No. PCT/US2005/042992, Mar. 6, 2007 (14 pages).
International Search Report, Application No. PCT/US05/45663, dated Apr. 11, 2008, 6 pages.
Isaacs, Ellen: "Example UI Spec: Sound Instant Messages", Internet Document, [Online], pp. 1-2. Retrieved from the Internet: URL:http://www.uidesions.com/spec/d-sims.html [retrieved on Jun. 26, 2003].
J.C. Cannon, "Design Guide for Directory-Enabled Applications," [online], Apr. 2001 [retrieved on May 13, 2003]. Retrieved from the Internet http://msdn.microsoft.com/library/en-us/dnactdir/html/deal.asp?frame=true>, pp. 1-18.
Japanese Office Action of May 12, 2008, App. No. 2003-533140 (7 pages).
Klaus Hartenstein et al., "xhtalk 2.9", © Nov. 1992, 6 pages.
Lotus Sametime 1.5 1999 (4 pages).
Mariano, Gwendolyn. ZDNetNews. "Morpheus 1.9 to be unleashed", [online] Jun. 10, 2002. Retrieved from Internet URL:http://news.zdnetcom/2100-3513 22-934615.html 6 pages.
Mary Beth Marklein, "Student have 'away' with words", Mar. 28, 2004, USA Roday, http://www.usatoday.com/tech/news/2004-03-28-aways-messages-usat_x.htm, 4 pages.
Matsumoto, Tatsuro et al.: "Chocoa Communicator—A New Communication System Based on Awareness and Text Communications—", Fujitsu Sci. Tech. J.,36,2, pp. 154-161, Dec. 2000.
Mike Snider, "America goes online for New Year's bash", USA Today, Jan. 2, 2000, 1 page.
Muller, Nathan, "Dial 1-800-Internet"; Feb. 1996, pp. 83-84, 86, 88.
Mutton, Paul, "PieSpy Social Network Bot Inferring and Visualizing Social Networks on IRC," Dec. 4, 2003, Internet Archive Wayback Machine http://web.archive.org/web/20040620221729/jibble.org/piespy, 11 pages.
Non-final Office Action in U.S. Appl. No. 09/810,159 mailed Jan. 29, 2010, 15 pages.
Notice of Allowability in U.S. Appl. No. 10/134,437, 3 pages.
Notice of Allowance and Fee(s) Due in U.S. Appl. No. 10/134,437 dated Oct. 2, 2009, 3 pages.
Office Action issued on Jul. 3, 2007 in U.S. Appl. No. 09/911,799, 18 pages.
Office Action dated Sep. 18, 2008, in U.S. Appl. No. 10/134,437, 30 pages.
Office Action for U.S. Appl. No. 10/633,636 mailed Oct. 11, 2006, 9 pages.
Office Action issued on Jan. 8, 2008 in U.S. Appl. No. 10/184,002, 10 pages.
Office Action issued on Jan. 11, 2008 in U.S. Appl. No. 09/810,159, 12 pages.
Office Action issued on Jan. 12, 2009 in U.S. Appl. No. 10/146,814, 19 pages.
Office Action issued on Jan. 29, 2010 in U.S. Appl. No. 09/810,159, 14 pages.
Office Action issued on Feb. 11, 2005 in U.S. Appl. No. 09/810/159, 10 pages.
Office Action issued on Feb. 26, 2007 in U.S. Appl. No. 10/747,624, 15 pages.
Office Action issued on Mar. 10, 2009 in U.S. Appl. No. 10/134,437, 31 pages.
Office Action issued on Mar. 13, 2007 in U.S. Appl. No. 10/747,623, 17 pages.
Office Action issued on Mar. 18, 2010 in U.S. Appl. No. 09/911,799, 5 pages.
Office Action issued on Mar. 22, 2010 in U.S. Appl. No. 10/146,814, 13 pages.
Office Action issued on Mar. 28, 2006 in U.S. Appl. No. 09/843,788, 20 pages.
Office Action issued on Mar. 30, 2004 in U.S. Appl. No. 09/843,788, 14 pages.
Office Action issued on Apr. 2, 2009 in U.S. Appl. No. 11/237,718, 19 pages.
Office Action issued on Apr. 7, 2008 in U.S. Appl. No. 11/150,180, 7 pages.
Office Action issued on Apr. 15, 2008 in U.S. Appl. No. 10/146,814, 16 pages.
Office Action issued on Apr. 19, 2006 in U.S. Appl. No. 09/810,159, 10 pages.
Office Action issued on Apr. 19, 2007 in U.S. Appl. No. 09/843,788, 13 pages.
Office Action issued on Apr. 20, 2006 in U.S. Appl. No. 10/184,002, 15 pages.
Office Action issued on Apr. 29, 2005 in U.S. Appl. No. 09/911,799, 16 pages.
Office Action issued on Apr. 29, 2008 in U.S. Appl. No. 10/747,679, 22 pages.
Office Action issued on May 5, 2010 in U.S. Appl. No. 09/843,788, 17 pages.
Office Action issued on May 18, 2006 in U.S. Appl. No. 10/134,437, 28 pages.
Office Action issued on May 22, 2006 in U.S. Appl. No. 10/146,814, 12 pages.
Office Action issued on Jun. 12, 2006 in U.S. Appl. No. 09/843,788, 3 pages.
Office Action issued on Jun. 15, 2005 in U.S. Appl. No. 09/810,159, 8 pages.
Office Action issued on Jul. 2, 2007 in U.S. Appl. No. 10/146,814, 17 pages.
Office Action issued on Jul. 6, 2004 in U.S. Appl. No. 09/810,159, 12 pages.
Office Action issued on Jul. 16, 2007 in U.S. Appl. No. 10/747,624, 7 pages.
Office Action issued on Jul. 27, 2005 in U.S. Appl. No. 09/843,788, 20 pages.
Office Action issued on Aug. 4, 2010 in U.S. Appl. No. 12/336,880, 12 pages.
Office Action issued on Aug. 11, 2006 in U.S. Appl. No. 09/911,799, 13 pages.
Office Action issued on Aug. 19, 2009 in U.S. Appl. No. 11/150,180, 11 pages.
Office Action issued on Aug. 21, 2006 in U.S. Appl. No. 10/134,437, 3 pages.
Office Action issued on Aug. 21, 2007 in U.S. Appl. No. 10/747,623, 18 pages.
Office Action issued on Aug. 25, 2005 in U.S. Appl. No. 10/184,002, 13 pages.
Office Action issued on Sep. 6, 2007 in U.S. Appl. No. 10/134,437, 2 pages.
Office Action issued on Sep. 15, 2008 in U.S. Appl. No. 09/843,788, 12 pages.
Office Action issued on Sep. 18, 2008 in U.S. Appl. No. 10/134,437, 30 pages.
Office Action issued on Sep. 20, 2005 in U.S. Appl. No. 10/146,814, 11 pages.
Office Action issued on Oct. 20, 2007 in U.S. Appl. No. 10/747,679, 27 pages.
Office Action issued on Oct. 20, 2007 in U.S. Appl. No. 11/150,180, 5 pages.
Office Action issued on Oct. 31, 2007 in U.S. Appl. No. 09/843,788, 3 pages.

(56) References Cited

OTHER PUBLICATIONS

Office Action issued on Nov. 1, 2005 in U.S. Appl. No. 10/134,437, 21 pages.
Office Action issued on Nov. 1, 2007 in U.S. Appl. No. 10/747,624, 17 pages.
Office Action issued on Nov. 14, 2007 in U.S. Appl. No. 10/747,623, 18 pages.
Office Action issued on Nov. 17, 2005 in U.S. Appl. No. 09/911,799, 12 pages.
Office Action issued on Nov. 17, 2009 in U.S. Appl. No. 10/134,437, 2 pages.
Office Action issued on Dec. 2, 2004 in U.S. Appl. No. 09/843,788, 21 pages.
Office Action issued on Dec. 2, 2005 in U.S. Appl. No. 09/810,159, 9 pages.
Office Action issued on Dec. 11, 2006 in U.S. Appl. No. 10/146,814, 14 pages.
Office Action mailed Feb. 26, 2007, from U.S. Appl. No. 10/747,624, 15 pages.
Office Action mailed Jul. 3, 2007, from U.S. Appl. No. 09/911,799, 18 pages.
Office Action mailed Mar. 13, 2007, from U.S. Appl. No. 10/747,623, 17 pages.
Office Action mailed Mar. 18, 2010, from U.S. Appl. No. 09/911,799, 7 pages.
Office Action mailed Nov. 14, 2007, from U.S. Appl. No. 10/747,623, 18 pages.
Office Action mailed Nov. 17, 2005, from U.S. Appl. No. 09/911,799, 11 pages.
Office Action mailed Oct. 2, 2007, from U.S. Appl. No. 10/747,679, 27 pages.
Office Action mailed Oct. 5, 2004, from U.S. Appl. No. 09/911,799, 12 pages.
Office Action of Canadian Application No. 2,462,037. dated Feb. 12, 2009, 8 pages.
Office Action of Dec. 1, 2008, from U.S. Appl. No. 09/911,799, 7 pages.
Office Action of U.S. Appl. No. 10/134,437, dated Mar. 10, 2009, 31 pages.
Office Action of U.S. Appl. No. 10/184,002, dated Jan. 8, 2008, 11 pages.
Office Action of U.S. Appl. No. 10/184,002, dated Jan. 9, 2007, 9 pages.
Office Action of U.S. Appl. No. 11/015,424, dated Mar. 19, 2008, 32 pages.
Office Action of U.S. Appl. No. 11/015,424, dated May 1, 2009, 47 pages.
Office Action of U.S. Appl. No. 11/237,718, dated Apr. 2, 2009, 12 pages.
Office Action of U.S. Appl. No. 11/238,130, dated Apr. 14, 2009, 35 pages.
Office Action of U.S. Appl. No. 11/238,130, dated Nov. 13, 2008, 44 pages.
Office Action, U.S. Appl. No. 09/843,788, dated Apr. 19, 2007, 14 pages.
Office Action, U.S. Appl. No. 09/911,799 dated Jul. 3, 2007, 18 pages.
Office Action, U.S. Appl. No. 10/134,437, dated Feb. 11, 2008, 32 pages.
Office Action, U.S. Appl. No. 10/146,814, dated Apr. 15, 2008, 17 pages.
Office Action, U.S. Appl. No. 10/747,623, dated Mar. 13, 2007, 19 pages.
Office Action, U.S. Appl. No. 10/747,623, dated Nov. 14, 2007, 18 pages.
Office Action, U.S. Appl. No. 10/747,624, dated Feb. 26, 2007, 16 pages.
Office Action, U.S. Appl. No. 11/150,180, dated Oct. 2, 2007, 5 pages.
PCT International Search Report of Apr. 11, 2003, App. No. PCT/US00/35160 (3 pages).
PCT International Search Report of Jan. 9, 2003, App. No. PCT/US02/30730 (4 pages).
PowWow (Mar. 1, 2000), Introduction, Retrieved Apr. 3, 2006 from website: http://web.archive.org/web/20000301125635/ww2.tribal.com/help/online_docs/h205voic.html 2 pages.
Pruitt, Scarlet. IDG News Service. "Morpheus Updates Peer-to-Peer Client" [online] Jun. 10, 2002 [accessed Feb. 14, 2007], Retrieved from Internet URL:http://www.pcworld.com/article/id.101736/article.html.
Reichard, K., "AOL, ICQ to Interoperate—But in a Limited Fashion," Oct. 30, 2002, InstantMessagingPlanet, available at www.instantmessagingplanet.com/public/article.php/1490771.
Satter, Michael, excerpts from Internet TV with CU-SeeMe, First Edition, including inside Title Page and Copyright Page; "Overview"; "Contents," through pp. xii; Chapter 1, "Introduction to Internet Videoconferencing and CU-SeeMe," pp. 1-12; Chapter 4, "Hardware," pp. 47-64; Chapter 5, "Software," pp. 65-92; Chapter 6, "CU-SeeMe User's Guide," pp. 93-121; Chapter 9, "Other Videoconferencing Technologies," pp. 201-226; Chapter 10, "What the Future Holds," pp. 227-233; Appendix A, "Troubleshooting Q&A," pp. 235-249; published by Sams.net Publishing, 201 W. 103rd St., Indianapolis, IN 46290, International Standard Book Number: 1-57521-006-1, Library of Congress Catalog Card Number: 95-70178, copyright© 1995.
Tribal Voice, PowWow Guided Tour—Step 6, PowWow personal communication. http://web.archive.org/web/2000817094516/www.tribal.com/powwow/tour/step6.cfm (Oct. 22, 1999), 2 pages.
USPTO, Final Office Action of May 18, 2006, U.S. Appl. No. 10/134,437, 26 pages.
USPTO, Final Office Action of Nov. 24, 2009, U.S. Appl. No. 11/238,130, 26 pages.
USPTO, Final Office Action of Nov. 3, 2008, U.S. Appl. No. 11/015,424, 46 pages.
USPTO, Final Office Action of Oct. 19, 2009, U.S. Appl. No. 11/015,424, 59 pages.
USPTO, Final Office Action of Oct. 30, 2009, U.S. Appl. No. 11/237,718, 21 pages.
USPTO, Office Action of Apr. 20, 2006, U.S. Appl. No. 10/184,002, 15 pages.
USPTO, Office Action of Aug. 25, 2005, U.S. Appl. No. 10/184,002, 13 pages.
USPTO, Office Action of Nov. 1, 2005, U.S. Appl. No. 10/134,437, 21 pages.
Wayner, Peter, "Hey Baby, Call Me at My IP Address", Apr. 1996, pp. 142-144.
WBWE (1998), PowWow 3.6 Brings the Power of Internet Community to the People, Business Wire, 2 pages.
Yubing Wang, Mark Claypool, Zheng Zuo. Video: An empirical study of realvideo performance across the internet. Proceedings of the 1st ACM SIGCOMM Workshop on Internet Measurement IMW'01. Nov. 2001. ACM Press. 15 pages.
"Using Active Directory Service", from Chapter 5, Microsoft Windows 2000 Administrator's Pocket Consultant, by William R. Stank (1999). Retrieved from http://ww.microsoft.com/technet/prodtechnol/ad/windows2000/evaluate/05w2kadb.asp?fr . . . , pp. 1-6.
International Search Report, Application Serial No. PCT/US2006/018286, dated Oct. 19, 2006, 12 pages.
U.S. Appl. No. 11/015,423, Mar. 2, 2009, Office Action.
U.S. Appl. No. 11/015,424, Feb. 17, 2010, Notice of Allowance.
U.S. Appl. No. 11/237,718, Jun. 9, 2010, Notice of Allowance.
U.S. Appl. No. 11/464,816, Apr. 21, 2009, Office Action.
U.S. Appl. No. 12/765,045, Dec. 12, 2011, Office Action.
U.S. Appl. No. 12/765,045, Jul. 19, 2012, Office Action.
U.S. Appl. No. 12/765,045, Dec. 31, 2012, Office Action.
U.S. Appl. No. 12/765,045, Apr. 15, 2013, Office Action.
U.S. Appl. No. 13/620,921, Feb. 15, 2013, Office Action.
U.S. Appl. No. 13/620,921, Aug. 7, 2013, Office Action.
U.S. Appl. No. 12/765,045, Mar. 7, 2014, Office Action.
U.S. Appl. No. 13/620,921, Apr. 25, 2014, Notice of Allowance.
U.S. Appl. No. 14/049,069, May 23, 2014, Office Action.

(56) References Cited

OTHER PUBLICATIONS

U.S. Appl. No. 13/619,312, Sep. 14, 2012, Appelman.
U.S. Appl. No. 13/619,364, Sep. 14, 2012, Appelman.
U.S. Appl. No. 13/619,397, Sep. 14, 2012, Appelman.
U.S. Appl. No. 14/049,069, Oct. 8, 2013, Appelman.
"AOL Instant Messenger All New Version 2.0 Quick Tips for Getting Started," Jun. 24, 1999, 5 pages.
"File Transfer Preferences", AOL Instant Messenger, version 5.1, Help Documentation, apparently available as of Nov. 21, 2002, 2 pages.
"Frequently Asked Questions About AOL Instant Messenger," Jun. 24, 1999, 6 pages.
"The Gordano Messaging Server," http://www.gordano.com, Copyright 1994-2003, Gordano, 3 pages.
"What is AOL Instant Messenger," Jun. 24, 1999, 3 pages.
AOL Instant Messenger, available on Nov. 21, 2002, reprinted from http://web.archive.org/web/20021121031257/http://aim.com on Aug. 31, 2005 (2 pages).
Hudson, Greg; Security in the Internet Message and Presence Protocols, http://mirrors.isc.org/pub/www.watersprings.org/pub/id/draft-hudson-impp-security-00.txt; p. 6, section 7.2.2, first paragraph, p. 6 section 7.2.1, lines 1-2, Nov. 21, 2000.
International Search Report from International Application No. PCT/US03/41499, dated Oct. 27, 2004.
Supplementary European Search Report issued in European Application No. 05857099.5-1238/1836596 PCT/US2005045663, dated Nov. 7, 2008, (5 pages).
U.S. Appl. No. 10/633,636, Oct. 11, 2006, Office Action.
U.S. Appl. No. 10/746,230, Mar. 17, 2009, Office Action.
U.S. Appl. No. 10/746,230, Oct. 5, 2009, Office Action.
U.S. Appl. No. 10/746,230, Apr. 9, 2010, Notice of Allowance.
U.S. Appl. No. 10/746,230, Jan. 6, 2011, Notice of Allowance.
U.S. Appl. No. 10/746,232, Mar. 18, 2009, Office Action.
U.S. Appl. No. 10/746,232, Oct. 30, 2009, Office Action.
U.S. Appl. No. 10/746,232, Jun. 10, 2010, Notice of Allowance.
U.S. Appl. No. 10/746,232, Jan. 18, 2011, Notice of Allowance.
U.S. Appl. No. 11/015,476, Mar. 2, 2009, Office Action.
U.S. Appl. No. 11/079,522, Apr. 3, 2009, Office Action.
U.S. Appl. No. 11/079,522, Oct. 16, 2008, Office Action.
U.S. Appl. No. 11/782,461, Jan. 22, 2008, Office Action.
U.S. Appl. No. 11/782,461, Jul. 17, 2008, Office Action.
U.S. Appl. No. 11/782,461, Oct. 7, 2008, Notice of Allowance.
U.S. Appl. No. 12/349,161, Jun. 4, 2010, Office Action.
U.S. Appl. No. 12/349,161, Oct. 1, 2010, Office Action.
U.S. Appl. No. 12/349,161, Jan. 24, 2011, Notice of Allowance.
U.S. Appl. No. 13/093,147, Jul. 19, 2011, Office Action.
U.S. Appl. No. 13/093,147, Jan. 27, 2012, Notice of Allowance.
U.S. Appl. No. 10/334,142, Sep. 7, 2004, Office Action.
U.S. Appl. No. 10/334,142, May 4, 2005, Office Action.
U.S. Appl. No. 10/334,142, Dec. 6, 2005, Office Action.
U.S. Appl. No. 10/334,142, Jul. 14, 2006, Office Action.
U.S. Appl. No. 10/334,142, Dec. 29, 2006, Office Action.
U.S. Appl. No. 10/334,142, Apr. 18, 2007, Notice of Allowance.
U.S. Appl. No. 13/472,583, Dec. 6, 2012, Office Action.
U.S. Appl. No. 13/472,583, Jul. 1, 2013, Notice of Allowance.
U.S. Appl. No. 13/620,921, Dec. 20, 2013, Office Action.

\* cited by examiner

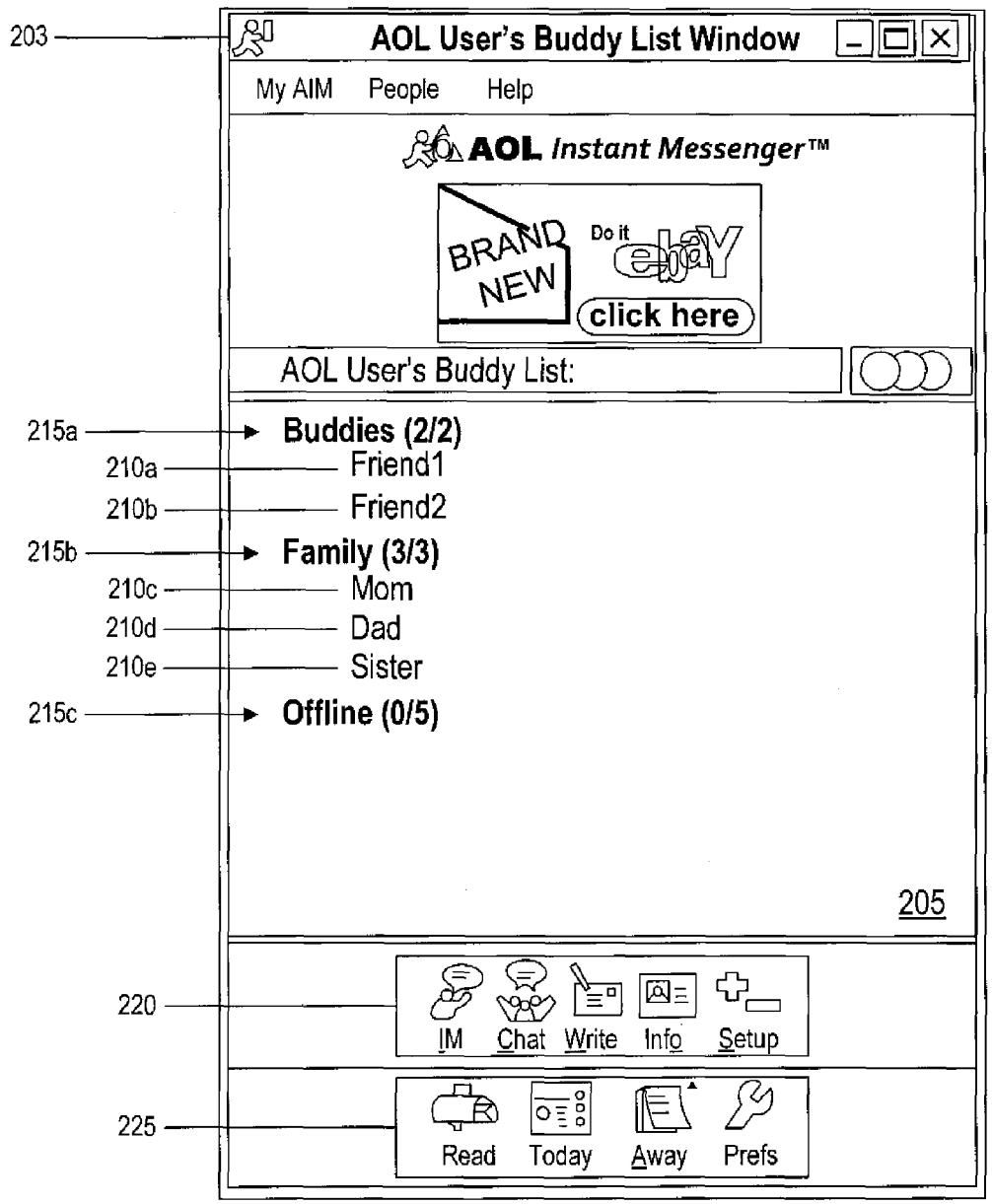
Figure 2A (Before)

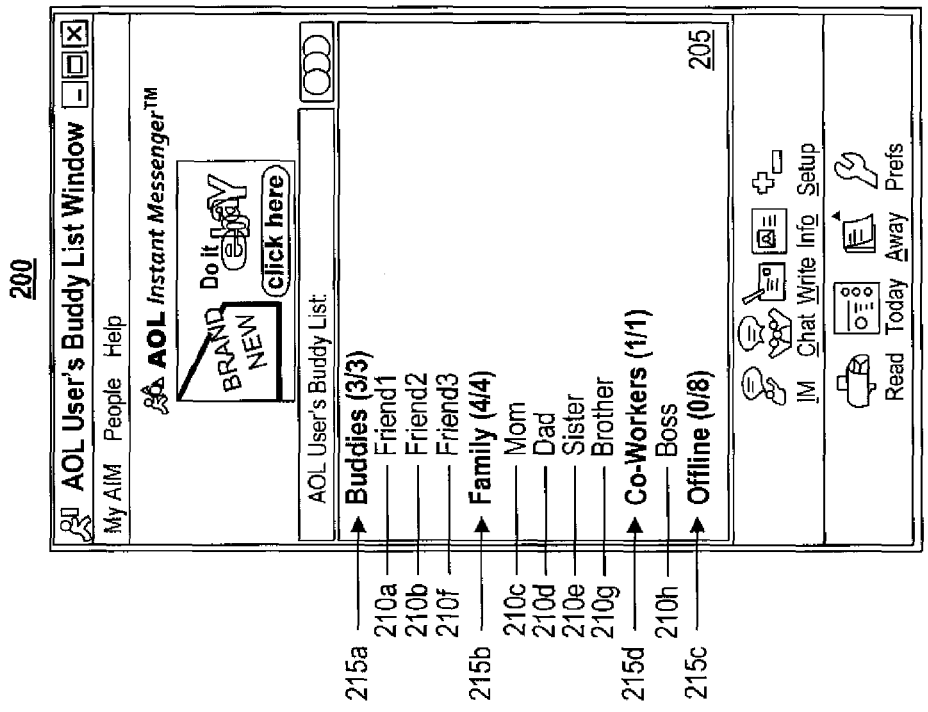
Figure 2C (After)
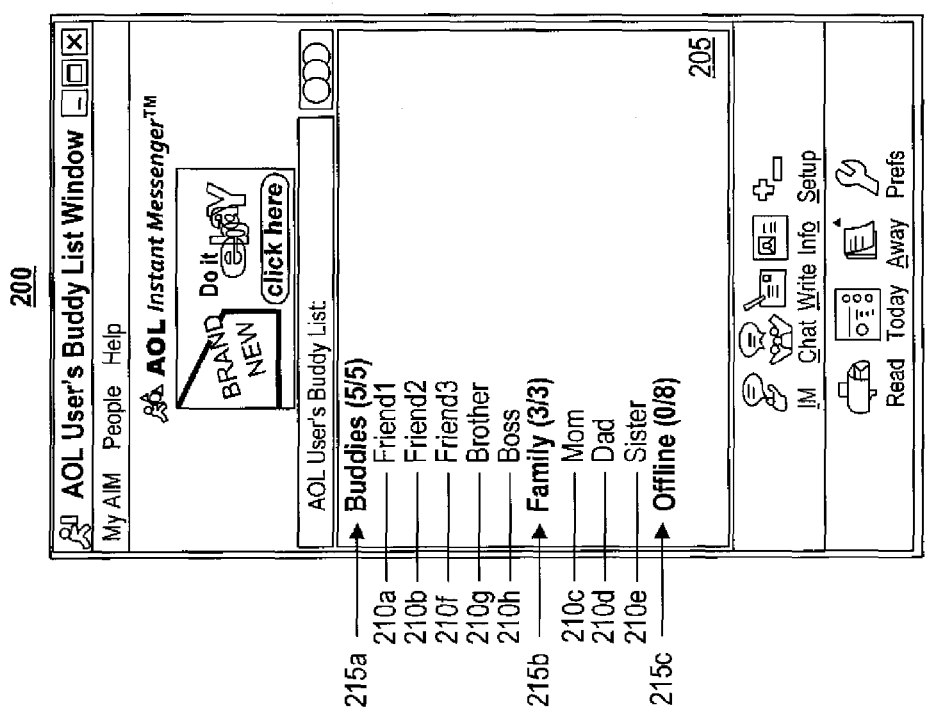
Figure 2B (After)

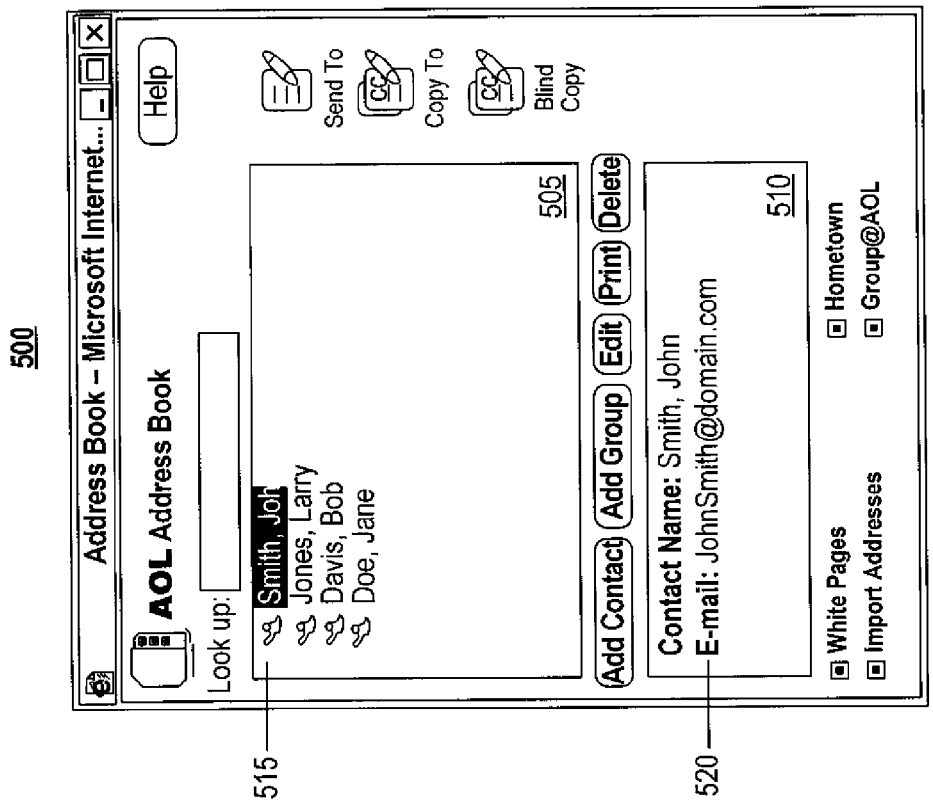
Figure 5B (After)
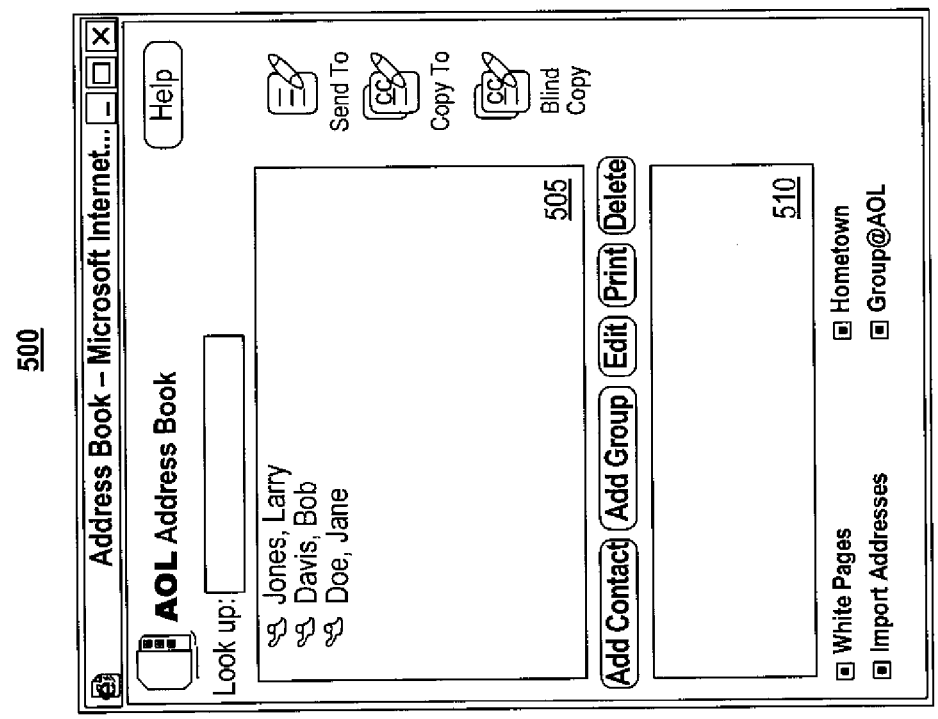
Figure 5A (Before)

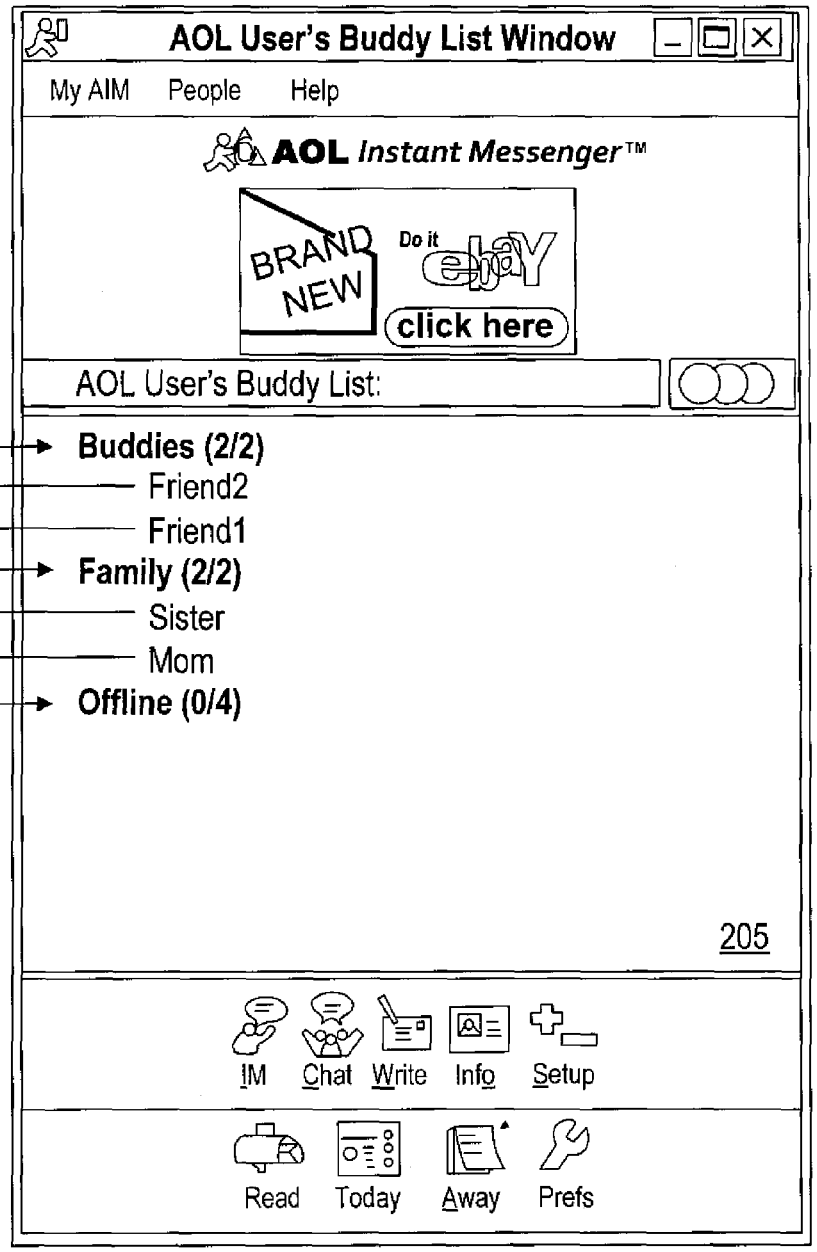
Figure 7A (After)

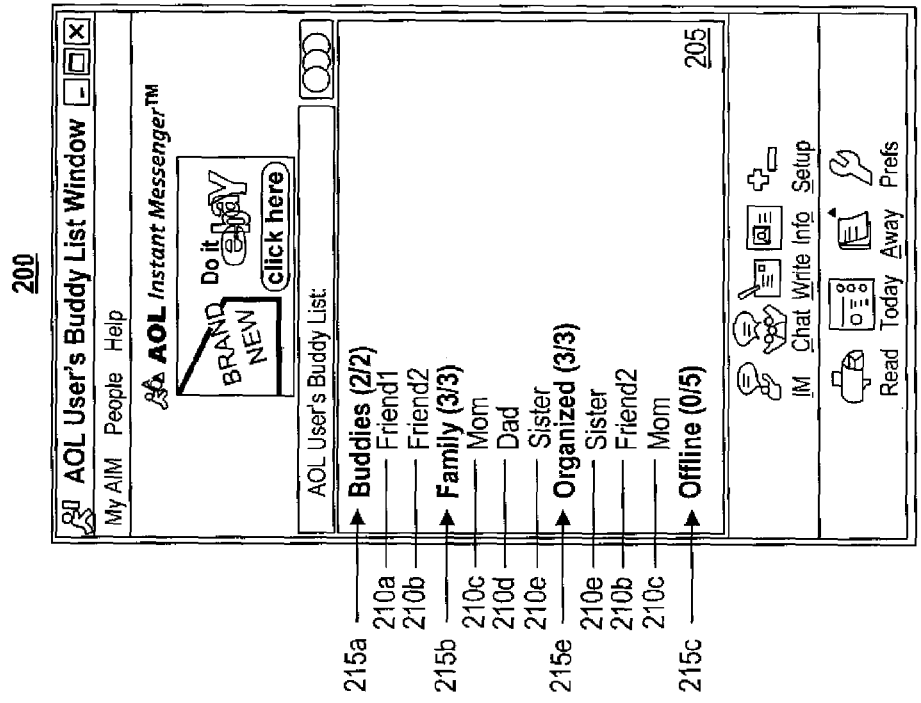
Figure 7B (After)
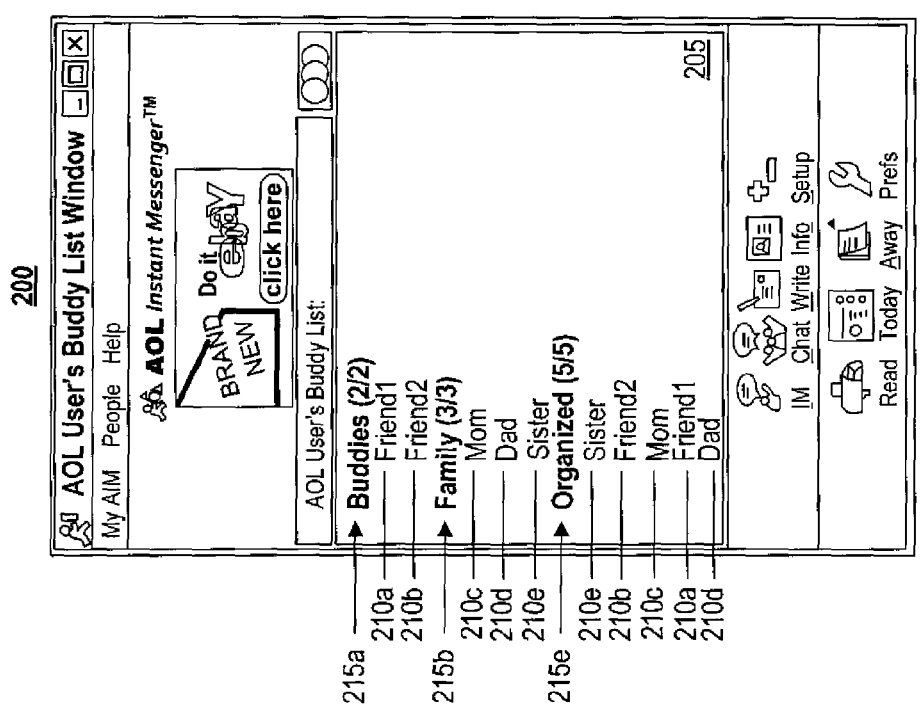
Figure 7C (After)

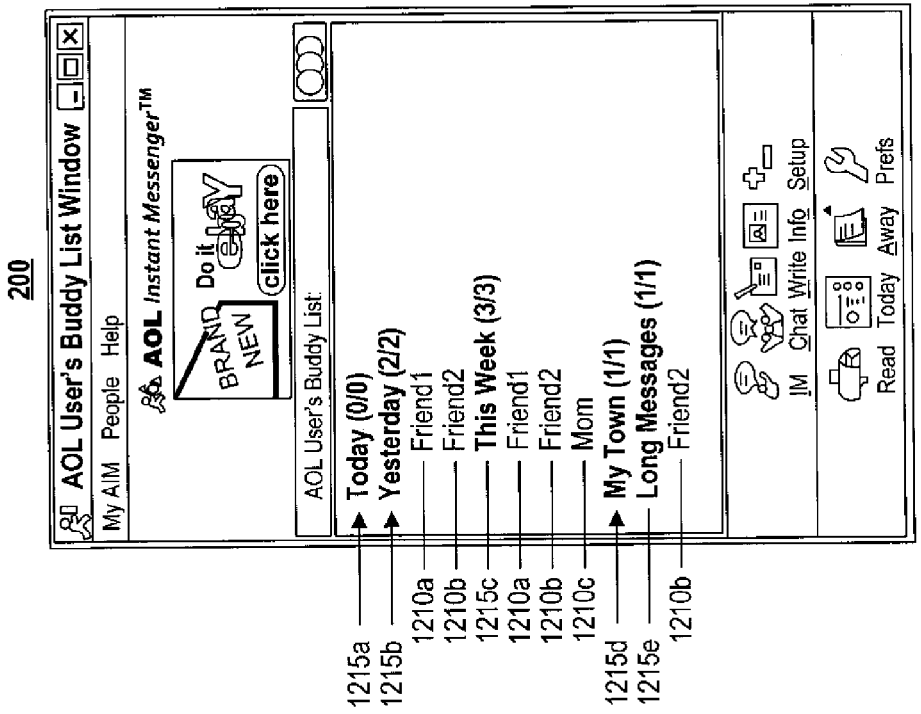
Figure 12B (After)
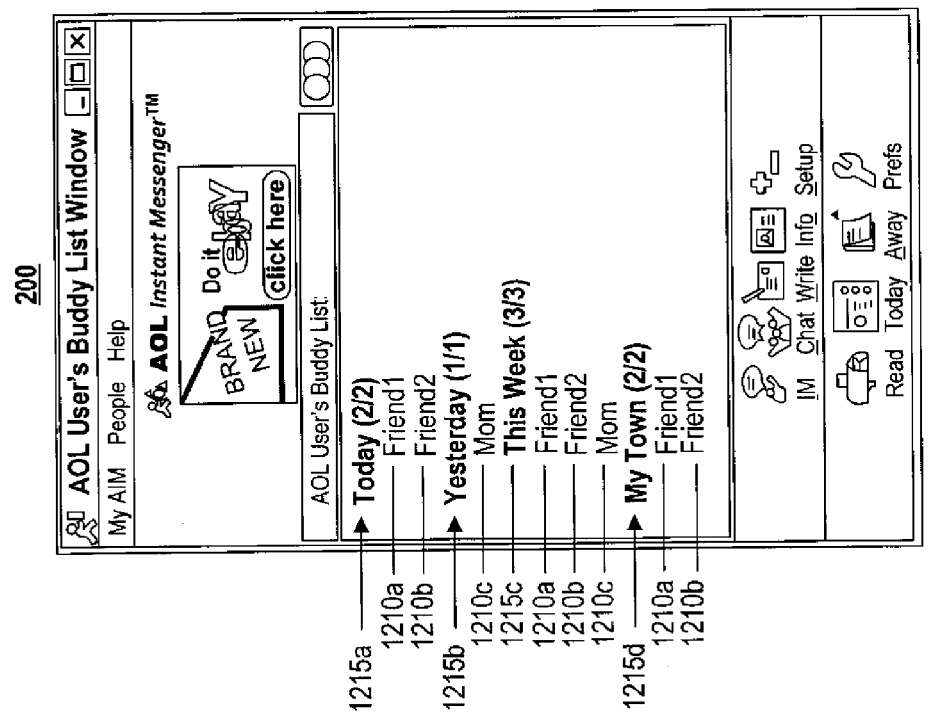
Figure 12A (Before)

AUTOMATIC CATEGORIZATION OF ENTRIES IN A CONTACT LIST

CROSS REFERENCE TO RELATED APPLICATIONS

This application is a continuation of U.S. application Ser. No. 11/237,718, filed Sep. 29, 2005 (now allowed) now U.S. Pat. No. 7,774,711, the entire contents of which are incorporated herein by reference.

TECHNICAL FIELD

This document relates to organizing entries within participant lists.

BACKGROUND

When a user first uses an electronic communications system, the user may be provided with a participant list to be used with the electronic communications system. The user may populate a participant list with identifiers of other users of the electronic communications system with which communication may occur through the electronic communications system. The task of manually categorizing entries of the participant list into groups may be inefficient or burdensome, especially when the participant list includes a large number of entries.

SUMMARY

In one general aspect, categorizing users includes maintaining a list of identifiers that are selected by a first user and for which online presence information is made perceivable through the list. The list includes one or more categories into which the identifiers are categorized. At least one attribute associated with an identifier for which online presence information is to be made perceivable through the list and attributes stored relative to at least one of the categories are accessed. The attributes associated with the identifier are compared to the stored attributes. Based on results of the comparison, at least one category within the list that corresponds to the identifier is identified, and the identifier is categorized into the identified category.

Implementations may include one or more of the following features. For example, the identified category may be added to the list after identifying the identified category. Identifying at least one category that corresponds to the identifier may include identifying at least one category that corresponds to the identifier and into which the identifier is not already categorized.

Identifying an attribute of the identifier may include identifying an attribute associated with the identifier from a profile associated with the identifier. Identifying an attribute associated with the identifier from a profile associated with the identifier may include identifying an attribute of a user associated with the identifier from a profile of the user.

Accessing at least one attribute associated with the identifier may include accessing at least one indication of communications between the first user and the identifier or a user corresponding to the identifier.

Accessing at least one indication may include accessing at least one indication from a group of indications comprising one or more instant messages sent between the first user and the identifier of a user corresponding to the identifier, e-mail messages sent between the first user and the identifier or a user corresponding to the identifier, and voice over Internet protocol (VoIP) telephone calls between the first user and the identifier or a user corresponding to the identifier.

Accessing at least one attribute associated with the identifier may include accessing a time at which the first user exchanges messages with the identifier or a user corresponding to the identifier. Identifying at least one category may include identifying at least one category reflecting identifiers of users with which the first user communicated within a period of time that includes the accessed time. Identifying at least one category may include identifying at least one category reflecting identifiers of users with which the first user communicated during a current day, a previous day, a previous week, or a previous month.

Accessing at least one attribute associated with the identifier may include accessing a frequency with which the first user exchanges messages with the identifier or a user corresponding to the identifier. Identifying at least one category may include identifying at least one category reflecting identifiers of users with which the first user communicated at a frequency within a range of frequencies that includes the accessed frequency. Identifying at least one category may include identifying at least one category reflecting identifiers of users with which the first user communicated at least a particular number of times a day, at least a particular number of times a week, or at least a particular number of times a month.

Accessing at least one attribute associated with the identifier may include accessing a length of one or more messages sent between the first user and the identifier or a user corresponding to the identifier. Identifying at least one category may include identifying at least one category reflecting identifiers with which the first user exchanged messages of lengths within a range of lengths that includes the accessed length. Identifying at least one category may include identifying at least one category reflecting identifiers with which the first user exchanged messages of at least a threshold length or at most a threshold length.

Accessing at least one attribute associated with the identifier may include accessing a location of a user corresponding to the identifier. Identifying at least one category may include identifying at least one category reflecting identifiers of users that are located at the accessed location.

Accessing at least one attribute associated with the identifier may include accessing at least one group within a second list of identifiers. The at least one accessed group may include the identifier. Identifying at least one category may include identifying at least one group within the list that corresponds to the at least one accessed group within the second list as the category.

Accessing at least one group within the second list may include accessing at least one group within an address book of an e-mail system. Identifying at least one group may include identifying at least one group within a list of users of an instant messaging system for which presence is monitored that corresponds to the at least one accessed group within the address book.

Accessing at least one group within the second list may include accessing at least one group within a list of users of an instant messaging system for which presence is monitored. Identifying at least one group may include identifying at least one group within an address book of an e-mail system that corresponds to the at least one accessed group within the list of users of the instant messaging system.

A request to categorize the identifier into at least one category based on at least one attribute associated with the identifier may be received. The list of users may be an address book of an e-mail system. The identifier may be at least one from a group including an online identity, a name, or an alias for an online identity.

The one or more categories may be mutually exclusive such that each of the identifiers may be categorized into at most one of the one or more categories. Categorizing the identifier into the identified category may include categorizing the identifier only into the identified category.

A first user of the list of identifiers may be prompted to accept categorization of the identifier into the identified category, wherein categorizing the identifier may include categorizing the identifier in response to an indication that the first user accepts the categorization of the identifier into the identified category. The first user may be enabled to manually categorize the identifier when the first user does not accept the categorization of the identifier into the identified category.

In another general aspect, a graphical user interface on a display device for using a computer to manage a list of users of an electronic communications system with which electronic messages may be exchanged includes a participant list display associated with a user of the participant list display that includes users of the electronic communications system. Each included user is associated with at least one group included in the participant list display based on at least one attribute of the included user and at least one stored attribute of the at least one group.

Implementations may include one or more of the following features. For example, the participant list display may include a group associated with at least some of the users included in the participant list display. The associated users may be associated with the group based on times at which the user has communicated with each of the associated users, electronic communications between the user and each of the associated users, locations of the associated users, or associations of the associated users with one or more groups within a second list of users.

The participant list display may be a display of a list of users of an instant messaging system for which presence information is monitored or a display of an address book associated with an e-mail system.

These general and specific aspects may be implemented using a system, a method, or a computer program, or any combination of systems, methods, and computer programs.

Other features will be apparent from the description and drawings, and from the claims.

DESCRIPTION OF DRAWINGS

FIGS. 2A-2C are illustrations of a participant list before (FIG. 2A) and after (FIGS. 2B and 2C) known contacts are automatically added.

FIGS. 5A and 5B are illustrations of a participant list before (FIG. 5A) and after (FIG. 5B) new users are automatically added.

FIGS. 7A-7C are illustrations of the participant list of FIG. 2A after the entries in the participant list are organized.

FIGS. 12A-12B are illustrations of a participant list before (FIG. 12A) and after (FIG. 12B) known contacts are automatically categorized.

Like reference symbols in the various drawings indicate like elements.

DETAILED DESCRIPTION

Figure 1:
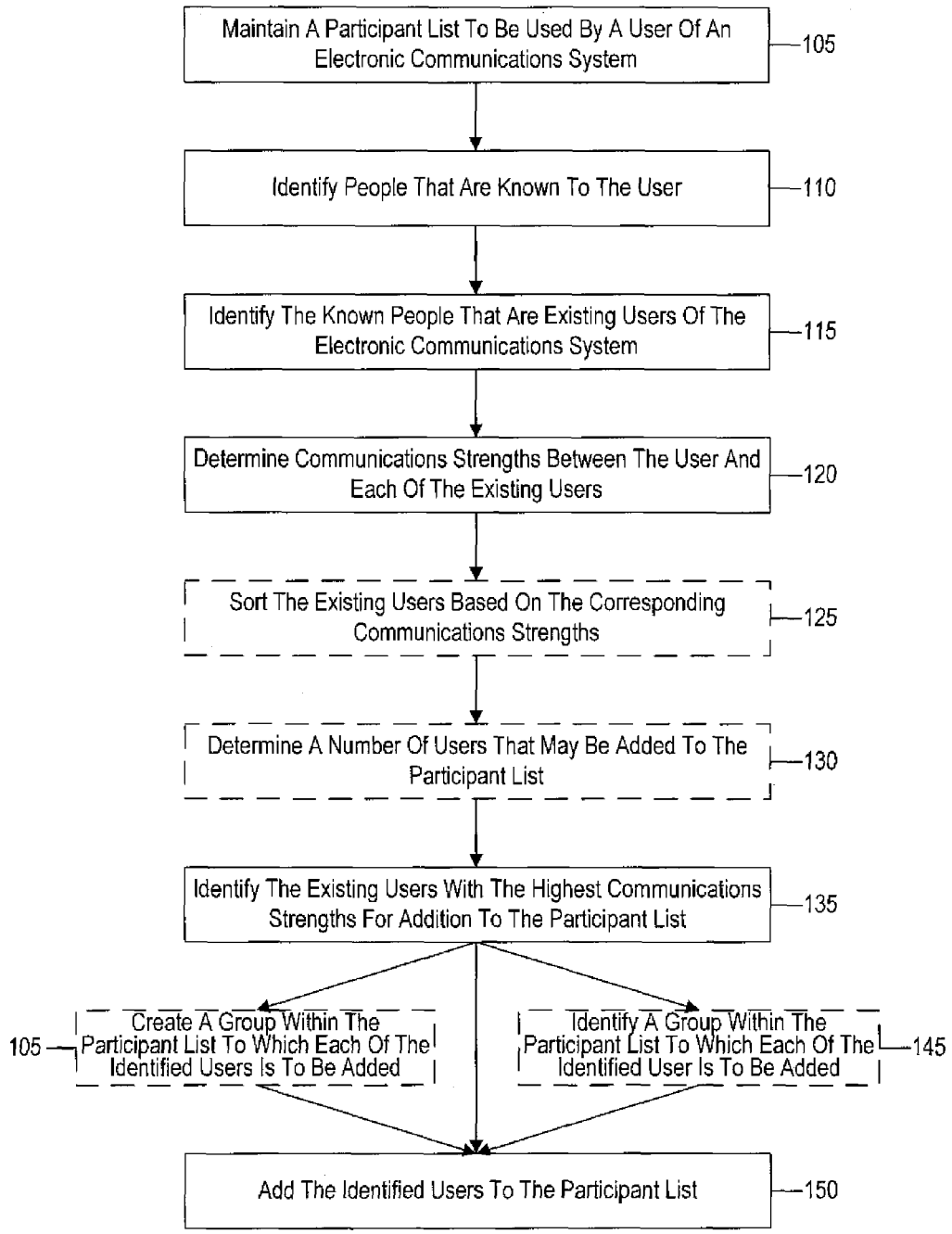
FIG. 1 is a flow chart of a process for passively populating a participant list for a user of an electronic communications system with known contacts of the user.

Entries within a participant list of an electronic communications system to be used by a first user may be categorized automatically into one or more groups. The categorization of an entry into a group may depend on a characteristic of a second user that corresponds to the entry, or on characteristics of a relationship between the first user and the second user. For example, if the first and second users exchange messages on a particular day, the entry for the second user may be categorized into a group for entries of users with whom the first user has communicated on the particular day. As another example, the entry for the second user may be categorized based on a characteristic of the second user that is identified from a profile of the second user. If an entry is to be added to a category that is not included in the participant list, the category may be added to the participant list. Categorizing the entries in the first user's participant list on behalf of the first user relieves the first user from the burden of manually categorizing the entries, which may be a significant burden when the number of entries is large. Furthermore, categorizing the entries enables the first user to quickly identify characteristics of the corresponding users based on characteristics of the categories into which the entries have been categorized.

A first user may exchange electronic messages with a second user, and the relationship between the first and second users with respect to the exchanging of electronic messages may be described by a communications strength between the first and second users. The communications strength between the first and second users is a numerical measure of the strength of the relationship between the first and second users with respect to exchanging electronic messages. Higher communications strengths typically correspond to stronger relationships. Communications strengths may be useful when comparing relationships while passively adding contacts to participant lists, announcing new membership to known contacts, or organizing participant lists. The communications strength between the first and second users also may be called the communications strength of the first user with respect to the second user, the communications strength of the second user with respect to the first user, or more simply the communications strength of the first or second users.

A calculation of the communications strength between the first and second users may consider the number of messages that are exchanged between the first and second users, and a higher number of messages may correspond to a higher communications strength. Similarly, the calculation may consider the frequency with which messages are exchanged between the first and second users, and a higher frequency may correspond to a higher communications strength. In implementations where the first and second users are users of a chat room, the calculation may consider the frequency with which messages are exchanged between the first and second users in the chat room, and a higher frequency of messages exchanged in the chat room may correspond to a higher communications strength.

The time over which messages are exchanged by the first and second users may affect the communications strength between the first and second users. In general, a longer amount of time over which the first and second users exchange messages may correspond to a higher communications strength. For example, the communications strength between the first and second users may be higher when the first and second users exchange a lower number of messages over a longer period of time than when the first and second users exchange a higher number of messages over a shorter period of time. Similarly, the communications strength may be higher when the first and second users exchange messages with a lower frequency for a longer period of time than when the first and second users exchange messages with a higher frequency for a shorter period of time. In general, exchanging messages over a longer period of time may indicate that the first and second users have a stronger, more enduring relationship.

A calculation of the communications strength between the first and second users may consider only messages sent between the first and second users with the electronic communications system, or all types of messages sent between the first and second users. For example, in implementations where the electronic communications system is an instant messaging system, the communications strength between the first and second users may depend on the instant messages sent between the first and second users, or the communications strength may depend on all communications between the first and second users, including, for example, instant messages, e-mail messages, and cellular telephone calls.

Alternatively or in addition to using the exchanging of electronic messages to measure communications strength between users, whether or not a first user and a second user each list each other in respective contact lists, such as address books, lists of users for which presence information is monitored, e-mail distribution lists, social networks, mobile telephone phone books, lists of members of an organization, and/or white lists, may be considered when calculating the communications strength between the first and second users. Inclusion in respective contact lists may be indicative of a strong relationship between the first and second users. As a result, a high communications strength may be assigned when the first user is listed in a contact list used by the second user and when the second user is listed in a contact list used by the first user. Each contact list may be a contact list that includes a single user's contacts, or a global contact list that includes multiple users' contacts. A lower communications strength may be assigned when only one of the first and second users lists the other user in a contact list used by the first or second user. An even lower communications strength may be assigned when neither the first nor the second user includes the other user in a respective contact list. The type of contact lists that include the first or second users may affect the communications strength. For example, a higher communications strength may be assigned when the first and second users are listed in mobile telephone phone books than when the first and second users are listed in white lists. Such a communications strength may be assigned because adding the first and second users to the mobile telephone phone books may be harder and may require more effort by the first and second users than adding the first and second users to the white lists.

The calculation of the communication strength also may consider the amount and type of contact information that the first and second users have for one another. The communications strength may be directly related to the amount of contact information that the first and second users have for one another. For example, a higher communications strength may be assigned when the first user has both work and home contact information for the second user than when the first user only has work or home contact information for the second user. As another example, a higher communications strength may be assigned when the second user has home contact information for the first user than when the second user has work contact information for the first user. Such a consideration may be particularly important when the second user typically communicates with the first user when the first user is at home.

The calculation of the communications strength also may consider the degree of separation between the first and second users. The degree of separation between the first and second users describes a relationship between the first and second user. A low degree of separation between the first and second users may indicate a close, and consequently strong, relationship. Typically, user contact lists are evaluated to determine the number of degrees (or hops) that are required to link or relate the first and second users. For example, user A may list user B in user A's address book, user B may list user C in user B's address book, and user C may list user D in user C's address book. Here, user D is linked to user A by two degrees of separation (with user B as the first degree and user C as the second degree). User A is related to user C by one degree of separation (user B) and user B is separated from user D by one degree of separation (user C). Users A and B, users B and C, and users C and D are each respectively separated by zero degrees of separation. In general, a smaller degree of separation may correspond to a higher communications strength.

Whether or not the first and second users are direct or indirect addressees of messages sent between the first and second users may be considered when calculating the communications strength between the first and second users. The first and second users being direct addressees of the messages may be indicative of a strong relationship between the first and second users. The first user may be called a direct addressee of a message from the second user when the message is received directly from the second user, and the first user may be called an indirect addressee of the message when the message is received from the second user through one or more other users. In general, the number of other users through which the message is received is inversely proportional to the communications strength between the first and second users.

Alternatively or additionally, in implementations where the messages sent between the first user and the second user are e-mail messages, whether the first and second users are listed in the "To," "Carbon Copy," or "Blind Carbon Copy" fields of the e-mail messages may indicate whether the first and second messages are direct or indirect addressees. For example, if the second user is listed in the "To" field of an e-mail message sent by the first user, the second user may be a direct addressee of the message. If the second user is listed in the "Carbon Copy" or "Blind Carbon Copy" fields of the e-mail message, the second user may be an indirect addressee of the message. A higher communications strength may be assigned when the first or second users are direct addressees than when the first or second users are indirect addressees. The number of times that the first and second user are direct or indirect addressees may affect the communications strength, with the communications strength being directly related to the number of times that the first and second user are direct or indirect addressees.

Similarly, whether or not the first and second users are both senders and recipients of messages sent between one another may be considered when calculating the communications strength between the first and second users. The first and second users being both senders and recipients of the messages may be indicative of a strong relationship between the first and second users. A higher communications strength may be assigned when both the first and the second users are both senders and recipients of the messages. A lower communications strength may be assigned when both the first and second users are not both senders and recipients of the messages, which may occur when the first user sends messages to the second user and does not receive messages from the second user in response, or vice versa.

The first and second users may publish personal contact information, and the first and second users may subscribe to the published contact information. More particularly, the first user may subscribe to contact information published by the second user, and the second user may subscribe to contact information published by the first user. When a user subscribes to published contact information, any changes to the published contact information are automatically propagated to the user. Subscribing to each other's contact information may be indicative of a strong relationship between the first and second users. Therefore, a high communications strength may be assigned to the relationship between the first and second users when the first and second users subscribe to each other's contact information. A lower communications strength may be assigned to the relationship when only one of the first and second users subscribes to the other user's published contact information. An even lower communications strength may be assigned when neither of the first and second users subscribes to each other's contact information.

Other characteristics of the first and second user or their communication behavior may be considered when calculating the communications strength between the first and second users. For example, a type of relationship between the first and second user may affect the communications strength between the first and second user. For example, in one implementation, a higher communications strength may be assigned if the first and second users are family members than if the first and second users are business contacts.

One or more of the above characteristics of the relationship may be included in a calculation of the communications strength between the first and second users. For each of the included characteristics, a numerical measure corresponding to the characteristics is identified. The numerical measure of a characteristic may be a raw measurement of the characteristic or some other numerical value representative of the characteristic. The communications strength may be calculated from the numerical measures of the characteristics using, for example, a weighted average or some other function of the numerical measures of the characteristics.

In some implementations, the communications strength between the first and second users may depend on the communications strength between the first user and a third user, or on the communications strength between the second user and the third user. For example, a relationship may not have been established between the first and second users, which may prevent the calculation of the communications strength between the first and second users. The relationship between the third user and the first or second user may be similar to the expected relationship between the first and second users. For example, the first user may be a new employee of a company that already employs the second and third users. The first user may be working with the second user in a similar manner as the third user, so the relationship between the second and third users may model the expected relationship between the first and second users. As a result, the communications strength between the second and third users may represent the expected communications strength between the first and second users. The communications strengths of the third user with the first or second users may be calculated as described above. The communications strength between the second and third users also may be combined with the communications strength between the first and second users that is calculated as described above. In some implementations, the communications strengths between the second user and multiple other users may be combined with the calculated communications strength between the first and second users.

In some implementations, the first user or the second user may use multiple identifiers when communicating over the electronic communications system. For example, the first user may have two identities that are both used to communicate with the second user. A separate communications strength may be calculated for each of the identifiers. The separate communications strength for a particular identifier describes the relationship between the first user and the second user when communicating with the particular identifier. The overall communications strength between the first and second user may be calculated by combining the separate communications strengths for each of the multiple identifiers. For example, a weighted average of the separate communications strengths may be used to combine the separate communications strengths into the overall communications strength between the first and second users.

The communications strength between the first and second users may be calculated in real time as the first and second users communicate. For example, each time a message is sent between the first and second users, a calculation of the communications strength may be performed. Alternatively or additionally, the communications strength may be determined after the messages have been exchanged. For example, logs of the messages sent between the first and second users, such as an e-mail log or an instant message log, may be inspected and processed to determine the communications strength. Other information indicative of the relationship between the first and second users may be processed when calculating the communications strength.

Referring to FIG. 1, a process 100 is used to passively populate a participant list to be used by a user of an electronic communications system with other users of the electronic communications system. The process 100 identifies other users of the electronic communications system that are known to the user and adds identifiers of those known users to the participant list. If all of the known users may not be added to the participant list, a portion of the known users (e.g., the known users that have the highest communications strengths) is added to the participant lists. Identifiers of the known users may be added to the participant list in general, or to specific groups within the participant list. The process 100 may be executed when the user first becomes a user of the electronic communications system, periodically on a recurring basis, or after an indication to execute the process 100 is received from the user.

The process 100 begins by maintaining a participant list to be used by the user of the electronic communications system (105). The participant list is maintained for use by the user such that the user may use the participant list to communicate with the other users included in the participant list. The participant list includes one or more identifiers of other users of the electronic communications system, and the other users typically are the other users with whom the first user commonly communicates. The first user may select an identifier from the participant list to address a message to be sent with the electronic communications system to the corresponding user. The identifiers included in the participant list may be separated into one or more groups that categorize or otherwise organize the other users.

Other people that are known to the user are identified (110). The known people may be identified from a contact list that includes contact information for people with whom the user may communicate. People included in the contact list are inferred to be known by the user. Examples of the contact list include a list of users of an instant messaging system for which presence information is monitored, an e-mail address book of an e-mail system, an e-mail distribution list, a list of people in the user's social network, a list of people in a phone book of a mobile telephone used by the user, a list of members of an organization that includes the user, and a white list of people from whom communications are allowed. The contact list may be maintained by the user himself, or by another person or a central system on behalf of the user. For example, the user may be an employee of a company, and the contact list may be a list of e-mail addresses of all employees of the company that is maintained by the company. The user may access and use the contact list from the central system, or the user may use a copy of the contact list that is stored on a computer system used by the user. In one implementation, the set of people known to the user is filtered to include only the people known to the user that are not already included in the participant list.

The known people that are existing users of the electronic communications system are identified (115). In one implementation, identifying the known people that are existing users of the electronic communications system may include identifying identifiers of the known people in the electronic communications system. Identifying the identifiers of the known people may implicitly indicate whether each of the known people is a user of the electronic communications system. More particularly, if an identifier for one of the known people in the electronic communications system may not be identified, then it may be assumed that the known person is not an existing user of the electronic communications system. The known person may be sent an invitation to join the electronic communications system using the information in the contact list.

In some implementations, the contact list includes an indication of the identifiers of the known users in the electronic communications system, and identifying the identifiers of the known people may include identifying the identifiers from the contact list. If the contact list does not include an identifier for a known person, then it may be assumed that the known person is not a user of the electronic communications system. In other implementations where the contact list does not include the identifiers, the identifiers may be otherwise determined. For example, contact information in the contact list may be used to identify the identifiers for the known people. For instance, the participant list may be a list of users of an instant messaging system for which presence information is monitored, and the contact list may include e-mail addresses of the known people that are not identifiers of the known people in the instant messaging system. However, the instant messaging system may maintain a mapping of e-mail addresses to identifiers, and the e-mail addresses may be used to identify the corresponding identifiers from the mapping. If the mapping does not include an identifier for an e-mail address of a known person, then it may be assumed that the known person is not a user of the instant messaging system. Other contact information, such as, for example, a phone number, a name, and/or an address, may be used to identify the identifiers for the known people. For example, a system may maintain a mapping of other contact information to identifiers, and the other contact information may be used to identify the corresponding identifiers from the mapping.

Communications strengths are determined for each of the known people for which an identifier in the electronics communications system has been identified (120). The communications strengths may be calculated from one or more characteristics of the relationship between the user and each of the existing users, as described above. Alternatively or additionally, the communications strengths may be indicated by the contact list from which the known people were identified. For example, the contact list may be organized such that the communications strengths of the included people are indicated by the positions of the included people within the contact lists. The existing users may be sorted based on the communications strengths that have been determined (125). Sorting the existing users by corresponding communications strength may help in determining which of the existing users are added to the participant list.

In other exemplary implementations, communications strengths may be determined between the user and the people known to the user, and the known people that are existing users of the communications system then may be identified.

A number of the existing users that may be added to the participant list may be determined (130). The participant list may have a maximum capacity, such that the participant list does not have sufficient space for all of the known people for which identifiers have been identified. In such a case, the number of existing users that may be added to the participant list is the number of remaining spaces in the participant list. Alternatively or additionally, the number of existing users that may be added may depend on the corresponding communications strengths. For example, a particular number of existing users may be determined because adding more existing users to the participant list may result in the addition of existing users with a communications strength that is lower than desired.

The known people corresponding to the highest communications strengths are identified for addition to the participant list (135). For example, a number of the known people with the highest communications strengths equal to the maximum allowable number of additions to the participant list may be identified for addition to the participant list. In implementations where a number of allowable additions is not determined, all of the existing users may be identified for addition to the participant list.

A group within the participant list to which each of the existing users is to be added may be created (140). For example, a special group may be created within the participant list for users that have been passively added to the participant list with the process 100. Alternatively or additionally, a group may be created for users in the participant list that have a certain characteristic. For example, a group may be created within the participant list for co-workers of the user because one or more of the known people to be added are determined to be co-workers of the user, and such a group is not already included in the participant list.

Alternatively or additionally, an existing group in the participant list to which each of the existing users is to be added may be identified (145). The existing group may be identified because one or more of the users of the existing group share a characteristic with each of the existing users to be added to the group, or because one or more of the users of the existing group are otherwise associated with each of the existing users. Alternatively or additionally, the existing group may be identified for each of the existing users because each of the existing users is included in a corresponding group in another contact list, such as the contact list that indicated that the existing users are known to the user.

In order to identify or create groups for the known people that have been identified for addition to the participant list, additional information describing the known people may be accessed. The additional information may identify characteristics of the known people that may be useful in identifying groups to which the known people should be added. In one implementation, profiles of the known people in the electronic communications system are accessed for use in identifying or creating groups to which the known people should be added.

The existing users that have been identified for addition to the participant list are then added to the participant list (150). In implementations where groups within the participant list have been identified for each of the existing users, the existing users are added to those groups. In implementations where groups have not been identified, the existing users are simply added to the list in general or to a default group within the list. For example, the existing users may be added to a general user group within the participant list.

In some implementations, the user of the electronic communications system whose participant list is maintained with the process 100 may use multiple identifiers when communicating over the electronic communications system. For example, the user may have a business identifier that is used with communicating during business hours or with business contacts, and a family identifier that is used when communicating with family members. The multiple identifiers may be linked such that the user may communicate using more than one of the multiple identities at a time. Furthermore, the user may maintain a participant list for each of the multiple identities. The participant list for a particular identifier may include other users with whom the user communicates using the particular identifier. For example, the participant list for the business identifier of the user may include the business contacts of the user, and the participant list for the family identifier may include the family member of the user. The participant lists for each of the multiple identities may be conglomerated into a single participant list that is maintained with the process 100.

When an existing user that is known to the user is added to the single participant list for the user during the process 100, an appropriate participant list within the single participant list for the existing user may be identified. For example, the existing user may be determined to be a business contact of the user, so the existing user may be added to the participant list corresponding to the business identifier of the user. The appropriate participant list for the existing user may be identified in a similar manner to how appropriate groups were identified or created for each of the identified users to be added to the participant list (140, 145).

In some implementations of the process 100, people known to the user that are not existing users of the electronic communications system may be added to the participant list of the user. When a person that is not an existing user of the electronic communications system is added to the participant list of the user, the person may be enabled to use the electronic communications system to communicate with the user. For example, the person may be made a trial user of the electronic communications system when the person is added to the participant list of the user with the process 100. The person then may choose to become a full user of the electronic communications system after being a trial user.

Referring to FIG. 2A, a participant list interface 200 for a given user displays identifiers of other selected users of an instant messaging system with which the given user regularly communicates. The other selected users form a participant list for the given user. Communications with one of the other selected users may be initiated through selection of the corresponding identifier for the other user from the participant list. The other users may have been added to the participant list by the given user manually using identifiers of the other users in the instant messaging system that are known to the given user at the time of addition. More particularly, the participant list interface 200 illustrated in FIG. 2A may be presented to the given user before the process 100 of FIG. 1 is executed for the given user.

The participant list interface 200 includes a text box 205 that contains the participant list for the given user, who is identified by an identifier "AOLUser," as indicated in the title bar 203 of the participant list interface 200. The participant list in the participant list interface 200 includes multiple identifiers 210a-210e. More particularly, the participant list includes the identifier "Friend1" 210a, the identifier "Friend2" 210b, the identifier "Mom" 210c, the identifier "Dad" 210d, and the identifier "Sister" 210e.

The identifiers within the participant list shown by participant list interface 200 are organized into multiple groups 215a-215c. Each identifier within the participant list is associated with at least one of the groups 215a-215c. The participant list includes a "Buddies" group 215a, a "Family" group 215b, and an "Offline" group 215c. The identifier 210a appears below the heading for the group 215a because the identifier 210a has been associated with the group 215a and the corresponding user is present (i.e., logged into the instant messaging system and available to send and receive instant messages). The heading for each of the groups 215a and 215b indicates the number of buddies in the group currently logged into the instant messaging system, as well as the total number of buddies in the group. For example, two out of the two members of the group 215a are logged into the instant messaging system for which the participant list interface 200 is displayed. Similarly, the heading for the "Offline" group 215c indicates the number of other users on the participant list that are not logged into the system (i.e., 0) and the total number of buddies on the participant list (i.e., 5). Typically, when users log into the instant messaging system, identifiers of the users are moved from the "Offline" group 215c to one of the other groups 215a or 215b.

The participant list interface 200 also includes controls 220 that enable the given user to communicate with the other selected users corresponding to the identifiers 210a-210e. For example, the given user may send instant messages, chat invitations, or e-mail messages to the communications identities referenced in the participant list through use of the controls 220. The controls 220 also enable the user to obtain information describing the other users, as well as to modify the set of other users referenced in the participant list interface 200.

The participant list interface 200 also includes controls 225 that enable the given user to access other information not directly related to sending and receiving instant messages. For example, the given user may use the controls to access e-mail messages or other special features of the instant messaging system. The given user also may use the controls 225 to modify preferences for the participant list interface 200.

Referring also to FIGS. 2B and 2C, the participant list displayed in the participant list interface 200 may be augmented with additional identifiers after the process 100 of FIG. 1 is executed for the given user to automatically add identifiers of other users known by the given user to the participant list. More particularly, an identifier 210*f,* "Friend3;" an identifier 210*g,* "Brother;" and an identifier 210*h,* "Boss" have been added to the participant list interfaces 200 illustrated in FIGS. 2B and 2C. The users corresponding to the identifiers 210*f*-210*h* are existing users of the instant messaging system and are known to the given user. The identifiers 210*f*-210*h* may be added to general or specific groups within the participant list interface 200. The identifiers 210*a*-210*e* remain associated with the same respective groups 215*a* and 215*b* as before the process 100 was executed.

In some implementations of the participant list interface 200, one of the groups 215*a* and 215*b* may be designated as a default group to which identifiers are added when different groups for the identifiers are not specified. For example, in the participant list interface 200 illustrated in FIG. 2B, the group 215*a* was designated as the default group, and the identifiers 210*f*-210*h* were automatically added to the group 215*a* during the execution of the process 100. The identifiers 210*f*-210*h* were added to the group 215*a* because a specific group was not identified for the identifiers 210*f*-210*h* during the process 100.

Alternatively or additionally, specific groups to which the identifiers 210*f*-210*h* are to be added may be identified during the process 100. The identifiers 210*f*-210*h* may be added to one or more groups in the participant list, and the one or more groups in the participant list may need to be created before the identifiers 210*f*-210*h* may be added, as is illustrated in the participant list interface 200 of FIG. 2C. In FIG. 2C, the identifier 210*f* has been added to the default group 215*a*, either because the group 215*a* was explicitly identified as the group to which the identifier 210*f* was to be added, or because a group to which the identifier 210*f* was to be added was not identified.

The identifier 210*g* "Brother" was added to the group 215*b* named "Family." The identifier 210*g* may be added to the group 215*b* when the user corresponding to the identifier 210*g* shares a characteristic or is otherwise associated with the users corresponding to the other identifiers 210*c*-210*e* included in the group 215*b* (i.e., they are family members of the given user). The identifier 210*g* also may be added to the group 215*b* when the user corresponding to the identifier 210*g* is included in a corresponding group in another contact list, such as the contact list that was used during the process 100 to identify the user as being known to the given user.

The identifier 210*h* "Boss" has been added to a new group 215*d* called "Co-Workers." The user corresponding to identifier 210*h* is the only member of the new group 215*d* and is presently logged into the instant messaging system, as indicated in the heading of the group 215*d*. The group 215*d* may be created for users corresponding to identifiers in the participant list that have a certain characteristic, including the user corresponding to the identifier 210*h* (i.e. they are co-workers of the given user). As such, the group 215*d* is created for the user corresponding to the identifier 215*h*. Other users that are co-workers of the given user may have their identifiers added to the group 215*d* of the participant list later.

The given user may be presented with a notification that identifiers are being added automatically to the participant list displayed in the participant list interface 200. The given user may be enabled to accept the identifiers to be added such that the automatically added identifiers become visible in the participant list interface 200. Alternatively, the given user may dismiss the identifiers to be added, in which case, the identifiers are not added to the displayed participant list and are not visible in the participant list interface 200. The given user also may be enabled to accept some of the identifiers to be added and dismiss others of the identifiers to be added.

Figure 3:
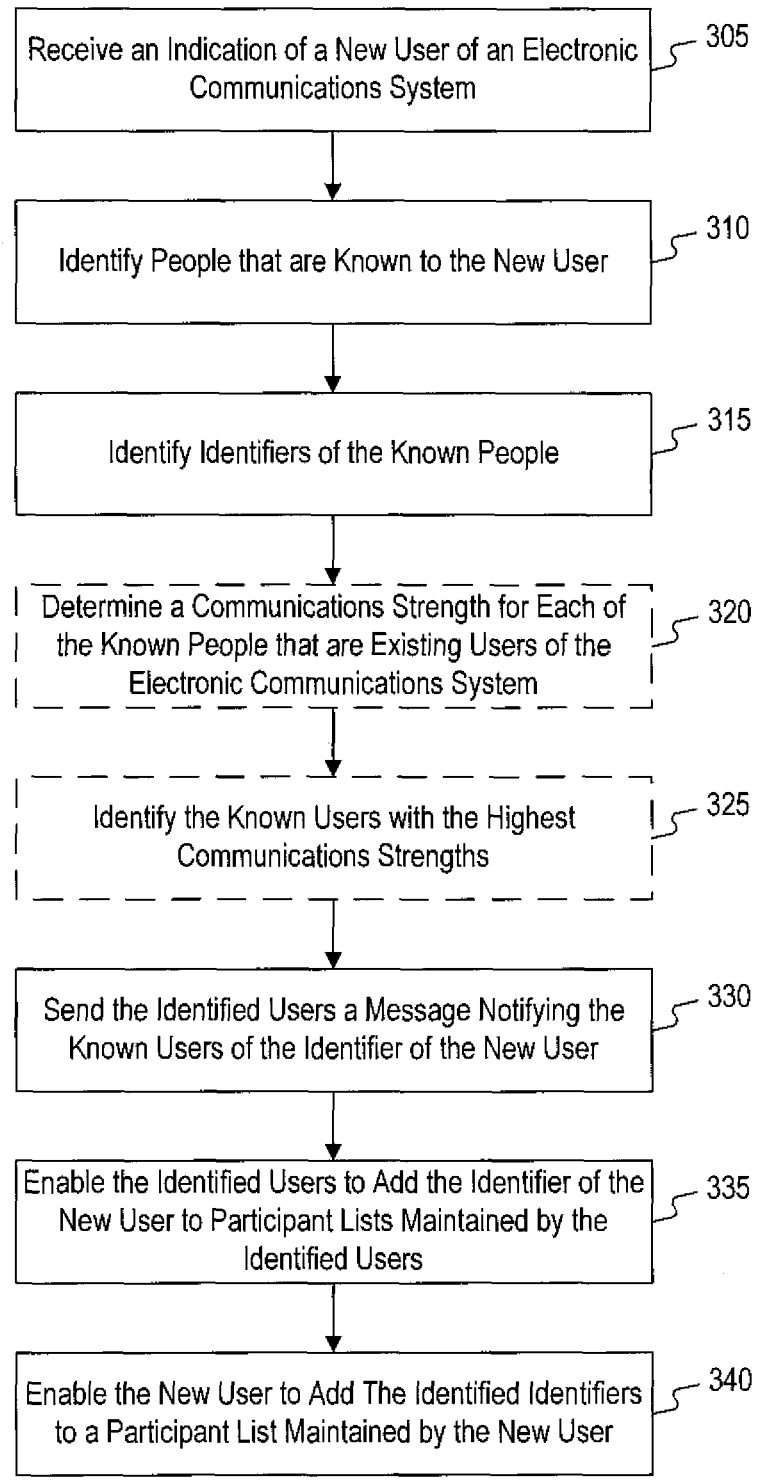
FIG. 3 is a flow chart of a process for announcing a new user of an electronic communications system to existing users of the electronic communications system that are known to the new user.

Referring to FIG. 3, a process 300 is used to announce a new user of an electronic communications system to other users of the electronic communications system that are known to the new user. The process 300 identifies other users of the electronic communications system that are known to the user and notifies the known users that the new user has joined the electronic communications system. In one exemplary implementation, only the known users that have high communications strengths with the new user may be sent notifications. The known users are enabled to add an identifier of the new user to participant lists for the electronic communications system used by the known users. In addition, the new user may be enabled to add identifiers of the known users to which notifications were sent to a participant list used by the new user. The process 300 may be executed when the new user first joins the electronic communications system, or at some time thereafter.

The process 300 begins upon receipt of an indication that there is a new user of the electronic communications system (305). Such an indication may be received, for example, when the new user provides the electronic communications system with personal information, such as a name, address, and phone number, or billing information, such as a credit card or bank account number, that indicates that the new user is joining the electronic communications system. When the new user first joins the electronic communications system, the new user chooses or is assigned an identifier that is used to address messages sent to and from the new user within the electronic communications system. In addition, a participant list may be provided to the new user for use with the electronic communications system. The new user may access identifiers of other users of the electronic communications system that have been added to the participant list to address messages to be sent over the electronic communications system to the other users.

People that are known to the new user are identified (310). The known people may be identified from a contact list that includes contact information for people with whom the new user may communicate, as is done in the process 100 of FIG. 1. Identifiers of the known people are identified (315). Identifying the identifiers of the known people may include directly or indirectly identifying the identifiers from the contact information included in the contact list, as is done in the process 100 of FIG. 1. Identifying an identifier for a known person may indicate that the known person is an existing user of the electronic communications system.

Communications strengths may be determined for each of the known people that is an existing user of the electronic communications system (320). The communications strengths may be calculated from one or more characteristics of the relationship between the new user and each of the existing users, as described above. Alternatively or additionally, the communications strengths may be indicated by the contact list from which the known people was identified, as described above. The known users with high communications strengths may be identified (325). More particularly, the known users with communications strengths above a threshold value that is indicative of a high communications strength may be identified.

The identified users of the electronic communications system may be sent a message that notifies the identified users of the identifier of the new user (330). The previously identified identifiers of the identified users may be used to address the notifications to the identified users. The notification may be sent as a type of message typically sent with the electronic communications system. For example, when the electronic communications system is an instant messaging system, the notifications may be sent as instant messages. As another example, the electronic communications system may be an e-mail system, and the notifications are sent as e-mail messages.

The identified users are enabled to add the identifier of the new user to participant lists used by the identified users (335). In some implementations, the notifications may include an indication of the identifier of the new user and a control that automatically adds the identifier of the new user to the participant lists of the identified users. The control may be a button or a link within the notification that may be selected. In other implementations, the identifier may be added to the participant lists when a response to the notifications is received. For example, when the notifications are sent to the identified users as instant messages, the identifier may be added to the participant lists when affirmative responses to the instant messages are received. In other implementations, the identified users may manually add the identifier to the participant lists when the notifications are received.

The new user is enabled to add the identified identifiers to the participant list that is used by the new user (340). The identifiers may be identified and added to the participant list through execution of the process 100 of FIG. 1. In one implementation, the identifiers of the known people that were sent notifications are added to the participant list. In another implementation, identifiers of all known people are added to the participant list. The new user also may be enabled to manually add the identified identifiers to the participant list.

Figure 4A:
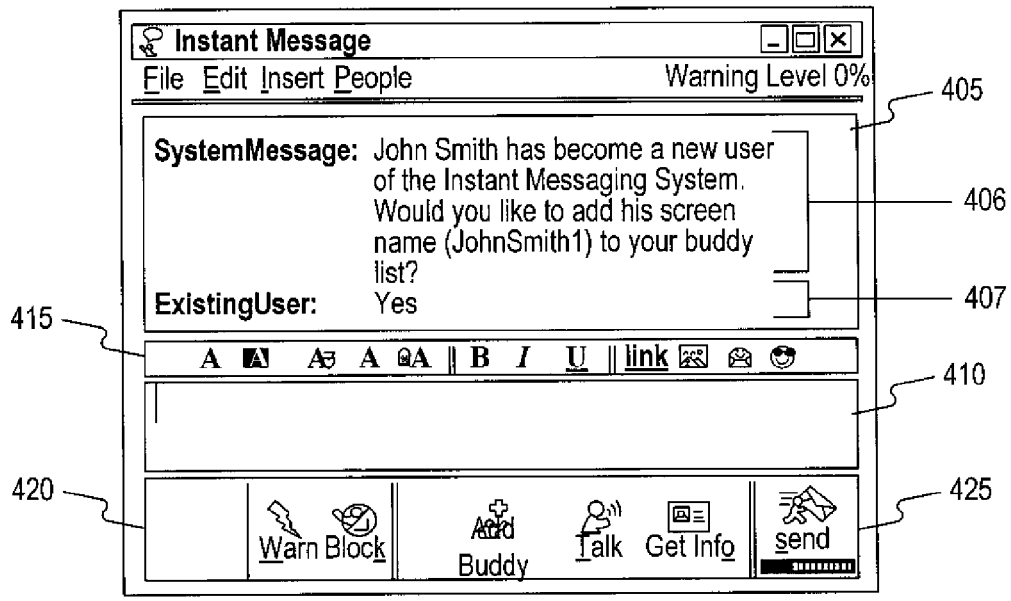
FIGS. 4A and 4B are illustrations of notifications of a new user that are sent to other users.

In some implementations, each of the existing users of the electronic communications system that are known to the new user may use multiple identifiers when communicating over the electronic communications system. The multiple identifiers may be linked such that each of the existing users may communicate using more than one of their multiple identities at a time, and a participant list may be maintained for each of the multiple identities. The participant lists for each of the multiple identities used by an existing user may be conglomerated into a single participant list for the existing user. When an existing user that is known to the new user is enabled to add an identifier of the new user to the single participant list for the existing user, a participant list within the single participant list for the existing user that is appropriate for the addition of the new user may be identified:

Referring to FIG. 4A, a message notifying a user of an instant messaging system of an identifier of a new user of the instant messaging system is displayed in an instant messaging interface 400. Instant messages may be sent and received with the instant messaging interface 400. For example, the instant messaging interface 400 may be used to exchange communications with a user whose identifier is displayed on a participant list interface, such as the participant list interface 200 of FIG. 2A. After a sender of instant messages is notified that a recipient is present and available to send and receive instant messages, the sender may use the instant messaging interface 400 to exchange instant messages with the recipient.

The instant messaging interface 400 includes a message history box 405 that lists the instant messages sent between the sender and the recipient. The message history box 405 also may be referred to as a message transcript box 405. Each message is presented with an indication of an identifier by which the sender or the recipient is identified as the sender of the message. Each message listed in the message history box 405 also includes the text of the instant message sent by the sender or the recipient. For example, the message history box 405 includes a message 406 sent by a user with an identifier "SystemMessage" and a message 407 sent by a user with an identifier "ExistingUser." In one implementation, each message listed in the message history box 405 includes a time stamp of when the message was sent. The users that sent the messages 406 and 407 are the recipient and the sender, respectively.

The instant messaging interface 400 also includes a message specification box 410 in which the sender may specify a message to be sent to the recipient. The sender may enter text to be sent to the recipient in the message specification box 410. The instant message interface 400 includes a set of format controls 415 that may be used to format the text entered in the message specification box 410. More particularly, the controls in the set of format controls 415 enable the user to change the size, foreground color, background color, style, and effects of the text entered in the message specification box 410. The set of format controls 415 also includes controls for inserting objects that are not plain text, such as hyperlinks and emoticons, into the message specification box 410.

After a message has been specified in the message specification box 410, the message may be sent by selecting a send button 425 included in a second control set 420. After the send button 425 has been selected, the text that has been entered in the message specification box 410 is sent to the recipient, and the message specification box 410 is cleared. The message is added to the message history box 405. The message also is displayed in a message history box 405 of an instance of the instant messaging interface 400 being viewed by the recipient: Also included in the second control set 420 are controls for warning instant message senders, blocking instant messages from particular senders, or adding the sender to a participant list used by the sender.

The recipient with the identifier "SystemMessage" may be an instant messaging robot that automatically sends notifications of new users to existing users that are known to the new users, and the sender with the identifier "ExistingUser" may be one of those known existing users. The message 406 is a notification of an identifier of a new user of the instant messaging system that knows the sender. For example, the new user is named "John Smith" and has chosen "JohnSmith1" as an identifier to be used to identify himself in the instant messaging system. The message 407 is an affirmative response to the notification message 406. Upon receiving the affirmative response, the recipient (SystemMessage) automatically adds the identifier of the new user to a participant list maintained for use by the sender (ExistingUser) such that the sender may select the new user's identifier to address instant messages to the new user.

Figure 4B:
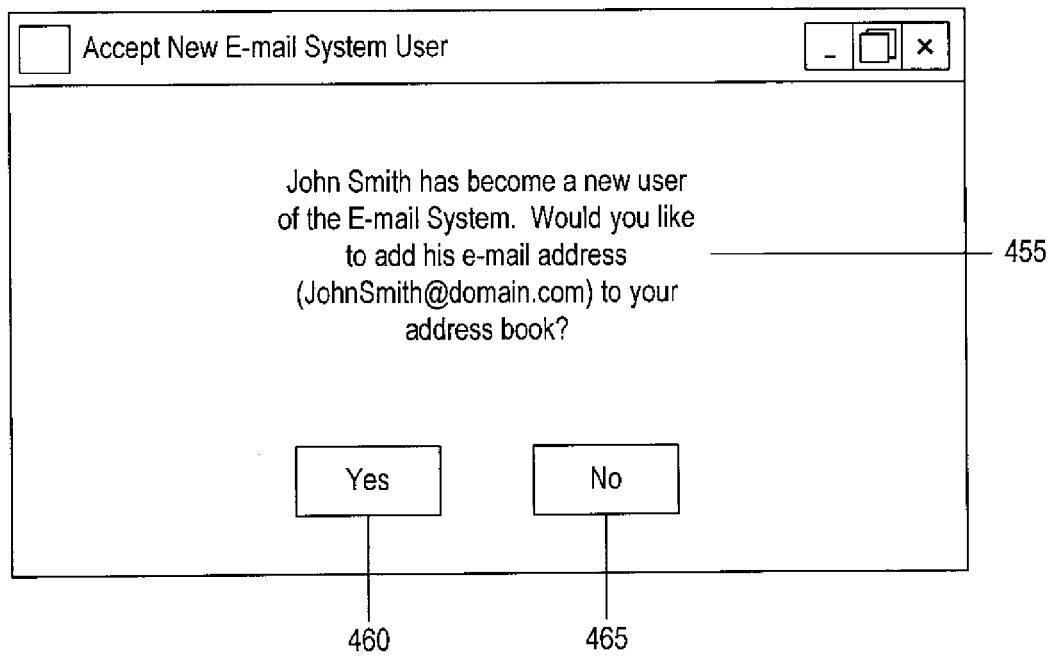

Referring to FIG. 4B, a notification interface 450 notifies an existing user of an electronic communications system, such as an e-mail system, of an identifier of a new user of the electronic communications system, such as an e-mail address of the new user. The notification interface 450 also enables the existing user to import the identifier into a list of contact information, such as an e-mail address book, that is used by the existing user.

The notification interface 450 includes a message 455 that informs the existing user of the identifier of the new user. For example, the message 455 illustrated in FIG. 4B informs the existing user that the new user is a new user of the e-mail system and that the new user's e-mail address is "JohnSmith@domain.com."

The notification interface 450 also includes an accept button 460 that enables the existing user to import the e-mail address of the new user into an e-mail address book used by the existing user. When the existing user selects the accept button 460, the e-mail address of the new user is added to the address book of the existing user. The notification interface 450 also includes a reject button 465 that, when selected, dismisses the notification interface 450 without first adding the e-mail address of the new user to the address book of the existing user.

Referring to FIG. 5A, an exemplary address book 500 may be displayed to a user of an e-mail program. The address book 500 includes a list box 505 that includes a list of the user's contacts. Three contacts, Larry Jones, Bob Davis, and Jane Doe, are shown in the list box 505. When a contact in list box 505 is selected, the contact's information is shown in a box 510. The information includes, for example, the contact's name and the contact's e-mail address. FIG. 5A illustrates the address book 500 before a notification of an e-mail address of a new user, such as the notification interface 450 of FIG. 4B, is displayed for the user.

Referring also to FIG. 5B, the address book 500 also may be displayed to the user after such a notification is displayed. For example, the user, upon being presented with the notification interface 450 of FIG. 4B, may select the accept button 460 to import the e-mail address of the new user into the address book 500, and then may access the address book 500. When the address book 500 is subsequently accessed, the new user appears in the list box 505 as an additional contact 515 named John Smith, as was indicated in the notification interface 450. Selection of the contact 515 displays contact information for the contact 515 in the box 510. For example, the e-mail address 520, "JohnSmith@domain.com," which was indicated on the notification interface 450, is associated with the contact 515 that was added to the address book 500 as a result of the selection of the accept button 460. The contact 515 may be selected from the address book 500 to address messages to the new user. In addition, the new user may have added the user of the address book 500 to an address book used by the new user such that the new user may select the user from the address book to address e-mail messages to the user.

Figure 6:
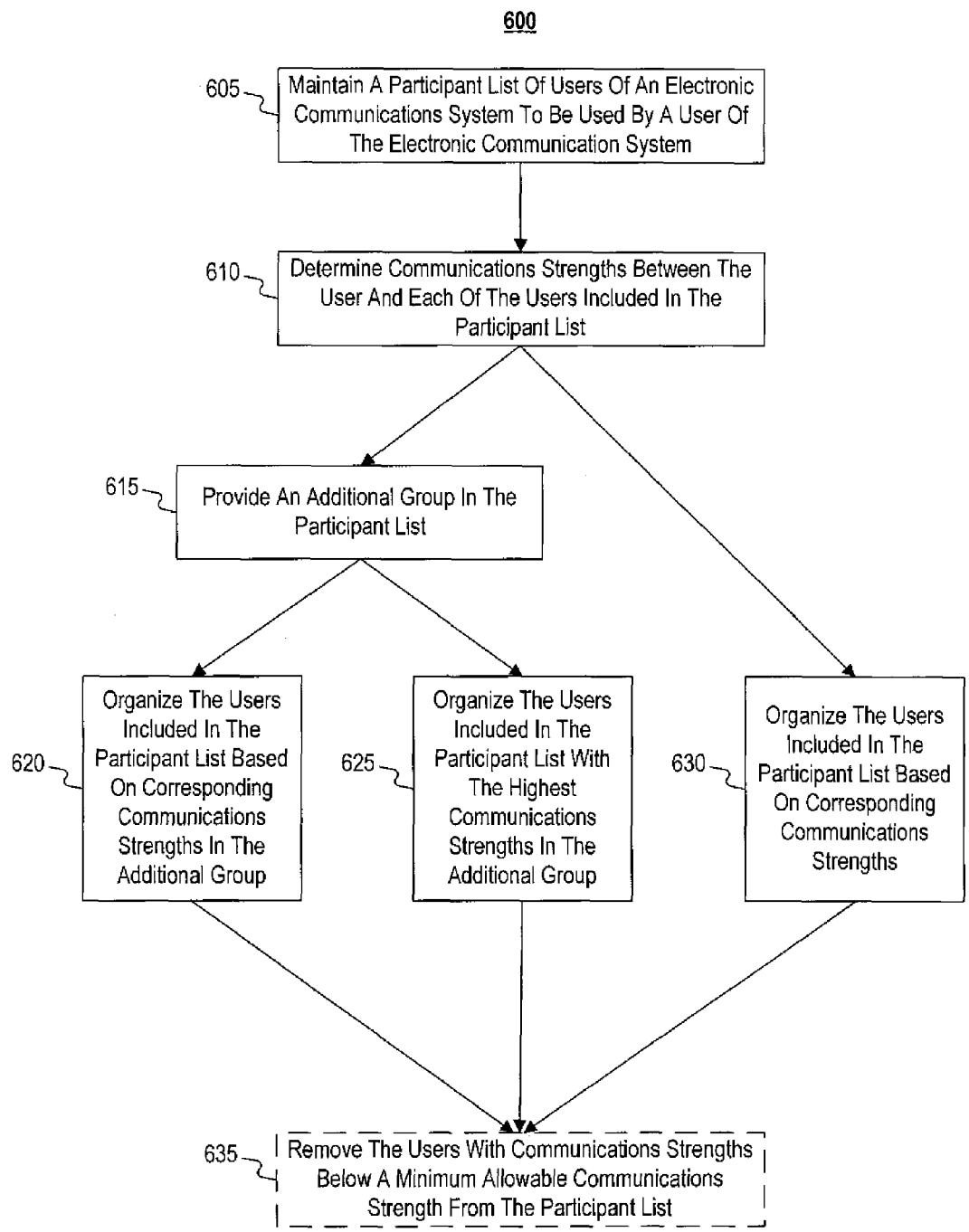
FIG. 6 is a flow chart of a process for organizing entries of a participant list.

Referring to FIG. 6, a process 600 is used to organize a participant list of users of an electronic communications system that is used by a user of the electronic communications system. The users included in the participant list are organized based on communications strengths of the users with the user that uses the participant list. The users may be organized in place in the participant list, or in a special group within the participant list. The special group may only include the users that correspond to the highest communications strengths. In addition, the users that correspond to the lowest communications strengths may be removed from the participant list, because communication with those users is unlikely. The process 600 may be executed when the user first becomes a user of the electronic communications system, periodically on a recurring basis, or after an indication to execute the process 600 is received from the user.

Initially, the participant list used by the user is maintained (605). The user may use the participant list to communicate with the other users included in the participant list. The participant list includes one or more identifiers of the other users, and the user may select an identifier from the participant list to address a message to be sent to the corresponding user with the electronic communications system. The identifiers included in the participant list may be separated into one or more groups that categorize or otherwise organize the other users. The location of the identifier within the participant list may affect how quickly and easily the user may find and select the identifier and send the message.

Communications strengths are determined for each of the users included in the participant list (610). The communications strengths may be calculated from one or more characteristics of the relationship between the new user and each of the known users, as described above.

An additional group within the participant list may be provided (615). Copies of the identifiers of some or all of the users included in the participant list may be organized within the additional group. In one implementation, the additional group is added to the end of the participant list below other existing groups within the participant list. Organizing copies of the identifiers within the additional group does not disrupt the organization of other copies of the identifiers included in other existing groups of the participant list. Therefore, the user may access the unorganized identifiers, with which the user may be more familiar, or the organized identifiers in the additional group when accessing identifiers to address messages to the corresponding users of the electronic communications system.

The users included in the participant list may be organized based on communications strength in the additional group (620). In one implementation, second copies of identifiers of users with higher communications strengths are placed above identifiers of users with lower communications strengths in the additional group. All users included in the participant list are organized within the additional group, so the participant list includes two copies of an identifier of each of the users included in the participant list. Copies of the identifiers in the other existing groups are not organized by communications strength.

Alternatively, only some of the users included in the participant list may be organized based on communications strength in the additional group. For example, the users with the highest communications strengths may be organized in the additional group (625). Identifiers of users with higher communications strengths may be placed above identifiers of users with lower communications strengths in the additional group. In one implementation, identifiers of a particular number of the users with the highest communications strengths are organized within the participant list. In another implementation, identifiers of the users with communications strengths above a threshold value are organized within the additional group. Only some of the users of the participant list are organized within the additional group, so the participant list includes two copies of an identifier of some of the users included in the participant list. Copies of the identifiers in the other existing groups remain unorganized.

When the additional group is not provided within the participant list, the users included in the participant list are organized in place based on corresponding communications strengths (630). Doing so may change the order in which the identifiers of the included users appear in the participant list. Identifiers of users with higher communications strengths may be placed above identifiers of users with lower communications strengths within each group of the participant list. In such implementations, the participant list includes a single copy of each different identifier, and no identifiers are moved or copied between groups.

Identifiers of the users included in the participant list corresponding to the lowest communications strengths may be removed from the participant list (635). For example, identifiers of the users corresponding to communications strengths that are below a threshold value may be removed from the participant list. A low communications strength for a particular user is indicative of a weak relationship between the particular user and the user. As such, the user most likely does not communicate with the particular user very often, and the user most likely does not access an identifier of the particular user included in the participant list to address a message to the particular user very often. Therefore, the identifier of the particular user, and other users included in the participant list corresponding to the lowest communications strengths, may be removed from the participant list. As an alternative to removal, these users may be moved to a special group designated as being for users with lower communications strengths.

In some implementations, the user of the electronic communications system whose participant list is maintained with the process 600 may use multiple identifiers when communicating over the electronic communications system. The multiple identifiers may be linked such that the user may communicate using more than one of the multiple identities at a time. Furthermore, the user may maintain a participant list for each of the multiple identities, and the participant list for a particular identifier may include other users with whom the user communicates using the particular identifier. The participant lists for each of the multiple identities may be conglomerated into a single participant list that is maintained with the process 600.

When organizing the participant list of the user with the process 600, the multiple participant lists corresponding to the user may be organized individually. In addition, an additional participant list may be added to the single participant list for the user. The additional participant list may include one or more users from one or more of the multiple participant lists for the user in an organized manner, in a manner similar to how users of the participant list were organized within an additional group within the participant list (620, 625).

Referring to FIGS. 7A-7C, a participant list interface 200 for a given user displays in an organized manner the identifiers of other selected users of an instant messaging system with which the given user regularly exchanges instant messages. More particularly, the participant list interfaces 200 illustrated in FIGS. 7A-7C display organized listings of the identifiers displayed in the participant list interface 200 of FIG. 2A. The participant list interfaces 200 illustrated in FIGS. 7A-7C are presented to the given user after various implementations of the process 600 of FIG. 6 are executed for the given user.

The participant list interface 200 in FIG. 7A is presented to the given user after the execution of an implementation of the process 600 in which the displayed identifiers are organized in place within the groups with which the displayed identifiers are associated. The displayed identifiers are organized within the participant list based on communications strength between the corresponding other users and the given user, with identifiers corresponding to higher communications strengths appearing within the groups above identifiers corresponding to lower communications strengths. In addition, identifiers corresponding to exceedingly low communications strengths may be removed from the participant list.

For example, in the participant list interface 200 from FIG. 2A, the identifier 210a is listed above the identifier 210b in the group 215a. However, in the participant list interface 200 of FIG. 7A, the identifier 210b is listed above the identifier 210a in the group 215a because the user corresponding to the identifier 210a has a higher communications strength with the given user than the user corresponding to the identifier 210a. The identifiers 210a and 210b are still associated with the group 215a.

Similarly, the screen names 210c, 210d, and 210e are presented within the group 215b in that order in the participant list 200 of FIG. 2B. However, in the participant list interface 200 of FIG. 7A, the identifier 210e is listed above the identifier 210c in the group 215b, and the identifier 210d is no longer associated with the group 215b. Such a display of the identifiers 210c-210e indicates that the user corresponding to the identifier 210e has the highest communications strength with the given user among the users corresponding to the identifiers 210c-210e. The user corresponding to the identifier 210d has a communications strength with the given user that warrants removing the identifier from the participant list, and the user corresponding to the identifier 210c has a communications strength between the communications strengths corresponding to the identifiers 210d and 210e.

Organizing the identifiers 210a-210e within the groups with which the identifiers 210a-210e are associated indicates the relative communications strengths of the users corresponding to a particular group. However, the relative communications strengths of users whose identifiers are associated with different groups are not easily seen with such an organization. Organizing the identifiers 210a-210e without reference to a particular group indicates the relative communications strengths of users whose identifiers are associated with different groups.

The participant list interfaces 200 in FIGS. 7B and 7C are presented to the given user after the execution of implementations of the process 600 in which the displayed identifiers are organized within a special group in the participant list based on communications strength. More particularly, all of the identifiers displayed in the participant list interface 200 of FIG. 2A are organized within the special group displayed in the participant list interface 200 of FIG. 7B, and the identifiers corresponding to the highest communications strengths are organized within the special group displayed in the participant list interface 200 of FIG. 7C. Identifiers corresponding to higher communications strengths are displayed within the special group above identifiers corresponding to lower communications strengths.

The participant list interfaces 200 of FIGS. 7B and 7C include a special group 215e, "Organized," that includes some or all of the identifiers 210a-210e. The header of the special group 215e indicates that all of the users associated with the special group 215e are present and available to exchange instant messages. In FIG. 7B, the identifier 210e is the first identifier listed in the special group 215e, the identifier 210b is the second, the identifier 210c is the third, the identifier 210a is the fourth, and the identifier 210d is the fifth. In FIG. 7C, only the identifiers 210e, 210b, and 210c, are listed within the special group 215e in the same order as in FIG. 7B. The order of appearance of the identifiers 210a-210e within the special group 215e is indicative of the relative communications strengths of the users corresponding to the identifiers 210a-210e. The identifiers 210a-210e remain associated with the groups 215a-215c such that some or all of the identifiers 210a-210e are displayed in the participant list interface 200 twice.

The special group 215e may be placed above, below, or among the other existing groups 215a-215c to facilitate viewing and selecting the organized identifiers 210a-210e. In some implementations, the identifiers 210a-210e may be selectable from the participant list interfaces 200 of FIGS. 7A-7C to reveal the communications strengths of the users corresponding to the identifiers 210a-210e. For example, selecting one of the identifiers 210a-210e may cause a tool tip or some other pop-up window to be displayed with an indication of the communications strength of the user corresponding to the selected identifier. The indication of the communications strength may be a numerical value for the communications strength or a more qualitative description of the communications strength.

The described techniques for augmenting and organizing participant lists of identifiers used in sending and receiving electronic messages may be applied to any type of participant list associated with any type of electronic communications system. For example, a list of users of an instant messaging system for which presence information is monitored, an e-mail address book used with an e-mail system, a list of users of a social network used with a social networking system, or any other list of contact information that includes information that may be used to contact other people, may be automatically augmented with contact information of known people. The same contact lists may be organized to facilitate accessing and selecting contact information that may be used to contact other people.

Figure 8:
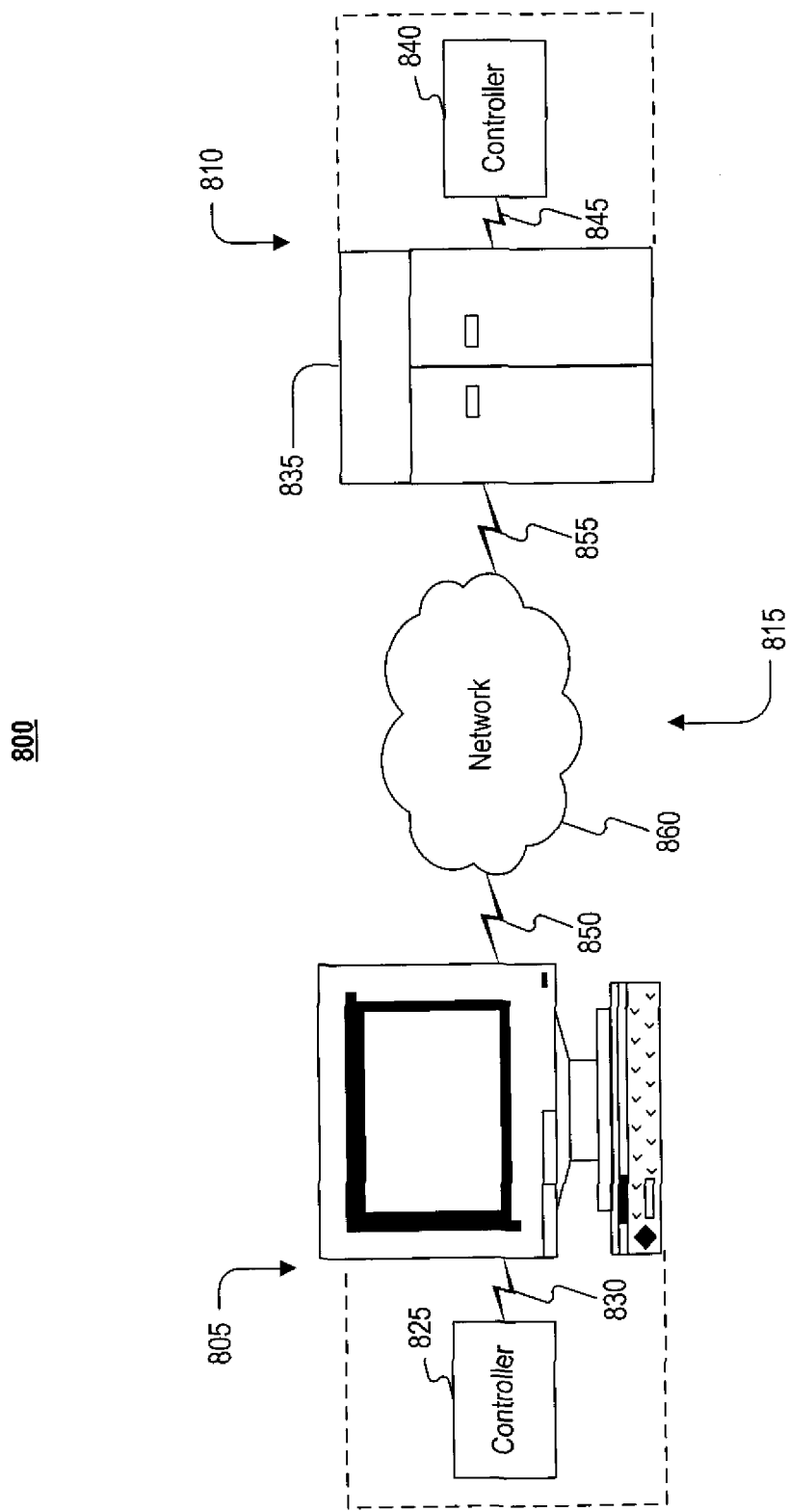
FIG. 8 is a block diagram of a communications system.
Figure 9:
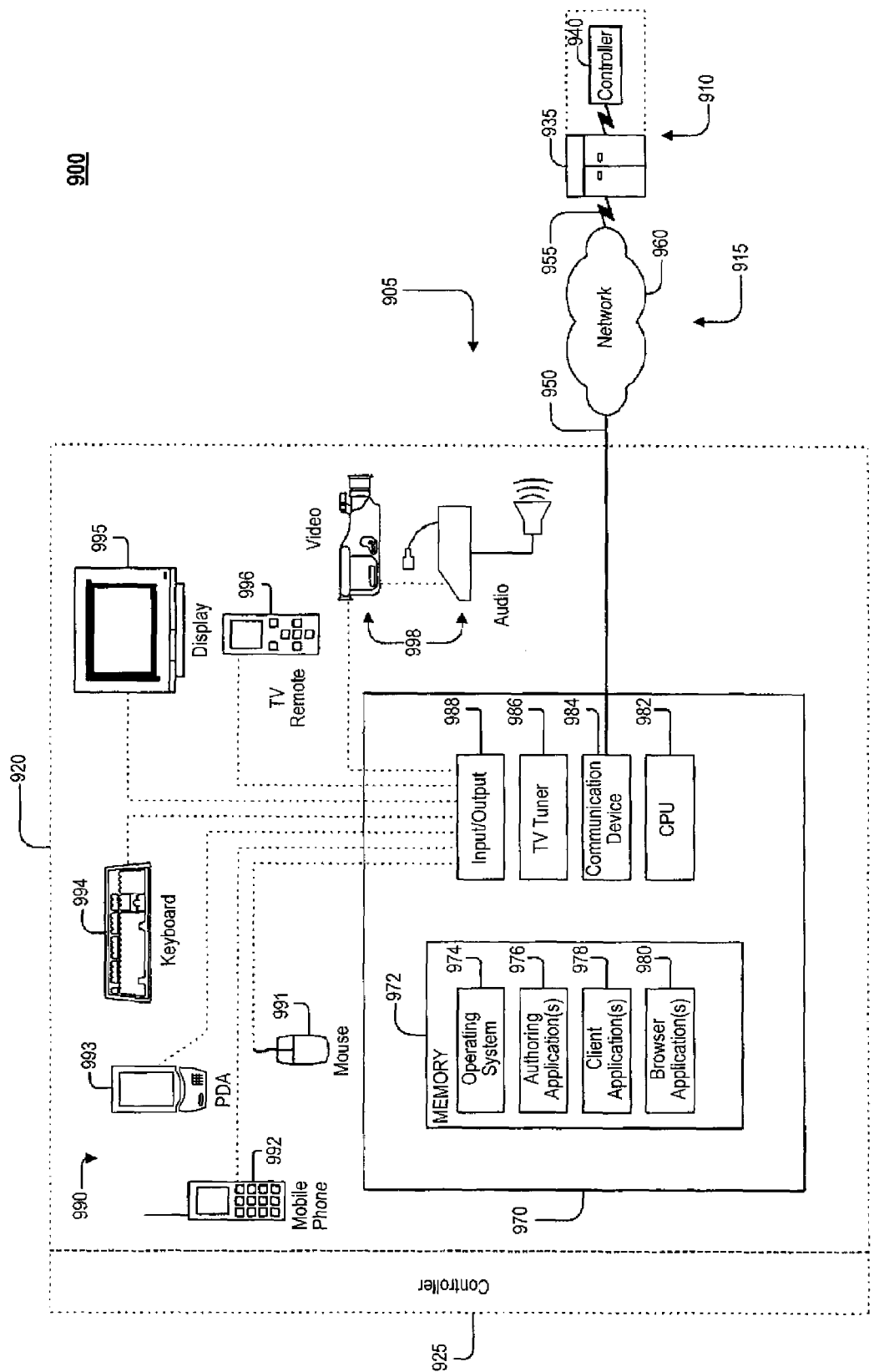
FIGS. 9 and 10 are expansions of the block diagram of FIG. 8.
Figure 10:
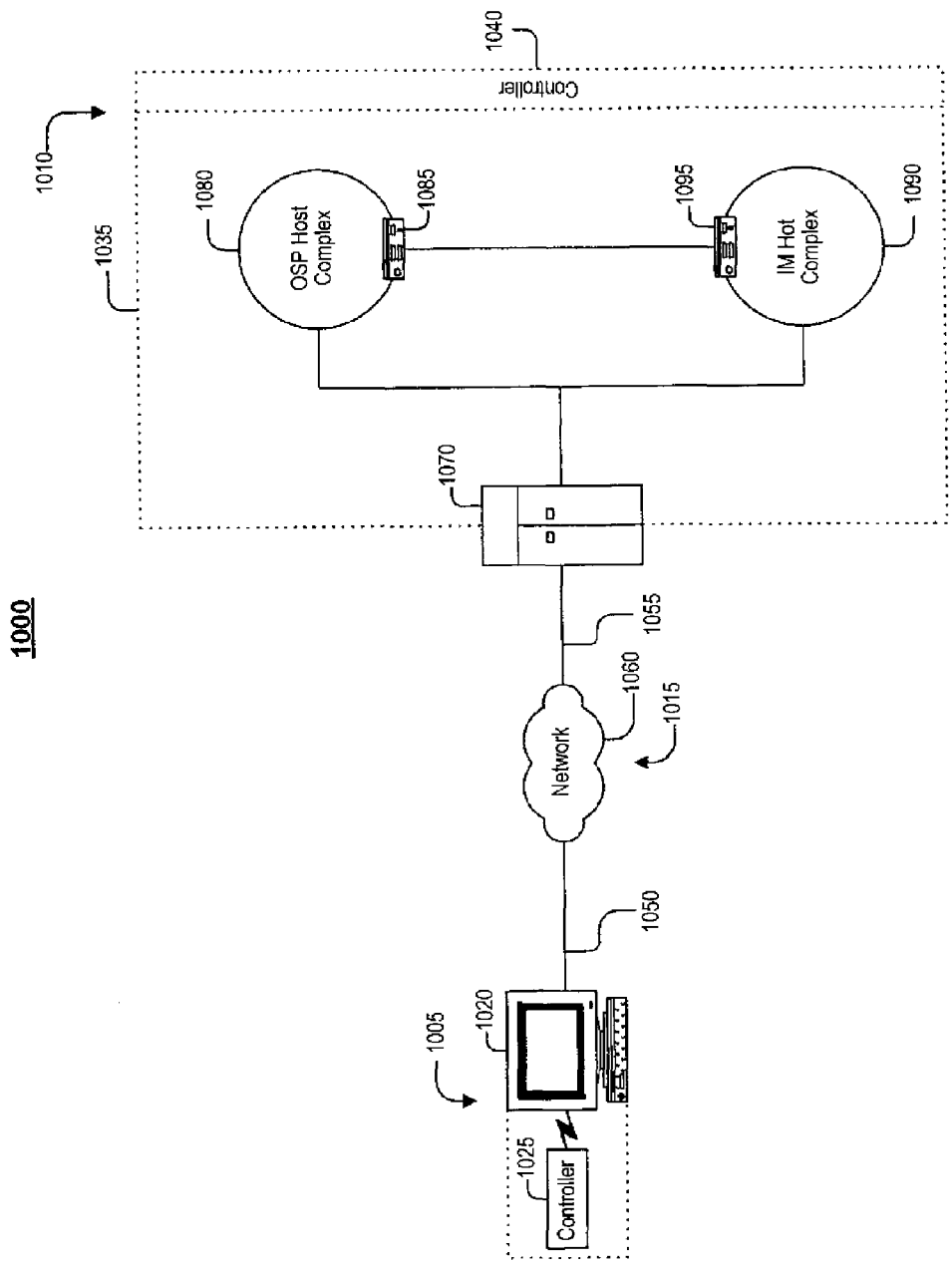

FIGS. 8-10 illustrate exemplary block diagrams of an electronic communications system that may be used as part of the implementation of the features described above.

For illustrative purposes, FIGS. 8-10 show an example of a communications system for implementing techniques for transferring electronic data, including instant messages and e-mail. For brevity, several elements in the figures described below are represented as monolithic entities. However, as would be understood by one skilled in the art, these elements each may include numerous interconnected computers and components designed to perform a set of specified operations and/or may be dedicated to a particular geographical region.

Referring to FIG. 8, a communications system 800 is capable of delivering and exchanging data between a user system 805 and a provider system 810 through a communications link 815. The user system 805 typically includes one or more user devices 820 and/or user controllers 825, and the provider system 810 typically includes one or more provider devices 835 and/or provider controllers 840. For example, the user system 805 or the provider system 810 may include one or more general-purpose computers (e.g., personal computers), one or more special-purpose computers (e.g., devices specifically programmed to communicate with each other and/or the user system 805 or the provider system 810), or a combination of one or more general-purpose computers and one or more special-purpose computers. The user system 805 and the provider system 810 may be arranged to operate within or in concert with one or more other systems, such as, for example, one or more LANs ("Local Area Networks") and/or one or more WANs ("Wide Area Networks").

The user device 820 (or the provider device 835) is generally capable of executing instructions under the command of a user controller 825 (or a provider controller 840). The user device 820 (or the provider device 835) is connected to the user controller 825 (or the provider controller 840) by a wired or wireless data pathway 830 or 845 capable of delivering data.

Each of the user device 820, the user controller 825, the provider device 835, and the provider controller 840 typically includes one or more hardware components and/or software components. An example of a user device 820 or a provider device 835 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. The user device 820 and the provider device 835 may include devices that are capable of peer-to-peer communications.

An example of a user controller 825 or a provider controller 840 is a software application loaded on the user device 820 or the provider device 835 for commanding and directing communications enabled by the user device 820 or the provider device 835. Other to examples include a program, a piece of code, an instruction, a device, a computer, a computer system, or a combination thereof, for independently or collectively instructing the user device 820 or the provider device 835 to interact and operate as described. The user controller 825 and the provider controller 840 may be embodied permanently or temporarily in any type of machine, component, physical or virtual equipment, storage medium, or propagated signal capable of providing instructions to the user device 820 or the provider device 835.

The communications link 815 typically includes a delivery network 860 making a direct or indirect communication between the user system 805 and the provider system 810, irrespective of physical separation. Examples of a delivery network 860 include the Internet, the World Wide Web, WANs, LANs, analog or digital wired and wireless telephone networks (e.g. PSTN, ISDN, and xDSL), radio, television, cable, satellite, and/or any other delivery mechanism for carrying data. The communications link 815 may include communication pathways 850 and 855 that enable communications through the one or more delivery networks 860 described above. Each of the communication pathways 850 and 855 may include, for example, a wired, wireless, cable or satellite communication pathway.

FIG. 9 illustrates a communications system 900 including a user system 905 communicating with a provider system 910 through a communications link 915. User system 905 typically includes one or more user devices 920 and one or more user controllers 925 for controlling the user devices 920. Provider system 910 typically includes one or more provider devices 935 and one or more provider controllers 940 for controlling the provider devices 935. The communications link 915 may include communication pathways 950 and 955 that enable communications through the one or more delivery networks 960.

Examples of each element within the communications system of FIG. 9 are broadly described above with respect to FIG. 8. In particular, the provider system 910 and communications link 915 typically have attributes comparable to those described with respect to the provider system 810 and the communications link 815 of FIG. 8. Likewise, the user system 905 of FIG. 9 typically has attributes comparable to and illustrates one possible implementation of the user system 805 of FIG. 8.

The user device 920 typically includes a general-purpose computer 970 having an internal or external storage 972 for storing data and programs such as an operating system 974 (e.g., DOS, Windows™, Windows 95™, Windows98™, Windows 2000™, Windows Me™, Windows XP™, Windows NT™, OS/9, or Linux) and one or more application programs. Examples of application programs include authoring applications 976 (e.g., word processing programs, database programs, spreadsheet programs, or graphics programs) capable of generating documents or other electronic content; user applications 978 (e.g., AOL user, CompuServe user, AIM user, AOL TV user, or ISP user) capable of communicating with other computer users, accessing various computer resources, and viewing, creating, or otherwise manipulating electronic content; and browser applications 980 (e.g., Netscape's Navigator or Microsoft's Internet Explorer) capable of rendering standard Internet content and also capable of supporting a web-based e-mail user and a web-based instant messaging user.

The general-purpose computer 970 also includes a central processing unit 982 (CPU) for executing instructions in response to commands from the user controller 925. In one implementation, the user controller 925 includes one or more of the application programs installed on the internal or external storage 972 of the general-purpose computer 970. In another implementation, the user controller 925 includes application programs externally stored in and performed by one or more device(s) external to the general-purpose computer 970.

The general-purpose computer typically will include a communication device 984 for sending and receiving data. One example of the communication device 984 is a modem. Other examples include a transceiver, a set-top box, a communication card, a satellite dish, an antenna, or another network adapter capable of transmitting and receiving data over the communications link 915 through a wired or wireless data pathway 950. The general-purpose computer 970 also may include a TV tuner 986 for receiving television programming in the form of broadcast, satellite, and/or cable TV signals. As a result, the user device 920 can selectively and/or simultaneously display network content received by communications device 984 and television programming content received by the TV tuner 986.

The general-purpose computer 970 typically will include an input/output interface 988 for wired or wireless connection to various peripheral devices 990. Examples of peripheral devices 990 include, but are not limited to, a mouse 991, a mobile phone 992, a personal digital assistant 993 (PDA), an MP3 player (not shown), a keyboard 994, a display monitor 995 with or without a touch screen input, a TV remote control 996 for receiving information from and rendering information to subscribers, and an audiovisual input device 998.

Although FIG. 9 illustrates devices such as a mobile telephone 992, a PDA 993, and a TV remote control 996 as being peripheral with respect to the general-purpose computer 970, in another implementation, such devices may themselves include the functionality of the general-purpose computer 970 and operate as the user device 920. For example, the mobile phone 992 or the PDA 993 may include computing and networking capabilities and function as a user device 920 by accessing the delivery network 960 and communicating with the provider system 910. Furthermore, the user system 905 may include one, some or all of the components and devices described above.

Referring to FIG. 10, a communications system 1000 is capable of delivering and exchanging information between a user system 1005 and a provider system 1010 through a communication link 1015. User system 1005 typically includes one or more user devices 1020 and one or more user controllers 1025 for controlling the user devices 1020. Provider system 1010 typically includes one or more provider devices 1035 and one or more provider controllers 1040 for controlling the provider devices 1035. The communications link 1015 may include communication pathways 1050 and 1055 that enable communications through the one or more delivery networks 1060.

Examples of each element within the communications system of FIG. 10 are broadly described above with respect to FIGS. 8 and 9. In particular, the user system 1005 and the communications link 1015 typically have attributes comparable to those described with respect to user systems 805 and 905 and communications links 815 and 915 of FIGS. 8 and 9. Likewise, the provider system 1010 of FIG. 10 may have attributes comparable to and illustrates one possible implementation of the provider systems 810 and 910 shown in FIGS. 8 and 9.

The provider system 1010 includes a provider device 1035 and a provider controller 1040. The provider controller 1040 is generally capable of transmitting instructions to any or all of the elements of the provider device 1035. For example, in one implementation, the provider controller 1040 includes one or more software applications loaded on the provider device 1035. In other implementations, as described above, the provider controller 1040 may include any of several other programs, machines, and devices operating independently or collectively to control the provider device.

The provider device 1035 includes a login server 1070 for enabling access by subscribers and for routing communications between the user system 1005 and other elements of the provider device 1035. The provider device 1035 also includes various provider complexes such as the depicted OSP ("Online Service Provider") provider complex 1080 and IM ("Instant Messaging") provider complex 1090. To enable access to these provider complexes by subscribers, the user system 1005 includes communication software, for example, an OSP user application and an IM user application. The OSP and IM communication software applications are designed to facilitate the subscriber's interactions with the respective services and, in particular, may provide access to all the services available within the respective provider complexes.

Typically, the OSP provider complex 1080 supports different services, such as e-mail, discussion groups, chat, news services, and Internet access. The OSP provider complex 1080 is generally designed with an architecture that enables the machines within the OSP provider complex 1080 to communicate with each other and employs certain protocols (i.e., standards, formats, conventions, rules, and structures) to transfer data. The OSP provider complex 1080 ordinarily employs one or more OSP protocols and custom dialing engines to enable access by selected user applications. The OSP provider complex 1080 may define one or more specific protocols for each service based on a common, underlying proprietary protocol.

The IM provider complex 1090 is generally independent of the OSP provider complex 1080, and supports instant messaging services irrespective of a subscriber's network or Internet access. Thus, the IM provider complex 1090 allows subscribers to send and receive instant messages, whether or not they have access to any particular ISP. The IM provider complex 1090 may support associated services, such as administrative matters, advertising, directory services, chat, and interest groups related to instant messaging. The IM provider complex 1090 has an architecture that enables all of the machines within the IM provider complex to communicate with each other. To transfer data, the IM provider complex 1090 employs one or more standard or exclusive IM protocols.

The provider device 1035 may include one or more gateways that connect and therefore link complexes, such as the OSP provider complex gateway 1085 and the IM provider complex gateway 1095. The OSP provider complex gateway 1085 and the IM provider complex gateway 1095 may directly or indirectly link the OSP provider complex 1080 with the IM provider complex 1090 through a wired or wireless pathway. Ordinarily, when used to facilitate a link between complexes, the OSP provider complex gateway 1085 and the IM provider complex gateway 1095 are privy to information regarding the protocol type anticipated by a destination complex, which enables any necessary protocol conversion to be performed incident to the transfer of data from one complex to another. For instance, the OSP provider complex 1080 and IM provider complex 1090 generally use different protocols such that transferring data between the complexes requires protocol conversion by or at the request of the OSP provider complex gateway 1085 and/or the IM provider complex gateway 1095.

Figure 11:
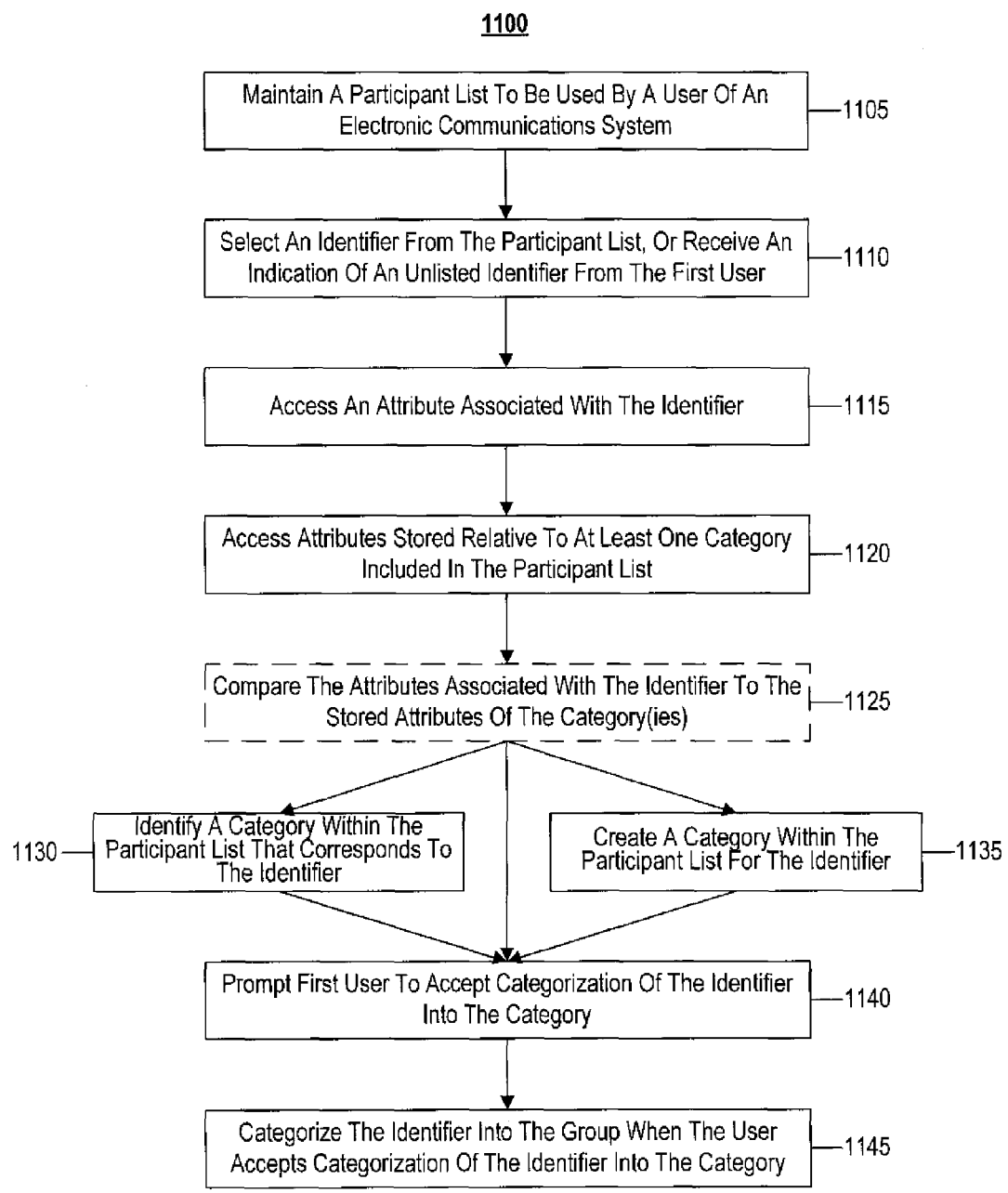
FIG. 11 is a flow chart of another process for passively populating a participant list for a user of an electronic communications system with known contacts of the user.

Referring to FIG. 11, a process 1100 is used to categorize contacts in a contact list. For example, the process 1100 may be used to categorize contacts of a participant list of an instant messaging system, or a list of users of the instant messaging system for which presence information is monitored. Attributes of users included in the participant list are identified, and categories into which the participants should be categorized are identified based on the identified attributes. If one or more of the categories are not already included in the participant list, those categories may be newly included in the list (i.e., added).

Initially, the participant list used by a first user of an electronic communications system is maintained (1105). The first user may use the participant list to communicate with the other users included in the participant list. The participant list includes one or more identifiers of the other users, and the first user may select an identifier from the participant list as an address for purposes of sending a message to the corresponding user with the electronic communications system. The identifiers included in the participant list may be separated into one or more categories that categorize or otherwise organize the other users.

The location of the identifier within the participant list may affect how quickly and easily the first user may find and select the identifier and send the message.

An identifier is selected from the participant list, or an indication of an unlisted identifier to be added to the participant list may be received from the first user (1110). The identifier may be selected from the participant list in response to a request from the first user to categorize the identifier. An attribute of the selected identifier and/or its corresponding user is accessed (1115). The attribute may be a characteristic of the identifier or its corresponding user, or a use-based metric that measures, for example, recent activity of the identifier or its corresponding user. For example, the attribute may be a location of the user, an age of the user, an occupation of the user, an interest of the user, an activity of the user, or another attribute that describes the user. Alternatively or additionally, the attribute may describe the communications exchanged between the first user and the identifier or its corresponding user. For example, the attribute may indicate a frequency with which the first user exchanges messages via instant messaging or otherwise, a number of instant messages that are exchanged between the first user and the selected identifier or its corresponding user, a length of messages exchanged between the first user and the selected identifier or its corresponding user, and a time at which the first user has most recently or otherwise exchanged messages with the selected identifier or its corresponding user. For example, the attribute may indicate whether the messages have been received from the selected identifier or its corresponding user today, yesterday, in the past week, or in the past month. As another example, the attribute may indicate whether the messages have been received from the selected identifier or its corresponding user with a frequency of at least one a day, at least one a week, or at least one a month. As yet another example, the attribute may indicate whether the messages that have been received from the selected identifier or its corresponding user are at least a threshold length, or are at most a threshold length.

The attribute describing the communications exchanged between the first user and the selected identifier or its corresponding user may consider communications sent using one or more communications systems. For example, a frequency, number, length, or time of instant messages sent between the first user and the selected identifier or its corresponding user may be used to determine the attribute. As another example, instant messages and e-mail messages may be used to determine the attribute. As yet another example, instant messages, e-mail messages, and voice over Internet protocol (VoIP) telephone calls may be used to determine the attribute.

Alternatively or additionally, the attribute may be identified by accessing a second list of entities for which contact information is maintained, such as an address book of an e-mail system. The attribute of the identifier may be identified as a category within the second list that includes the identifier or the user corresponding to the identifier, or information sources available for either (i.e. Internet search). The attribute may be identified from a profile associated with the identifier, such as a profile of a user corresponding to the identifier. Alternatively or additionally, information describing the messages exchanged between the first user and the identifier or its corresponding user, such as a log of those messages, may be examined to identify the attribute.

Attributes stored relative to at least one category included in the participant list are accessed (1120). The attributes associated with the identifier are compared to the stored attributes of the categories (1125). If the identifier is associated with an attribute that has been stored for a particular category, then the identifier corresponds to the category, and the identifier should be included in the category.

A category within the participant list that corresponds to the identifier may be identified, based on the comparison (1130). More particularly, a category associated with the identified attribute is identified from the participant list. For example, if the identifier or its corresponding user is determined to have a particular occupation, then a category associated with the particular occupation may be identified. As another example, if the user corresponding to the identifier has a common last name with first user, then a category associated with family members of the first user may be identified. As yet another example, a category associated with a particular address or location may be identified when the user corresponding to the identifier lives at, or is otherwise associated with, the particular address or location. The category may be a category with which the identifier is not currently associated.

If such a category does not exist, then the category may be added to the participant list (1135). Adding the category may include making perceivable a pre-existing category that was previously hidden while unpopulated. Adding the category also may include supplementing the participant list with a category that was not previously included in the list. In one implementation, the category is added to the end of the participant list below other existing categories within the participant list. The identified or added category may be a sub-category of another category within the participant list. The sub-category may be identified or added by first identifying the super-category that includes the sub-category, and then identifying or adding the sub-category within the super-category.

The first user is prompted to accept categorization of the identifier into the identified category (1140). If the first user accepts the categorization, then the identifier is categorized into the identified or added category (1145). If the user does not accept the categorization, then another attempt to categorize the identifier into a different category may be made by executing the process 1100 again. Alternatively or additionally, the first user may be enabled to manually categorize the identifier. In other words, the first user may be enabled to override the suggested categorization.

The process 1100 may be repeated to categorize all or other identifiers included in the participant list. In other words, attributes of each of the identifiers included in the participant list may be identified (1115), and the attributes may be compared to attributes of categories included in the participant list (1120, 1125) to identify one or more categories (1130, 1135) into which each of the identifiers should be categorized (1145).

In some implementations, multiple attributes may be identified for the identifier, and the multiple attributes may be used to identify multiple categories of the participant list to which the identifier corresponds. In addition, a single attribute may indicate multiple categories of the participant list to which the identifier corresponds. As a result, the identifier may appear in the participant list multiple times, which may facilitate selecting the user from the participant list. More particularly, the identifier appearing in the participant list multiple times may increase the chances of the first user being able to identify the identifier from the participant list.

Alternatively, some categories may be mutually exclusive of each other, or they may be populated as such to reduce screen clutter. For example, an identifier with whom communications are exchanged yesterday would be categorized in each of the "Yesterday" and "This Week" categories, by definition. However, to reduce screen clutter, it may be listed only in the "Yesterday" category until no longer appropriately categorized as such, or its appearance in each may be changed to reflect multiple categorizations.

Referring to FIGS. 12A and 12B, a participant list interface 200 for a given user (i.e., a first user) displays a participant list that includes identifiers of other selected users of an instant messaging system with which the given user regularly exchanges instant messages. More particularly, the participant list in the participant list interface 200 includes multiple identifiers 1210a-1210c. For example, the participant list includes the identifier "Friend1" 1210a, the identifier "Friend2" 1210b, and the identifier "Mom" 1210c.

The identifiers 1210a-1210c are organized into multiple groups 1215a-1215e. The participant list includes a "Today" group 1215a, a "Yesterday" group 1215b, a "This Week" group 1215c, a "My Town" group 1215d, and a "Long Messages" group 1215d. The groups 1210a-1210c include identifiers of users with which the given user has exchanged messages on a current day, a day before the current day, or a week that includes the current day, respectively. The group 1210d includes identifiers of people that live in a town of the given user, and the group 1210e includes identifiers of people that exchange long messages with the given user.

The participant list interface 200 of FIG. 12A is presented to the given user before the process 1100 of FIG. 11 has been executed. The categorization of the identifiers 1210a-1210c displayed in the participant list interface 200 of FIG. 12A may be the result of a previous execution of the process 1100. The participant list interface 200 of FIG. 12B may be presented to the given user after the process 1100 has been executed. In one implementation, the participant list interface 200 of FIG. 12A may be presented to the given user on a first day, and the participant list interface 200 of FIG. 12B may be presented to the given user on a second day that is the day after the first day.

On the first day, the users corresponding to identifiers 1210a and 1210b (i.e., Friend1 and Friend2, respectively) had the attributes of communicating with the given user on that day, which is in the current week, and of living in the same town as the given user. Therefore, the identifiers 1210a and 1210b are included in the groups 1215a, 1215c, and 1215d of the participant list interface 200 of FIG. 12A. Similarly, the user corresponding to the identifier 1210c (i.e., Mom) communicated with the given user on the day before the first day, which is still in the current week, as evidenced by the inclusion of the identifier 1210c in the groups 1205b and 1205c.

As reflected by FIG. 12B, however, the attributes of the users corresponding to the identifiers 1210a-1210c may change between the first and second days, and execution of the process 1100 between the first and second days causes those changes to be reflected in the participant list interface 200 of FIG. 12B. For example, for ease of consideration, assume no further communications between the users. As day 1 (FIG. 12A) changes to day 2 (FIG. 12B), the timing of recent communications between the users changes such that the identifiers 1210a and 1210b are now included in the group 1215b, and the identifier 1210c is now included in the group 1215c. In addition, the identifier 1210b has been removed from the group 1215d and is included in the new group 1215e, for example, because the user corresponding to the identifier 1210b moved out of the town of the given user and sent a long message to the given user to say goodbye to the given user.

Figure 13:
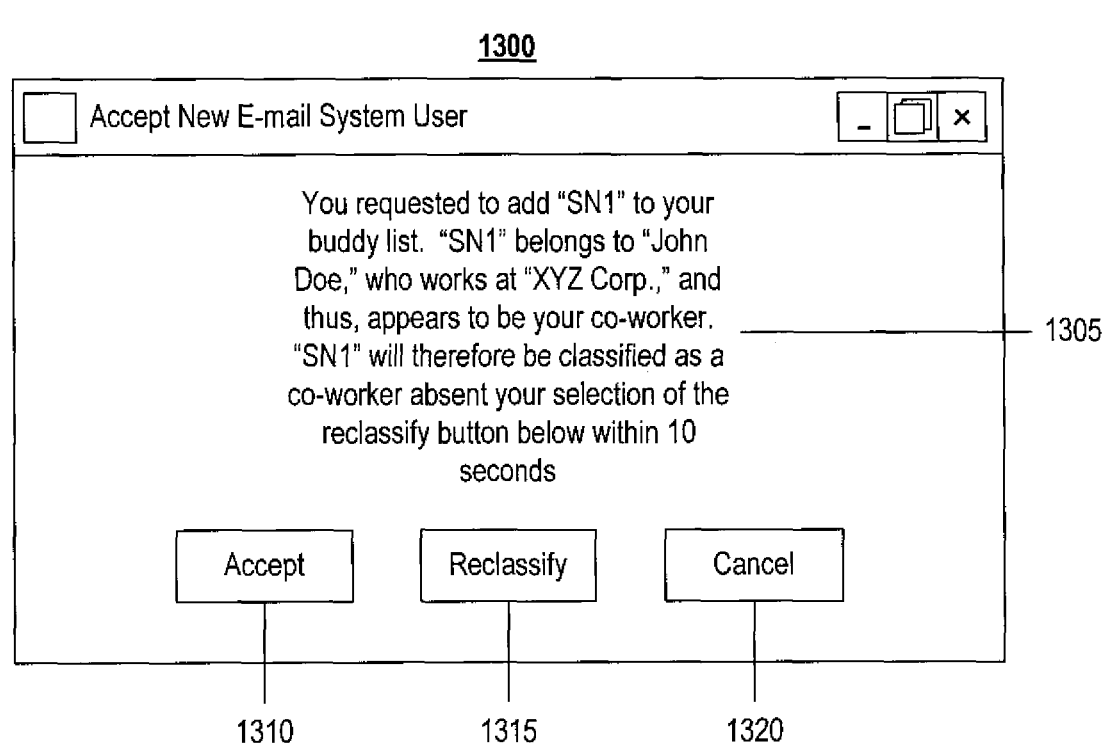
FIG. 13 is a screen shot illustration of a message displayed to a user upon identification of a category for a contact using the processes described herein, and availing the user of options to reject or recast such categorization.

Referring to FIG. 13, a notification interface 1300 notifies a user of an electronic communications system of a suggested category within a participant list of the user to which a new identifier should be added. The notification interface 1300 also enables the user to accept the suggested category for the new identifier, to request a new category for the new identifier, or to reject the suggested category. A similar notification interface 1300 may be presented to the user when identifiers already included in the participant list are categorized.

The notification interface 1300 includes a message 1305 that informs the user of the suggested category for the new identifier, as well as a reason for suggesting the suggested category. For example, the message 1305 informs the user that the identifier "SN1" will be added to a "Co-worker" group, because a user corresponding to the identifier works at the same corporation as the user of the participant list.

The notification interface 1305 also includes an accept button 1310 that enables the user to accept the addition of the new identifier to the suggested category. When the existing user selects the accept button 1310, the new identifier is added to the suggested category. As indicated in the message 1305, the button 1310 may be selected automatically when not selected by the user within a particular amount of time, such as 10 seconds.

The notification interface 1300 also includes reclassify button 1315 that results in the suggestion of another category for the new identifier. When the reclassify button 1315 is selected, a new notification interface 1300 with a new suggested category may be displayed. In addition, the notification interface 1300 on which the reclassify button 1315 was selected may be dismissed.

The notification interface 1300 also includes a cancel button 1320 that, when selected, dismisses the notification interface 1300 without first adding the new identifier to the suggested category. In some implementations, the new identifier still may be added, for example, to a general category within the participant list when the cancel button 1320 is selected. The user may be enabled to manually categorize the new identifier when the cancel button 1320 is selected.

The described techniques result in the population and organization of participant lists for electronic communications systems. Presence and location of a user in a participant list is indicative of the communications strength of the user with another user that uses the participant list. As a result, participant lists populated and organized with the described techniques may inform the population and organization of other participant lists. For example, when a list of users of an instant messaging system for which presence information is monitored is organized with the process 600 of FIG. 6, the organization of contacts within the list may be used to organize the same contacts in an address book for an e-mail system. The e-mail system may receive the participant list from the instant messaging system as a result of subscribing to participant lists published by the instant messaging system. Furthermore, applications and systems related or unrelated to a participant list that has been populated or organized with the described techniques may use the participant list. For example, an application may need to communicate with a person well known to a user whose participant list was populated with the process 100 of FIG. 1. The application may identify such a person from the participant list because people with high communications strengths with the user have been added to the user's participant list.

In another example, when a list of users of an instant messaging system for which presence information is monitored is populated using the process 100 of FIG. 1 and/or organized using the process 600 of FIG. 6, the populated and/or organized list may be accessed by and/or exported to other instant messaging systems or other systems that provide a user interface for an instant messaging system. Thus, a list that is populated and/or organized in one instant messaging system may be accessed, used, and/or exported for use by a different instant messaging system.

The described techniques may be applied when a user first becomes a user of an electronic communications system, at which point the user receives a new personal identifier and a corresponding participant list for use with the electronic communications system. The described techniques also may be applied when the user changes their identifier, or when the user chooses an additional identifier. For example, people known to the user may be notified of the changed or additional identifier such that those people may add the changed or additional identifier to their personal participant lists. People known to the user may be added to participant lists corresponding to the changed or additional identifier, and the participant lists corresponding to the changed or additional identifier may be organized. Population and organization of the participant lists for the changed or additional identifier may occur separately for each of those participant lists, or together for all of the participant lists corresponding to the user, as described above.

A participant list of a user of an electronic communications system may be dynamically maintained by calculating communications strengths between the user and people known to the user multiple times on a periodic or aperiodic basis. As messages are sent and received by the user, and as the relationships between the users and the known people change, the communications strengths between the user and the known people may change, and the communications strengths may be calculated multiple times to account for that change. For example, the communications strength between the user and one of the known people may be calculated each time a message is sent to or from that known person. The population and organization of the participant list of the user may be updated according to the process 100 of FIG. 1 and the process 600 of FIG. 6, based on the latest calculations of the communications strengths that have been received. In addition, people known to the user may be enabled to add an identifier of the user to a personal participant list according to the process 300 of FIG. 3, based on the latest calculations of the communications strengths that have been received.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method comprising:
   maintaining, in a storage device and on behalf of a first user, a list of identifiers representing one or more other users of the communication system and for which online presence information is made perceivable through the list, the list including one or more categories into which listed identifiers are categorized based on attributes associated with the listed identifiers, each of the one or more categories reflecting attributes other than online presence;
   accessing, from the storage device, at least one attribute associated with an identifier;
   accessing at least one attribute stored relative to at least one of the one or more categories included within the list;
   comparing the at least one attribute associated with the identifier to the at least one stored attribute;
   automatically adding, using at least one processor, a new category in the list based on a result of the comparison; and
   categorizing the identifier into the new category,
   wherein adding the new category includes making perceivable a pre-existing category that was previously hidden.

2. The method of claim 1, wherein the new category is added when the result indicates that the at least one attribute associated with the identifier does not match the at least one stored attribute.

3. The method of claim 1, wherein the new category is added when the result indicates that the identifier cannot be categorized in the one or more categories included in the list.

4. The method of claim 1, wherein the new category is added below the one or more categories in the list.

5. The method of claim 1, wherein the new category is a sub-category of the one or more categories in the list.

6. The method of claim 1, wherein categorizing the identifier in the new category includes:
displaying a notification informing the first user that the new category is a suggested category for the identifier;
receiving an input from the first user; and
categorizing the identifier in the new category in response to the input.

7. The method of claim 1, wherein the new category is added without user input.

8. The method of claim 1, wherein the at least one attribute associated with the identifier is accessed from a profile associated with the identifier.

9. The method of claim 1, wherein accessing at least one attribute associated with the identifier includes accessing at least one indication of communications between the first user and a second user corresponding to the identifier.

10. The method of claim 9, wherein accessing the at least one indication comprises accessing at least one indication from a group of indications comprising at least one of an instant message sent between the first user and the second user, an e-mail message sent between the first user and the second user, and a voice over Internet protocol (VoIP) telephone call between the first user and the second user.

11. The method of claim 1, wherein accessing at least one attribute associated with the identifier comprises accessing a time at which the first user exchanges a message with a second user corresponding to the identifier.

12. The method of claim 1, wherein accessing the at least one attribute associated with the identifier comprises accessing a location of a second user corresponding to the identifier.

13. The method of claim 1, wherein accessing the at least one attribute associated with the identifier includes accessing a frequency with which the first user exchanges messages with a second user corresponding to the identifier.

14. The method of claim 1, wherein accessing the at least one attribute associated with the identifier comprises accessing a length of a message sent between the first user and a second user corresponding to the identifier.

15. The method of claim 1, wherein the list of users is an electronic address book, an address book of an e-mail system, or a list of contacts in a social network of the first user.

16. The method of claim 15, wherein the list of users is a list of contacts in a social network of the first user.

17. A non-transitory computer readable storage device storing programmable instructions, which when executed by a processor cause the processor to perform a method comprising:
maintaining, on behalf of a first user, a list of identifiers representing one or more other users of the communication system and for which online presence information is made perceivable through the list, the list including one or more categories into which listed identifiers are categorized based on attributes associated with the listed identifiers, each of the one or more categories reflecting attributes other than online presence;
accessing at least one attribute associated with an identifier;
accessing at least one attribute stored relative to at least one of the one or more categories included within the list;
comparing the at least one attribute associated with the identifier to the at least one stored attribute;
automatically adding a new category in the list based on a result of the comparison; and
categorizing the identifier into the new category,
wherein adding the new category includes making perceivable a pre-existing category that was previously hidden.

18. The computer readable storage device of claim 17, wherein the new category is added when the result indicates that the identifier cannot be categorized in the one or more categories included in the list.

19. The computer readable storage device of claim 17, wherein categorizing the identifier in the new category includes:
displaying a notification informing the first user that the new category is a suggested category for the identifier;
receiving an input from the first user; and
categorizing the identifier in the new category in response to the input.

20. The computer readable storage device of claim 17, wherein the at least one attribute associated with the identifier is based on at least one of a profile associated with the identifier, an indication of communications between the first user and a second user corresponding to the identifier, a time at which the first user exchanges a message with a second user corresponding to the identifier, a location of a second user corresponding to the identifier, a frequency with which the first user exchanges messages with a second user corresponding to the identifier, and a length of a message sent between the first user and a second user corresponding to the identifier.

21. The computer readable storage device of claim 17, wherein the list of users is an electronic address book, an address book of an e-mail system, or a list of contacts in a social network of the first user.

22. The computer readable storage device of claim 17, wherein accessing the at least one attribute associated with the identifier comprises accessing a location of a second user corresponding to the identifier.

23. The computer readable storage device of claim 17, wherein accessing the at least one attribute associated with the identifier includes accessing a frequency with which the first user exchanges messages with a second user corresponding to the identifier.

24. A system comprising:
a storage device maintaining, on behalf of a first user, a list of identifiers representing one or more other users of a communication system and for which online presence information is made perceivable through the list, the list including one or more categories into which listed identifiers are categorized based on attributes associated with the listed identifiers, each of the one or more categories reflecting attributes other than online presence;
a processor; and
a computer readable storage device storing instructions, which when executed on the processor, causes the processor to:
access at least one attribute associated with an identifier;
access at least one attribute stored relative to at least one of the one or more categories included within the list;
compare the at least one attribute associated with the identifier to the at least one stored attribute;
automatically add a new category in the list based on a result of the comparison; and
categorize the identifier into the new category,
wherein adding the new category includes making perceivable a pre-existing category that was previously hidden.

* * * * *